US012576446B2

(12) United States Patent
Halla et al.

(10) Patent No.: US 12,576,446 B2
(45) Date of Patent: *Mar. 17, 2026

(54) ADDITIVE MANUFACTURING BUILD UNITS WITH PROCESS GAS INERTIZATION SYSTEMS

(71) Applicants: General Electric Company, Schenectady, NY (US); Concept Laser GmbH, Lichtenfels (DE)

(72) Inventors: Eric Edward Halla, West Chester, OH (US); Ramakrishna Venkata Mallina, Mason, OH (US); Kishore Ramakrishnan, Rexford, NY (US); Shashwat Swami Jaiswal, Bangalore (IN); Mohammed Mounir Shalaby, Mason, OH (US); Peter Pontiller-Schymura, Kulmbach (DE)

(73) Assignees: General Electric Company, Schenectady, NY (US); Concept Laser GmbH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,325

(22) Filed: Feb. 28, 2024

(65) Prior Publication Data

US 2024/0198425 A1     Jun. 20, 2024

Related U.S. Application Data

(63) Continuation of application No. 17/232,516, filed on Apr. 16, 2021, now Pat. No. 11,938,539.

(51) Int. Cl.
| | |
|---|---|
| B22F 10/77 | (2021.01) |
| B22F 10/28 | (2021.01) |
| B22F 12/33 | (2021.01) |
| B22F 12/70 | (2021.01) |
| B33Y 10/00 | (2015.01) |
| B33Y 30/00 | (2015.01) |
| B33Y 40/00 | (2020.01) |

(52) U.S. Cl.
CPC .............. *B22F 10/77* (2021.01); *B22F 10/28* (2021.01); *B22F 12/33* (2021.01); *B22F 12/70* (2021.01); *B33Y 10/00* (2014.12); *B33Y 30/00* (2014.12); *B33Y 40/00* (2014.12); *B22F 2201/10* (2013.01)

(58) Field of Classification Search
CPC .... B22F 12/70; B22F 2201/10; B22F 10/322; B22F 10/77; B29C 64/371
See application file for complete search history.

(56) References Cited

U.S. PATENT DOCUMENTS

| | | |
|---|---|---|
| 4,823,731 A | 4/1989 | Howeth |
| 6,583,379 B1 | 6/2003 | Meiners et al. |
| 7,037,382 B2 | 5/2006 | Davidson et al. |
| 7,863,542 B2 | 1/2011 | Murase et al. |
| 8,172,562 B2 | 5/2012 | Mattes |
| 8,185,229 B2 | 5/2012 | Davidson |
| 8,288,681 B2 | 10/2012 | Murase et al. |
| 8,876,277 B2 | 11/2014 | Vandagriff et al. |
| 9,415,417 B2 | 8/2016 | Kwon et al. |
| 9,669,583 B2 | 6/2017 | Ferrar |
| 9,931,789 B2 | 4/2018 | Wiesner et al. |
| 9,956,612 B1 | 5/2018 | Redding et al. |
| 10,022,794 B1 | 7/2018 | Redding et al. |
| 10,399,323 B2 | 9/2019 | Donovan |
| 10,471,701 B2 | 11/2019 | Herzog et al. |
| 10,507,549 B2 | 12/2019 | Buller et al. |
| 10,549,346 B2 | 2/2020 | Yasuda et al. |
| 10,583,482 B2 | 3/2020 | Heugel et al. |
| 10,611,092 B2 | 4/2020 | Buller et al. |
| 10,751,797 B2 | 8/2020 | Ott et al. |
| 11,331,725 B2 | 5/2022 | Herzog |
| 2004/0012112 A1 | 1/2004 | Davidson et al. |
| 2009/0035411 A1 | 2/2009 | Seibert et al. |
| 2011/0278773 A1 | 11/2011 | Bokodi et al. |
| 2015/0367574 A1 | 12/2015 | Araie et al. |
| 2016/0121398 A1 | 5/2016 | Schlick et al. |
| 2017/0036404 A1 | 2/2017 | Rengers et al. |
| 2017/0087635 A1 | 3/2017 | Wilkes et al. |
| 2017/0282245 A1 | 10/2017 | Yasuda et al. |
| 2017/0282463 A1 | 10/2017 | Schilling et al. |
| 2018/0200962 A1 | 7/2018 | Redding et al. |
| 2018/0221954 A1 | 8/2018 | Redding et al. |
| 2018/0264552 A1 | 9/2018 | Herzog |
| 2018/0281068 A1 | 10/2018 | Redding et al. |
| 2018/0281069 A1 | 10/2018 | Redding et al. |
| 2018/0333779 A1 | 11/2018 | Sutcliffe |
| 2019/0039313 A1 | 2/2019 | Fey et al. |
| 2019/0077077 A1 | 3/2019 | Martin et al. |
| 2019/0099943 A1 | 4/2019 | Connell |

(Continued)

FOREIGN PATENT DOCUMENTS

| | | |
|---|---|---|
| CN | 108407292 A | 8/2018 |
| DE | 102016213628 A1 | 2/2018 |
| EP | 3231583 A1 | 10/2017 |
| JP | S50146354 U | 12/1975 |
| WO | WO2019/081894 A1 | 5/2019 |
| WO | WO2019/090377 A1 | 5/2019 |
| WO | WO2020/104202 A1 | 5/2020 |

*Primary Examiner* — Jonathan Johnson
(74) *Attorney, Agent, or Firm* — Wood Herron & Eveans LLP

(57) ABSTRACT

A build unit for additively manufacturing three-dimensional objects may include an energy beam system, an irradiation chamber, an inertization system having a return manifold configured to evacuate a process gas from the irradiation chamber. The return manifold includes a plurality of return manifold bodies and return manifold inlet disposed at a bottom of the irradiation chamber. The plurality of return manifold bodies includes one or more return manifold pathways downstream of the return manifold inlet. The plurality of return manifold bodies also includes one or more recapture pathways positioned to receive the process gas into the one or more return manifold pathways that flows past the return manifold inlet.

21 Claims, 20 Drawing Sheets

(56) References Cited

U.S. PATENT DOCUMENTS

| | | | |
|---|---|---|---|
| 2019/0143587 A1 | 5/2019 | Mamrak et al. | |
| 2019/0193332 A1 | 6/2019 | Schmale | |
| 2019/0224749 A1 | 7/2019 | Barnhart et al. | |
| 2019/0322050 A1 | 10/2019 | Connell | |
| 2020/0061656 A1* | 2/2020 | Shalaby | B22F 10/77 |
| 2020/0147690 A1 | 5/2020 | TenHouten et al. | |
| 2020/0254522 A1 | 8/2020 | Redding et al. | |
| 2021/0023788 A1 | 1/2021 | Shimoda et al. | |
| 2021/0170494 A1 | 6/2021 | Mamrak et al. | |
| 2021/0205928 A1 | 7/2021 | Beeby et al. | |
| 2021/0268588 A1 | 9/2021 | Higashi et al. | |
| 2023/0098828 A1 | 3/2023 | Schaude et al. | |

* cited by examiner

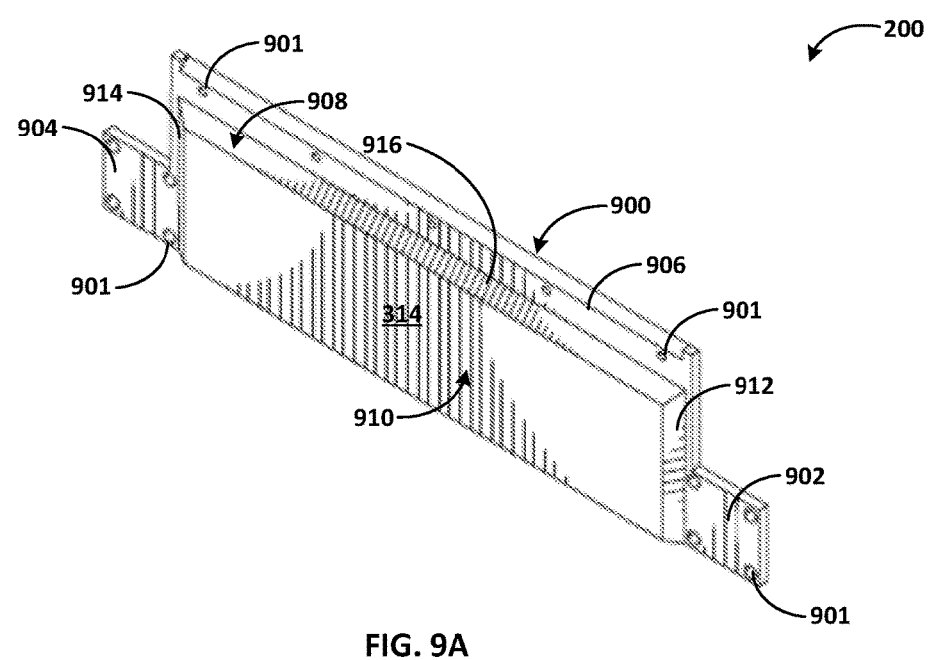
FIG. 9A
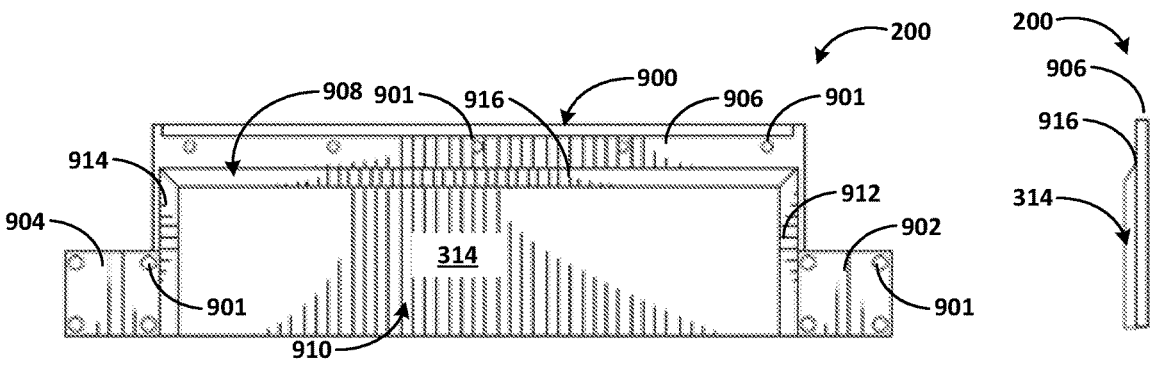
FIG. 9B
FIG. 9C
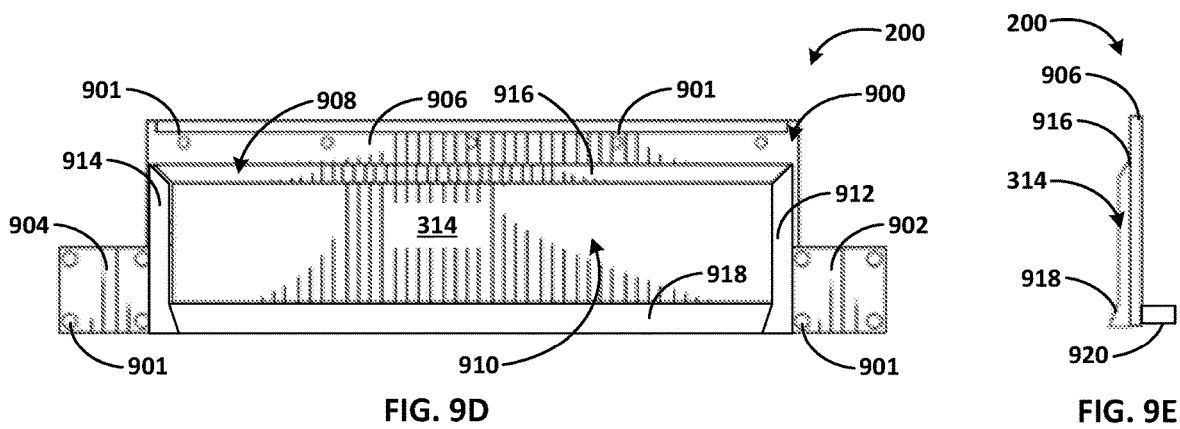
FIG. 9D
FIG. 9E

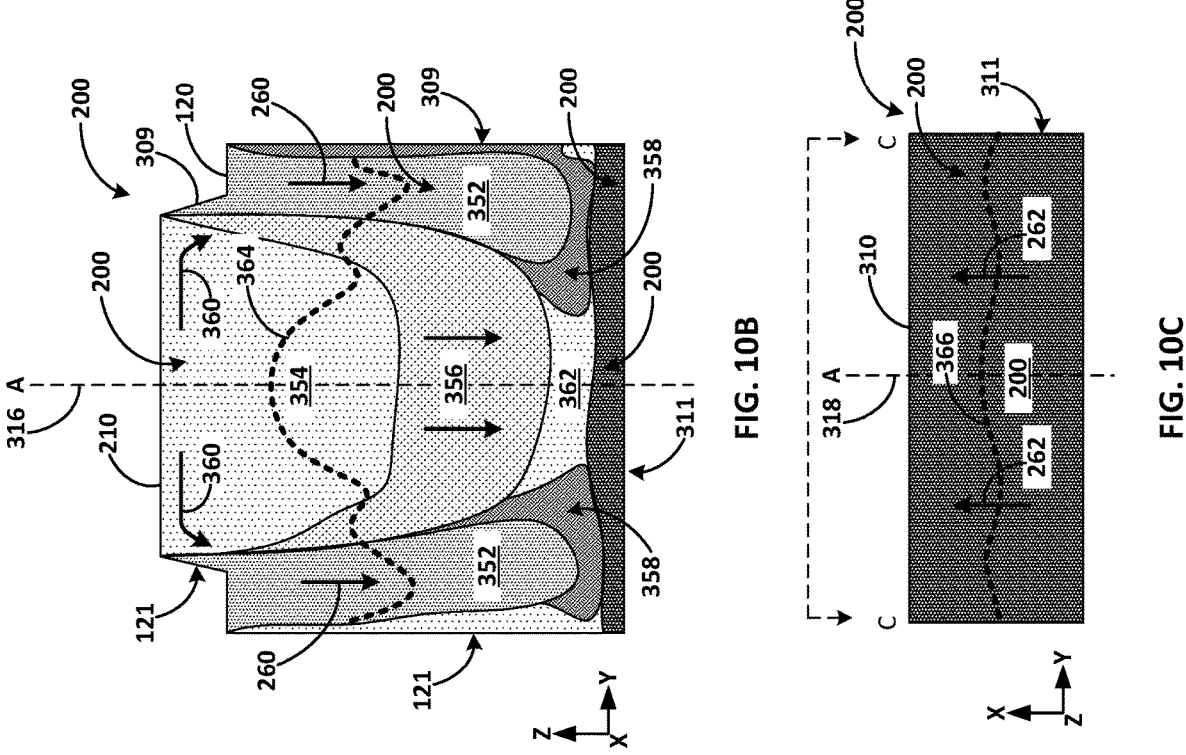
FIG. 10B
FIG. 10C
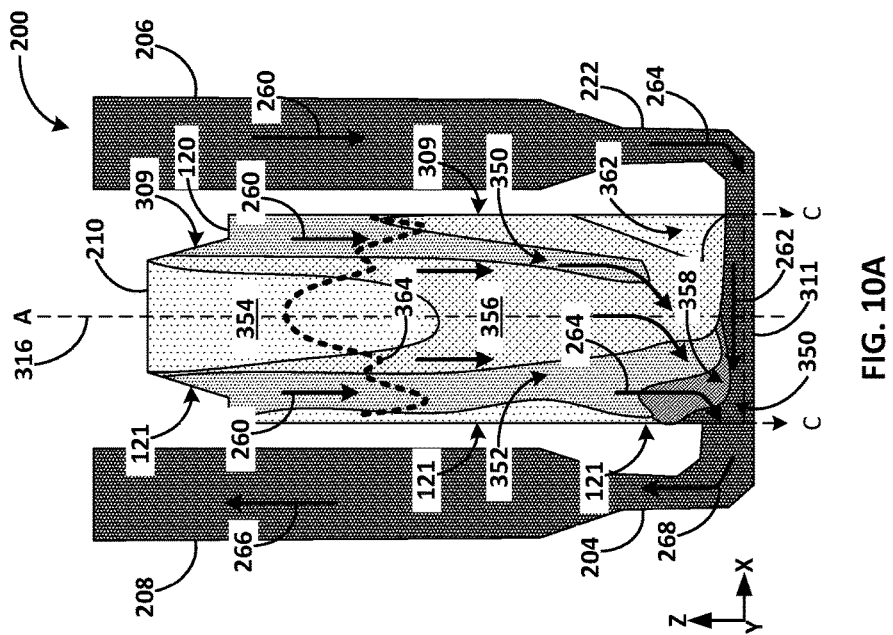
FIG. 10A

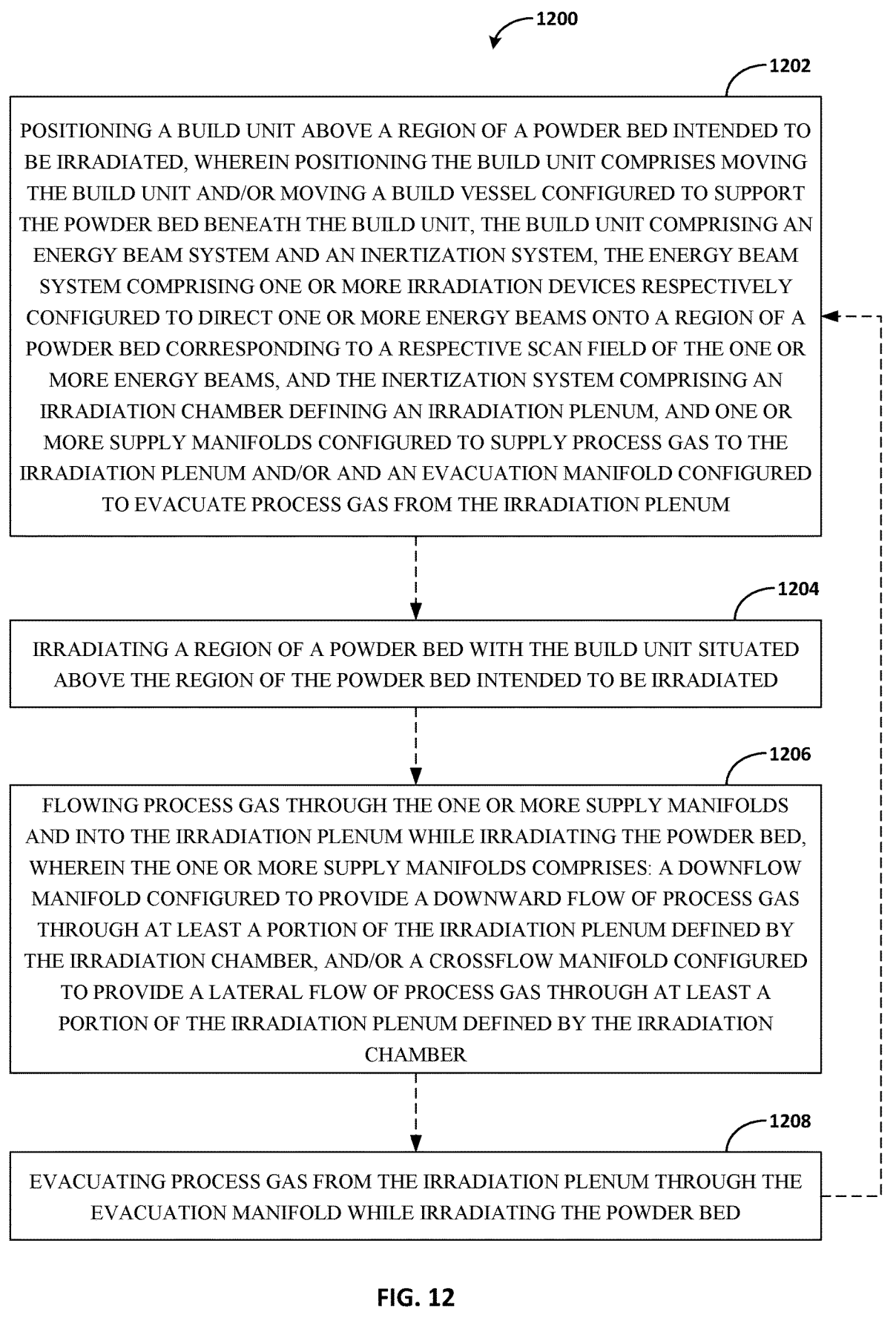

1200

1202

POSITIONING A BUILD UNIT ABOVE A REGION OF A POWDER BED INTENDED TO BE IRRADIATED, WHEREIN POSITIONING THE BUILD UNIT COMPRISES MOVING THE BUILD UNIT AND/OR MOVING A BUILD VESSEL CONFIGURED TO SUPPORT THE POWDER BED BENEATH THE BUILD UNIT, THE BUILD UNIT COMPRISING AN ENERGY BEAM SYSTEM AND AN INERTIZATION SYSTEM, THE ENERGY BEAM SYSTEM COMPRISING ONE OR MORE IRRADIATION DEVICES RESPECTIVELY CONFIGURED TO DIRECT ONE OR MORE ENERGY BEAMS ONTO A REGION OF A POWDER BED CORRESPONDING TO A RESPECTIVE SCAN FIELD OF THE ONE OR MORE ENERGY BEAMS, AND THE INERTIZATION SYSTEM COMPRISING AN IRRADIATION CHAMBER DEFINING AN IRRADIATION PLENUM, AND ONE OR MORE SUPPLY MANIFOLDS CONFIGURED TO SUPPLY PROCESS GAS TO THE IRRADIATION PLENUM AND/OR AND AN EVACUATION MANIFOLD CONFIGURED TO EVACUATE PROCESS GAS FROM THE IRRADIATION PLENUM

1204

IRRADIATING A REGION OF A POWDER BED WITH THE BUILD UNIT SITUATED ABOVE THE REGION OF THE POWDER BED INTENDED TO BE IRRADIATED

1206

FLOWING PROCESS GAS THROUGH THE ONE OR MORE SUPPLY MANIFOLDS AND INTO THE IRRADIATION PLENUM WHILE IRRADIATING THE POWDER BED, WHEREIN THE ONE OR MORE SUPPLY MANIFOLDS COMPRISES: A DOWNFLOW MANIFOLD CONFIGURED TO PROVIDE A DOWNWARD FLOW OF PROCESS GAS THROUGH AT LEAST A PORTION OF THE IRRADIATION PLENUM DEFINED BY THE IRRADIATION CHAMBER, AND/OR A CROSSFLOW MANIFOLD CONFIGURED TO PROVIDE A LATERAL FLOW OF PROCESS GAS THROUGH AT LEAST A PORTION OF THE IRRADIATION PLENUM DEFINED BY THE IRRADIATION CHAMBER

1208

EVACUATING PROCESS GAS FROM THE IRRADIATION PLENUM THROUGH THE EVACUATION MANIFOLD WHILE IRRADIATING THE POWDER BED

FIG. 12

ADDITIVE MANUFACTURING BUILD UNITS WITH PROCESS GAS INERTIZATION SYSTEMS

CROSS-REFERENCE TO RELATED APPLICATIONS

This application is a continuation application of U.S. application Ser. No. 17/232,516 filed on Apr. 16, 2021, the contents of which are herein incorporated in their entirety by reference

FIELD

The present disclosure generally pertains to build units for additive manufacturing systems, including build units for large format additive manufacturing operations and/or build units with process gas inertization system.

BACKGROUND

Large format additive manufacturing systems or machines may include a build unit and a build vessel, in which a cross-sectional surface area of the build vessel significantly exceeds the cross-sectional surface area of the build unit. The build unit and/or the build vessel may be movable relative to one another to additively manufacture relatively large objects and/or a relatively large quantity of objects within the build vessel.

Additive manufacturing operations that utilize a powder bed fusion process can be performed within an inertized processing environment, whereby inertized process gas may be supplied to a build chamber while contaminants such as soot, fumes, particulates, powder material, or other byproducts generated during the additive manufacturing operation may be evacuated from the process chamber. However, additive manufacturing systems or machines that include a build unit and a build vessel that are movable relative to one another introduce unique challenges for providing an inertized processing environment.

Accordingly, improved additive manufacturing systems and machines, including improved build units that include process gas inertization systems, would be welcomed in the art.

BRIEF DESCRIPTION

Aspects and advantages will be set forth in part in the following description, or may be apparent from the description, or may be learned through practicing the presently disposed subject matter.

In one aspect, the present disclosure embraces additive manufacturing systems and/or additive manufacturing machines. An exemplary additive manufacturing system and/or additive manufacturing machine may include a build unit, a build vessel, a build unit-positioning system, and/or a build vessel-positioning system. The build unit, the build vessel, the build unit-positioning system, and the build vessel-positioning system may be configured according to the present disclosure.

In another aspect, the present disclosure embraces build units for additively manufacturing three-dimensional objects. An exemplary build unit may include an energy beam system, and an inertization system, one or more supply manifolds, and a return manifold. The energy beam system may include one or more irradiation devices respectively configured to direct one or more energy beams onto a region of a powder bed. The inertization system may include an irradiation chamber defining an irradiation plenum. The one or more supply manifolds may include a downflow manifold configured to provide a downward flow of a process gas through at least a portion of the irradiation plenum defined by the irradiation chamber. Additionally, or in the alternative, the one or more supply manifolds may include a crossflow manifold configured to provide a lateral flow of the process gas through at least a portion of the irradiation plenum defined by the irradiation chamber. In some embodiments, an exemplary build unit may include an inertization system that includes an irradiation chamber defining an irradiation plenum and one or more supply manifolds configured to supply a process gas to the irradiation plenum while irradiating the region of the powder bed with the build unit situated above the region of the powder bed. The process gas may flow through the one or more supply manifolds and into the irradiation plenum while irradiating the region of the powder bed. The return manifold may evacuate or otherwise remove process gas from the irradiation plenum defined by the irradiation chamber.

An exemplary downflow manifold may include a downflow manifold body defining one or more downflow manifold pathways within the downflow manifold body. The downflow manifold body may include one or more inward downflow manifold walls defining an optics plenum coinciding with a distal portion of the irradiation plenum relative to the powder bed. The one or more inward downflow manifold walls may diverge from a longitudinal axis of the downflow manifold body in a proximal direction relative to the powder bed at a divergence angle allowing the one or more energy beams of the energy beam system to access the portion of the powder bed corresponding to a scan field of the one or more energy beams. The one or more inward downflow manifold walls may include a plurality of downflow manifold apertures fluidly communicating between the optics plenum and one or more downflow manifold pathways defined by the downflow manifold body. The plurality of downflow manifold apertures may be oriented parallel to a longitudinal axis of the downflow manifold body. In some embodiments, the plurality of downflow manifold apertures may be oriented within 10 degrees of parallel to the longitudinal axis of the downflow manifold body.

An exemplary crossflow manifold may include a plurality of crossflow manifold bodies arranged along a width of the crossflow manifold. The plurality of crossflow manifold bodies may be respectively coupled to one another or may define a respective integrally formed portion of the crossflow manifold. Respective ones of the plurality of crossflow manifold bodies may include a crossflow manifold inlet fluidly communicating with a process gas supply line and a plurality of crossflow manifold pathways defined by the respective crossflow manifold body. The crossflow manifold may include a crossflow manifold outlet defined at least in part by respective ones of the plurality of crossflow manifold bodies. The crossflow manifold outlet may fluidly communicate with the irradiation plenum defined by the irradiation chamber and the plurality of crossflow manifold pathways of the respective ones of the plurality of crossflow manifold bodies.

The crossflow manifold outlet may have an elongate cross-sectional profile. Respective ones of the plurality of crossflow manifold bodies may include a transverse expansion region and a lateral translation region. The transverse expansion region may be located downstream from the respective crossflow manifold inlet. The lateral translation region may be located downstream from the transverse expansion region and upstream from the crossflow manifold outlet. The transverse expansion region may exhibit a transverse expansion of the respective crossflow manifold body relative to a longitudinal axis of the respective crossflow manifold inlet and/or relative to a lateral axis of the crossflow manifold outlet. The lateral translation region may exhibit a lateral translation in an axial orientation of the respective crossflow manifold body relative to the longitudinal axis of the respective crossflow manifold inlet and/or relative to a lateral axis of the crossflow manifold outlet.

An exemplary return manifold may include a plurality of return manifold bodies arranged along a width of the return manifold. The plurality of return manifold bodies may be respectively coupled to one another or may define a respective integrally formed portion of the return manifold. The return manifold may include a return manifold inlet defined at least in part by respective ones of the plurality of return manifold bodies. Respective ones of the plurality of return manifold bodies may include one or more return manifold pathways and a return manifold outlet fluidly communicating with the one or more return manifold pathways of the return manifold body and a process gas evacuation line. The return manifold inlet may fluidly communicate with the irradiation plenum defined by the irradiation chamber and the one or more return manifold pathways defined by the respective ones of the plurality of return manifold bodies. The return manifold may be configured to receive a lateral flow of the process gas from at least a portion of an irradiation plenum defined by the irradiation chamber. The return manifold inlet may have an elongate cross-sectional profile. The return manifold may include one or more narrowing regions and/or one or more rib elements disposed about the return manifold inlet and/or within the one or more return manifold pathways.

In yet another aspect, the present disclosure embraces methods of additively manufacturing a three-dimensional object. An exemplary method may include irradiating a powder bed with a build unit situated above a powder bed, flowing a process gas through the one or more supply manifolds and into the irradiation plenum while irradiating the powder bed, and evacuating or otherwise removing the process gas from the irradiation plenum through the return manifold while irradiating the powder bed. The build unit may include an energy beam system and an inertization system. The inertization system may include an irradiation chamber defining an irradiation plenum, one or more supply manifolds configured to supply process gas to the irradiation plenum, and a return manifold configured to receive and/or evacuate process gas from the irradiation plenum. The one or more supply manifolds may include a downflow manifold configured to provide a downward flow of the process gas through at least a portion of the irradiation plenum defined by the irradiation chamber, and a crossflow manifold configured to provide a lateral flow of the process gas through at least a portion of the irradiation plenum defined by the irradiation chamber.

In some embodiments, an exemplary method may include irradiating a region of a powder bed with a build unit situated above the region of the powder bed and flowing a process gas through the one or more supply manifolds and into the irradiation plenum while irradiating the powder bed. The build unit may include an energy beam system and an inertization system. The energy beam system may include one or more irradiation devices respectively configured to direct one or more energy beams onto a region of a powder bed. The inertization system may include an irradiation chamber defining an irradiation plenum and one or more supply manifolds configured to supply process gas to the irradiation plenum. The one or more supply manifolds may include a downflow manifold configured to provide a downward flow of the process gas through at least a portion of irradiation plenum defined by the irradiation chamber. The downflow manifold may include a downflow manifold body defining one or more downflow manifold pathways within the downflow manifold body, and one or more inward downflow manifold walls defining an optics plenum including a distal portion of the irradiation plenum relative to the powder bed. The one or more inward downflow manifold walls may diverge from a longitudinal axis of the downflow manifold body in a proximal direction relative to the powder bed at a divergence angle allowing the one or more energy beams of the energy beam system to access the portion of the powder bed corresponding to a scan field of the one or more energy beams.

In some embodiments, flowing the process gas through the one or more supply manifolds and into the irradiation plenum may include flowing the process gas through a plurality of downflow manifold apertures disposed within the one or more inward downflow manifold walls. The plurality of downflow manifold apertures may fluidly communicate between the optics plenum and the one or more downflow manifold pathways defined by the downflow manifold body. The plurality of downflow manifold apertures may be oriented parallel to a longitudinal axis of the downflow manifold body or within 10 degrees of parallel to the longitudinal axis of the downflow manifold body.

Additionally, or in the alternative, flowing the process gas through the one or more supply manifolds and into the irradiation plenum may include flowing the process gas through a crossflow manifold configured to provide a lateral flow of the process gas through at least a portion of the irradiation plenum defined by the irradiation chamber. The crossflow manifold may include a plurality of crossflow manifold bodies arranged along a width of the crossflow manifold and respectively coupled to one another or defining a respective integrally formed portion of the crossflow manifold. Respective ones of the plurality of crossflow manifold bodies may include a crossflow manifold inlet fluidly communicating with a process gas supply line and a plurality of crossflow manifold pathways defined by the respective crossflow manifold body, and the crossflow manifold may include a crossflow manifold outlet defined at least in part by respective ones of the plurality of crossflow manifold bodies. The crossflow manifold outlet may have an elongate cross-sectional profile, and the crossflow manifold outlet may fluidly communicate with the irradiation plenum defined by the irradiation chamber and the plurality of crossflow manifold pathways of the respective ones of the plurality of crossflow manifold bodies.

In some embodiments, flowing the process gas through the one or more supply manifolds and into the irradiation plenum may include transversely expanding the process gas at a transverse expansion region of respective ones of the plurality of crossflow manifold bodies and/or by laterally translating the process gas at a lateral translation region of respective ones of the plurality of crossflow manifold bodies. The transversely expanding the process gas may be followed by the laterally translating the process gas. The transverse expansion region may be located downstream from the respective crossflow manifold inlet, and the lateral translation region may be located downstream from the transverse expansion region and upstream from the crossflow manifold outlet. The transverse expansion region may exhibit a transverse expansion relative to a longitudinal axis

5 of the respective crossflow manifold inlet and/or relative to a lateral axis of the crossflow manifold outlet. The lateral translation region may exhibit a lateral translation in an axial orientation of the respective crossflow manifold body relative to the longitudinal axis of the respective crossflow manifold inlet and/or relative to a lateral axis of the crossflow manifold outlet.

In some embodiments, the process gas may be evacuated or otherwise removed from the irradiation plenum through the return manifold while irradiating the powder bed. Evacuating or otherwise removing the process gas from the irradiation plenum may include accelerating the process gas flowing into the return manifold inlet and/or through the one or more return manifold pathways by way of a pressure reduction within the return manifold inlet and/or within the one or more return manifold pathways. The pressure reduction may be provided by one or more narrowing regions and/or one or more rib elements disposed about the return manifold inlet and/or within the one or more return manifold pathways. The return manifold may include a plurality of return manifold bodies arranged along a width of the return manifold. The plurality of return manifold bodies may be respectively coupled to one another or may define a respective integrally formed portion of the return manifold. The return manifold may include a return manifold inlet defined at least in part by respective ones of the plurality of return manifold bodies, with respective ones of the plurality of return manifold bodies including one or more return manifold pathways and a return manifold outlet fluidly communicating with the one or more return manifold pathways of the respective return manifold body and a process gas evacuation line. The return manifold inlet may have an elongate cross-sectional profile, and the return manifold inlet may fluidly communicate with the irradiation plenum defined by the irradiation chamber and the one or more return manifold pathways defined by the respective ones of the plurality of return manifold bodies.

In yet another aspect, the present disclosure embraces computer-readable media. An exemplary computer-readable medium may include comprising computer-executable instructions, which when executed by a processor associated with an additive manufacturing machine, may cause the additive manufacturing machine to perform a method of additively manufacturing a three-dimensional object. Exemplary methods that may be performed by according to with the computer-executable instructions may be configured as described in the present disclosure.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disposed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which.

6

Figure 2A:
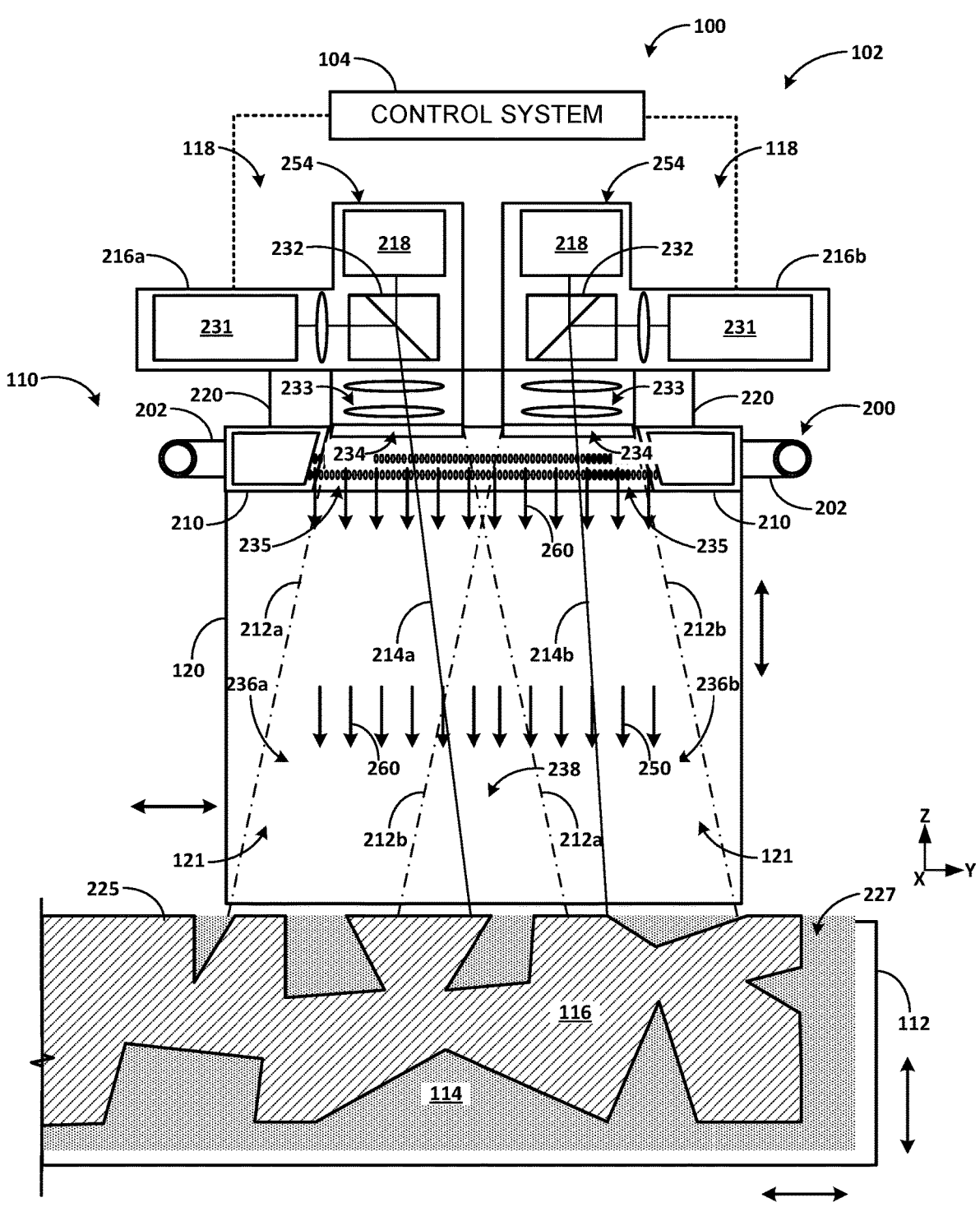
FIGS. 2A-2C schematically depict cross-sectional cutaway views of a build unit and a build vessel of an additive manufacturing machine or system.
Figure 2B:
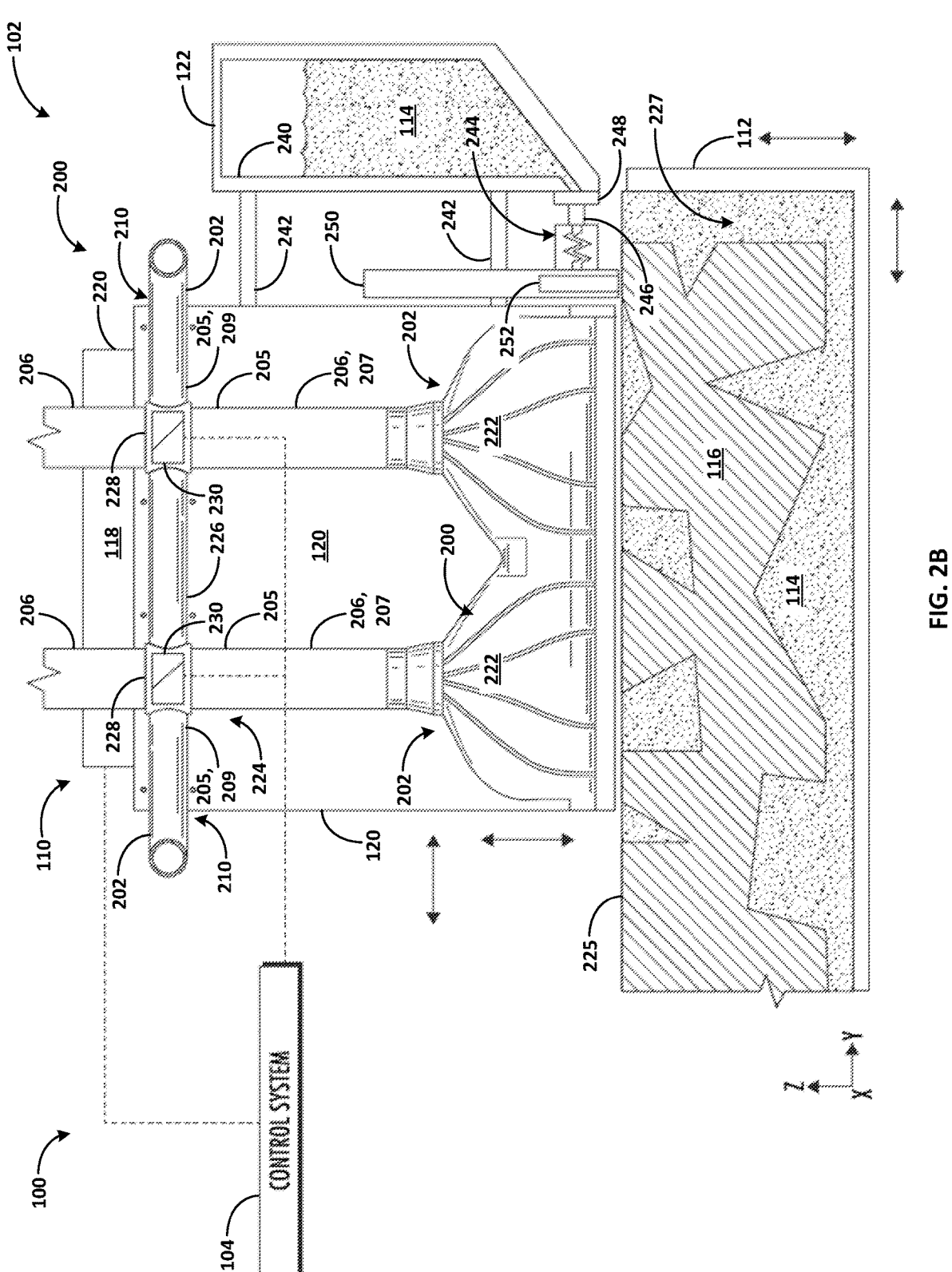
Figure 2C:
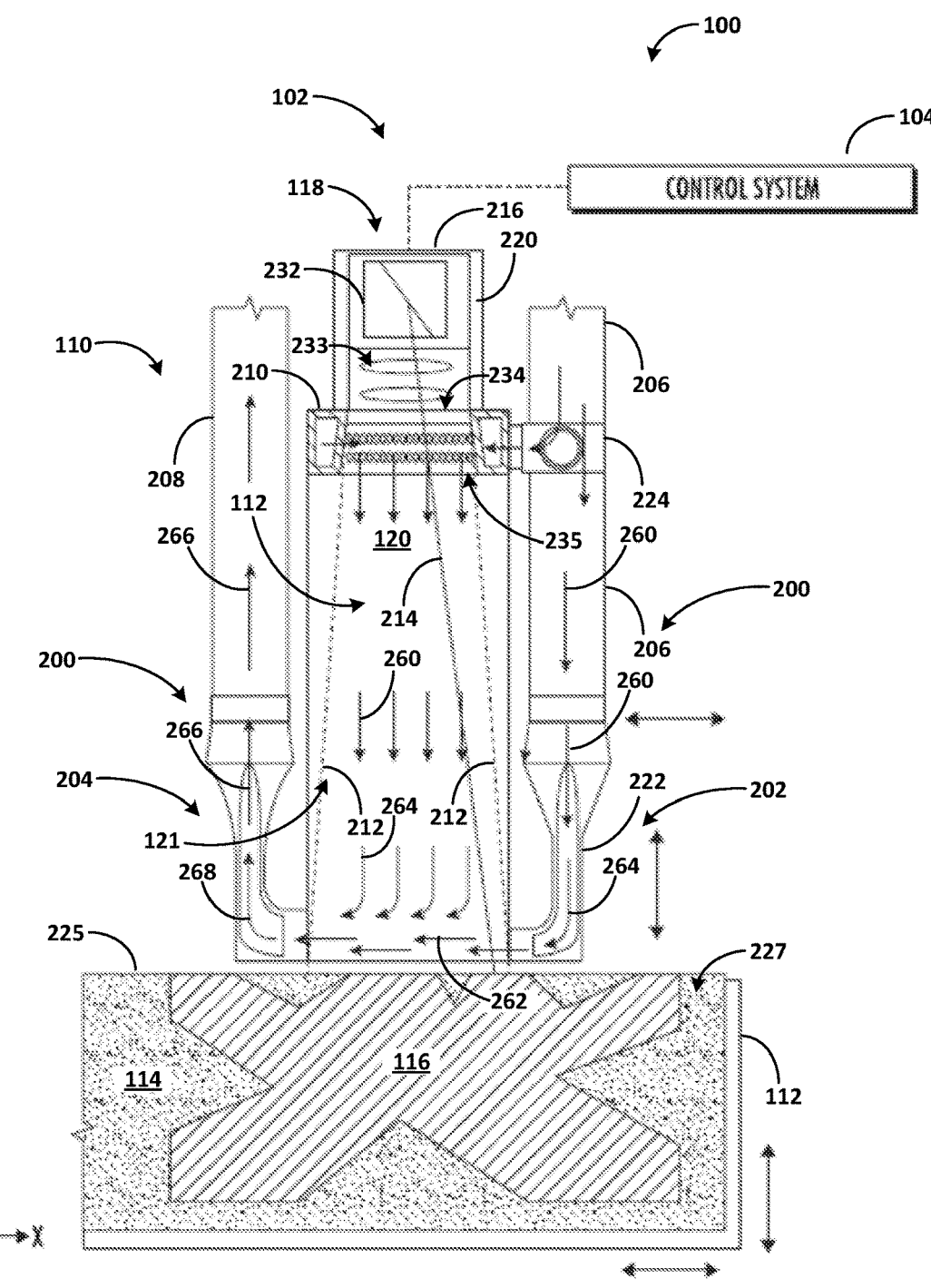
Figure 2D:
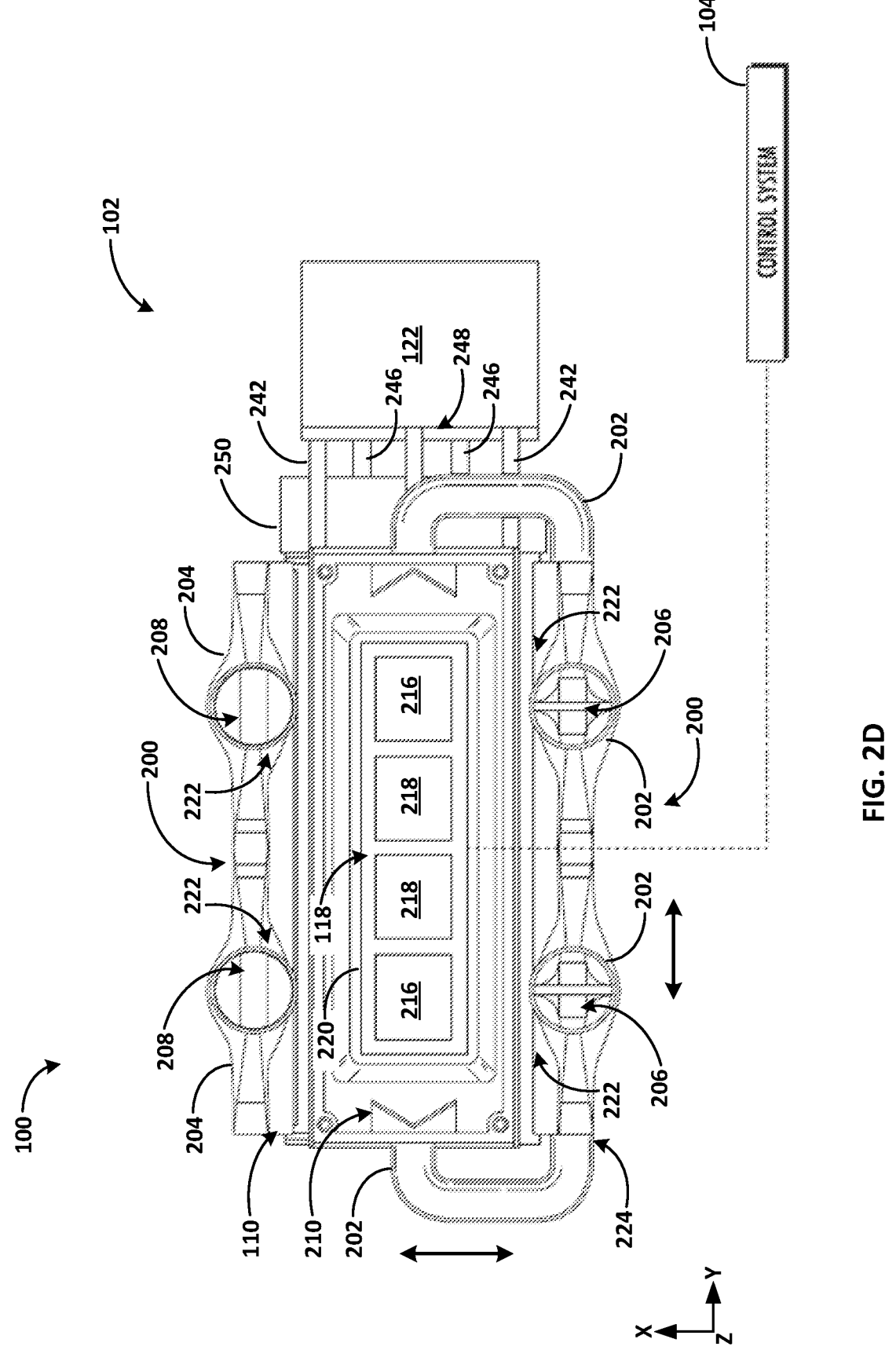
Figure 4A:
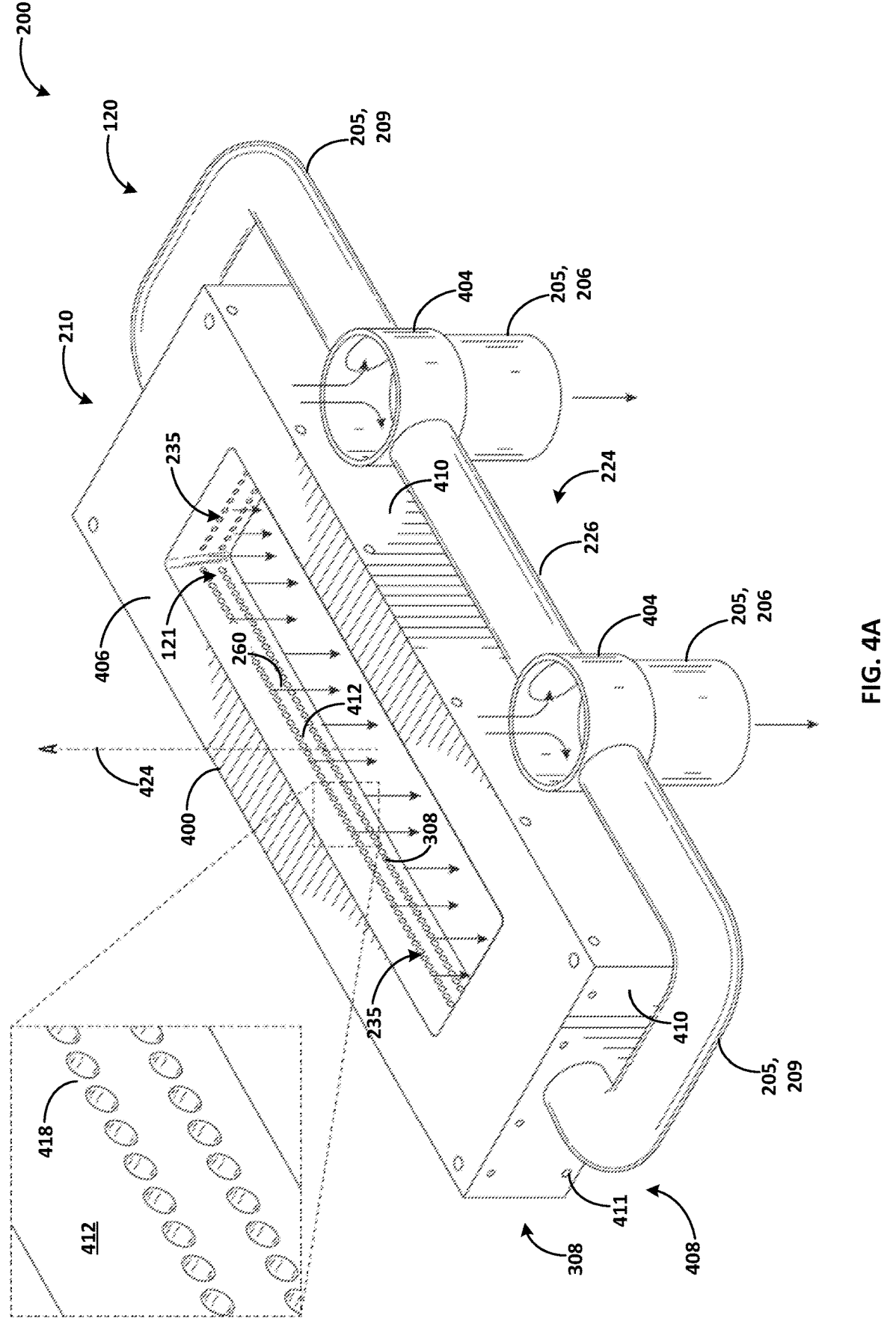
Figure 4B:
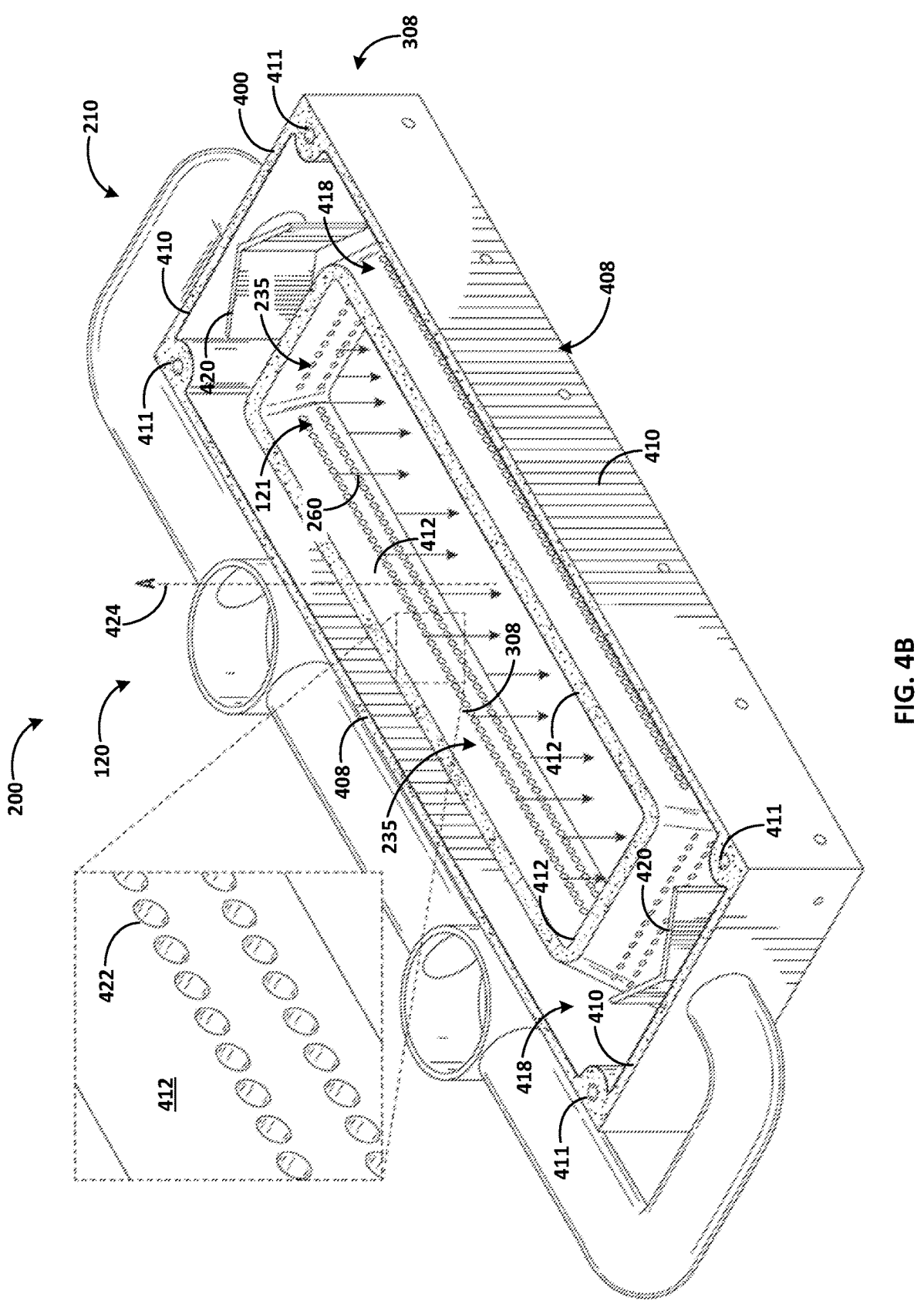
Figure 4C:
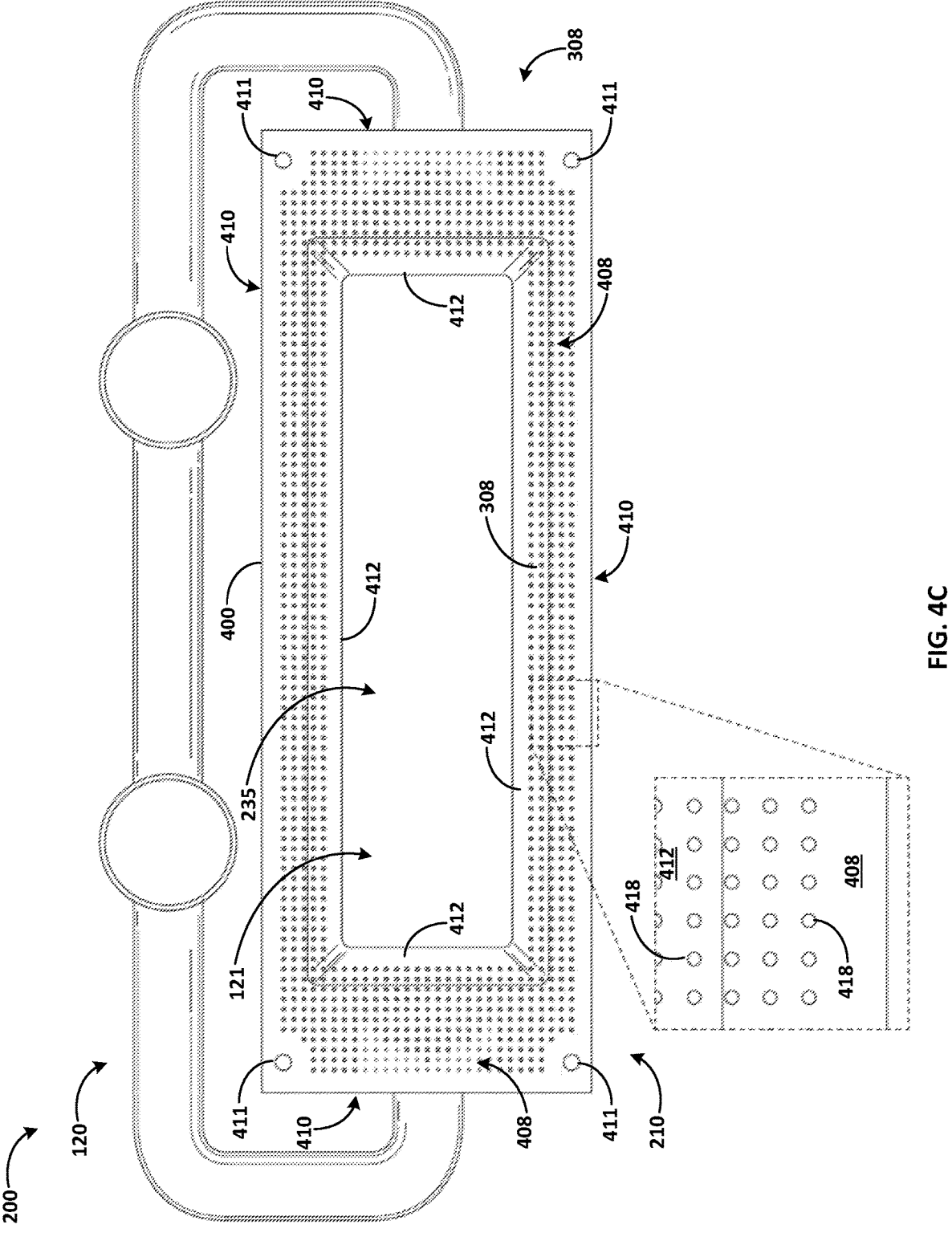
Figure 4D:
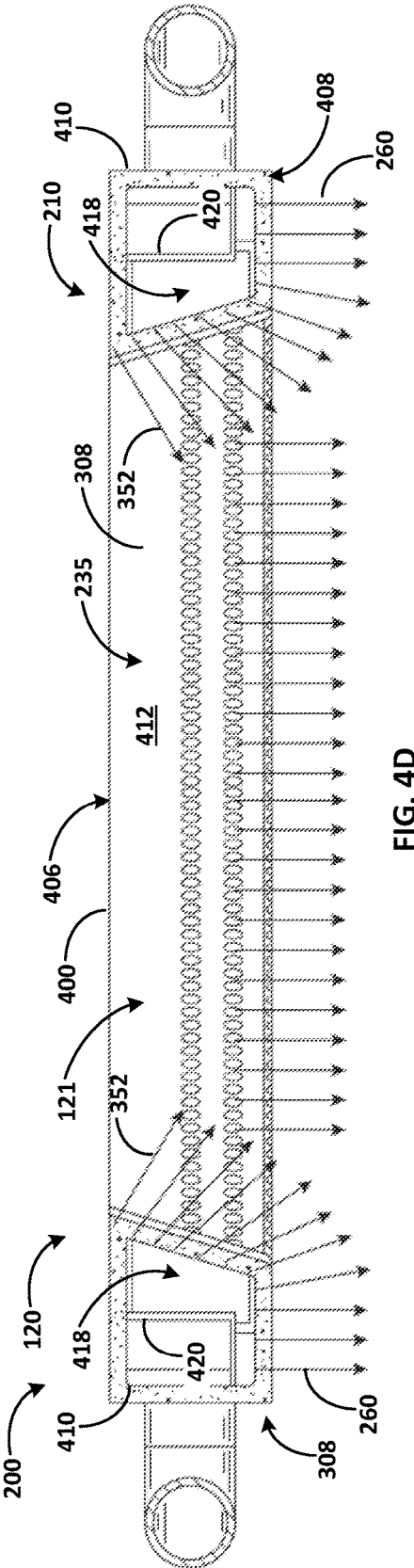
Figure 4E:
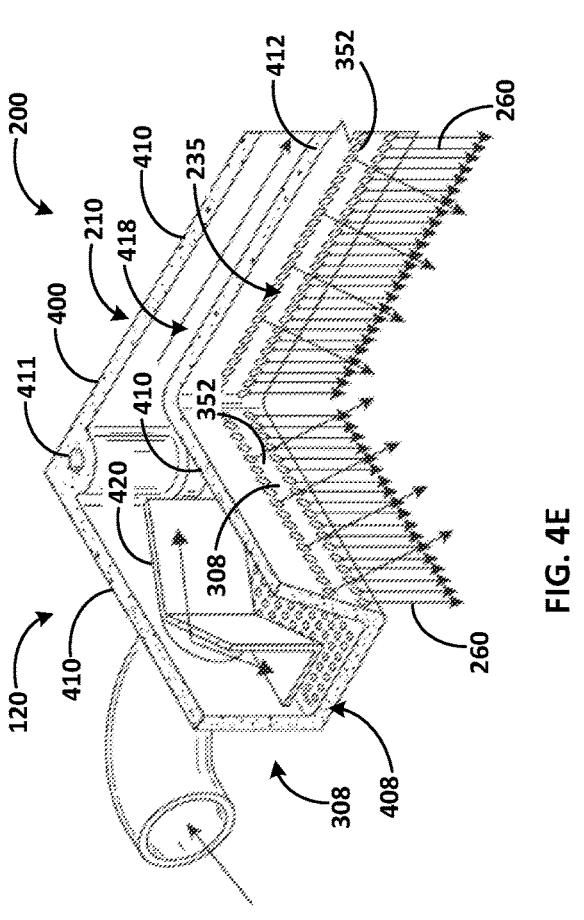
Figures 5A, 5B:
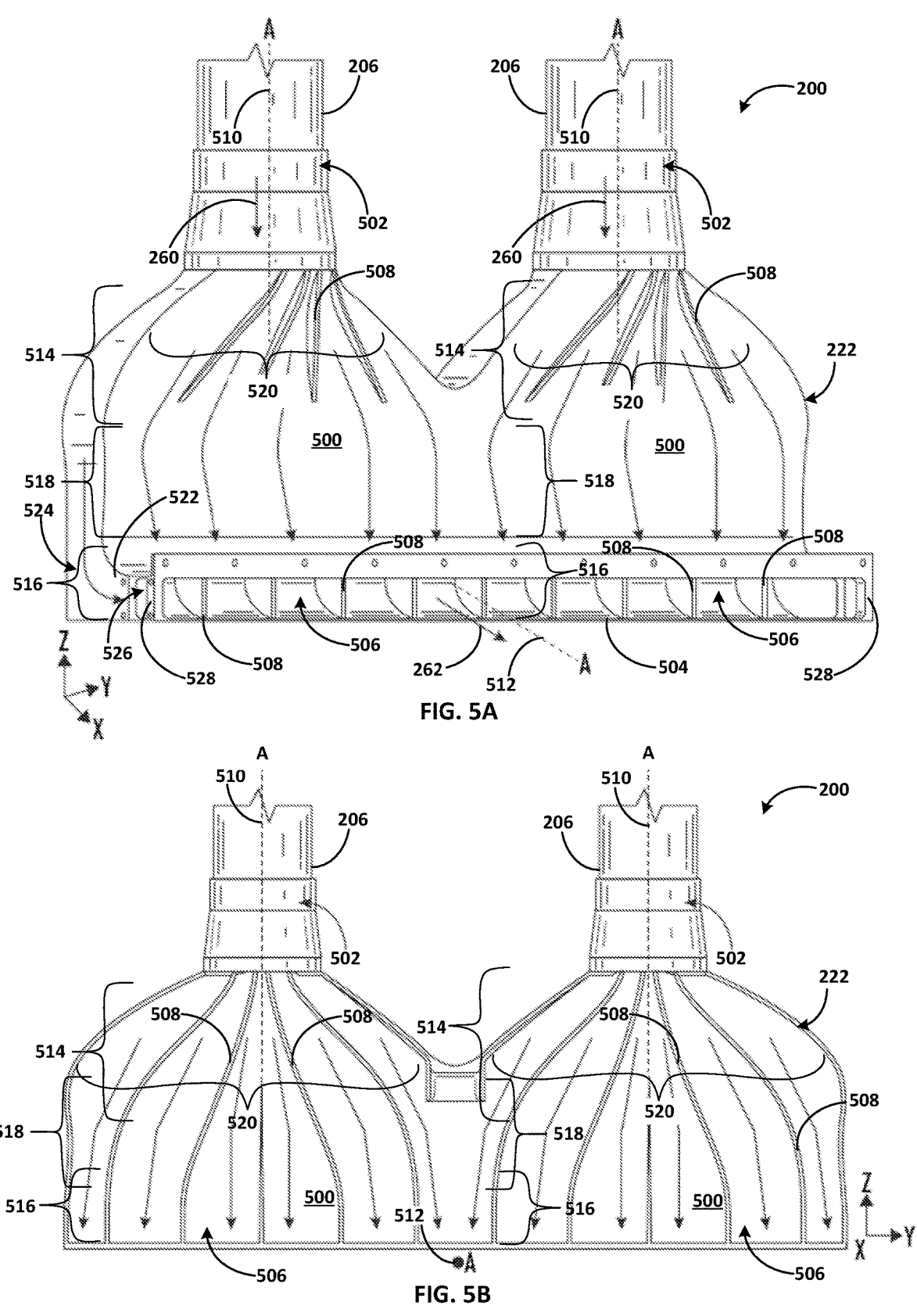
Figures 6A, 6B, 6C, 6D, 6E, 6F:
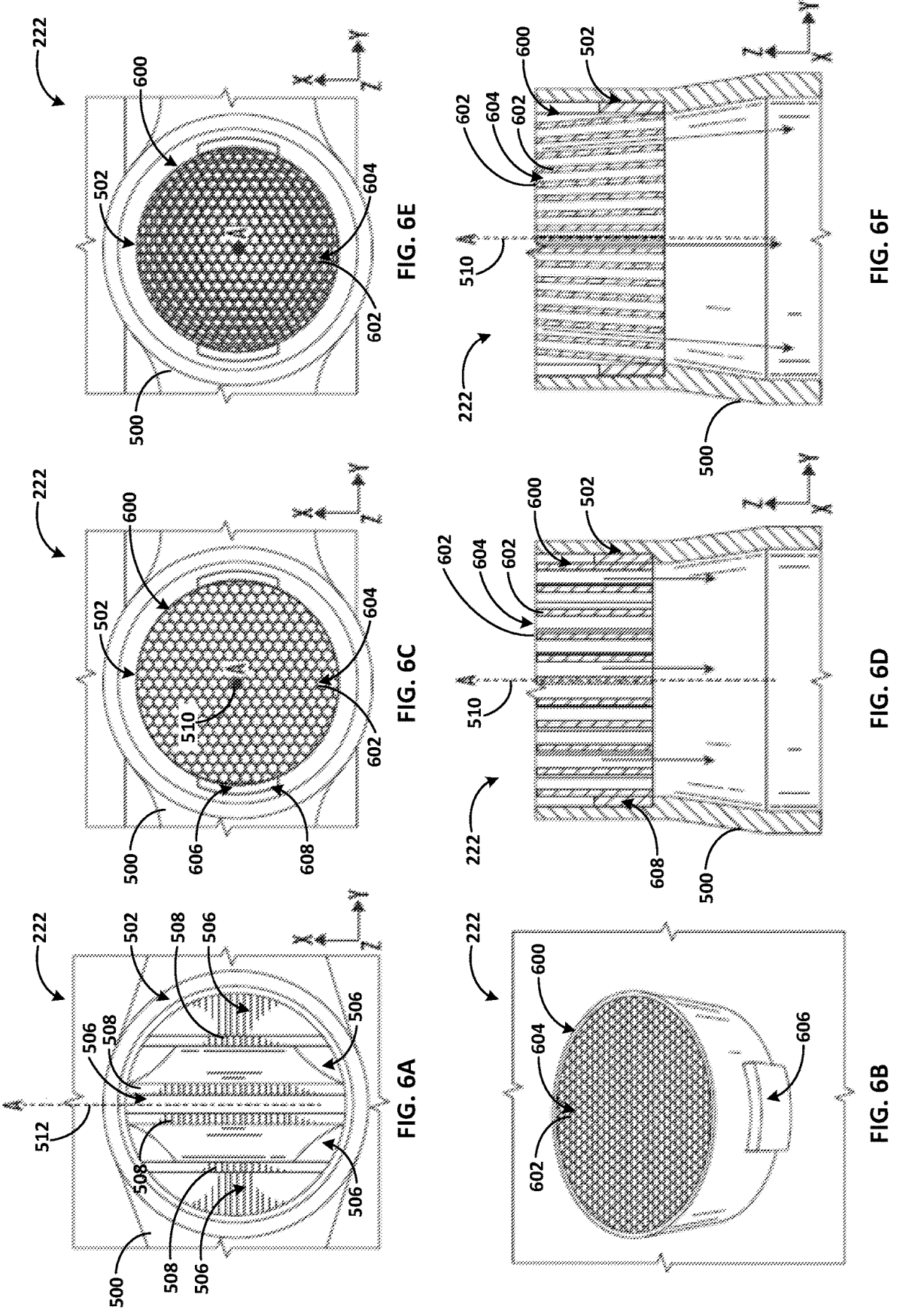
Figures 7A, 7B, 7C:
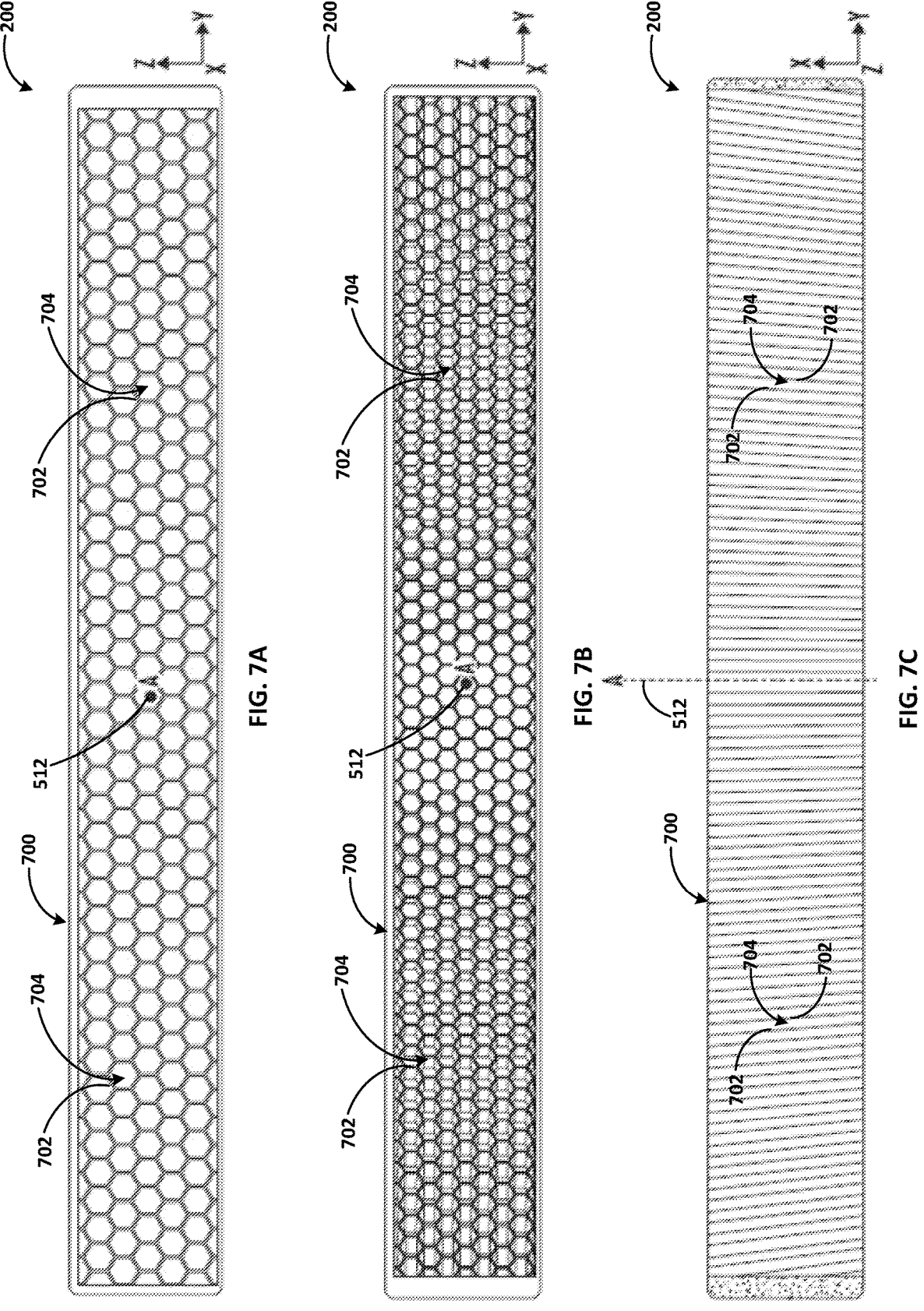
Figure 8A:
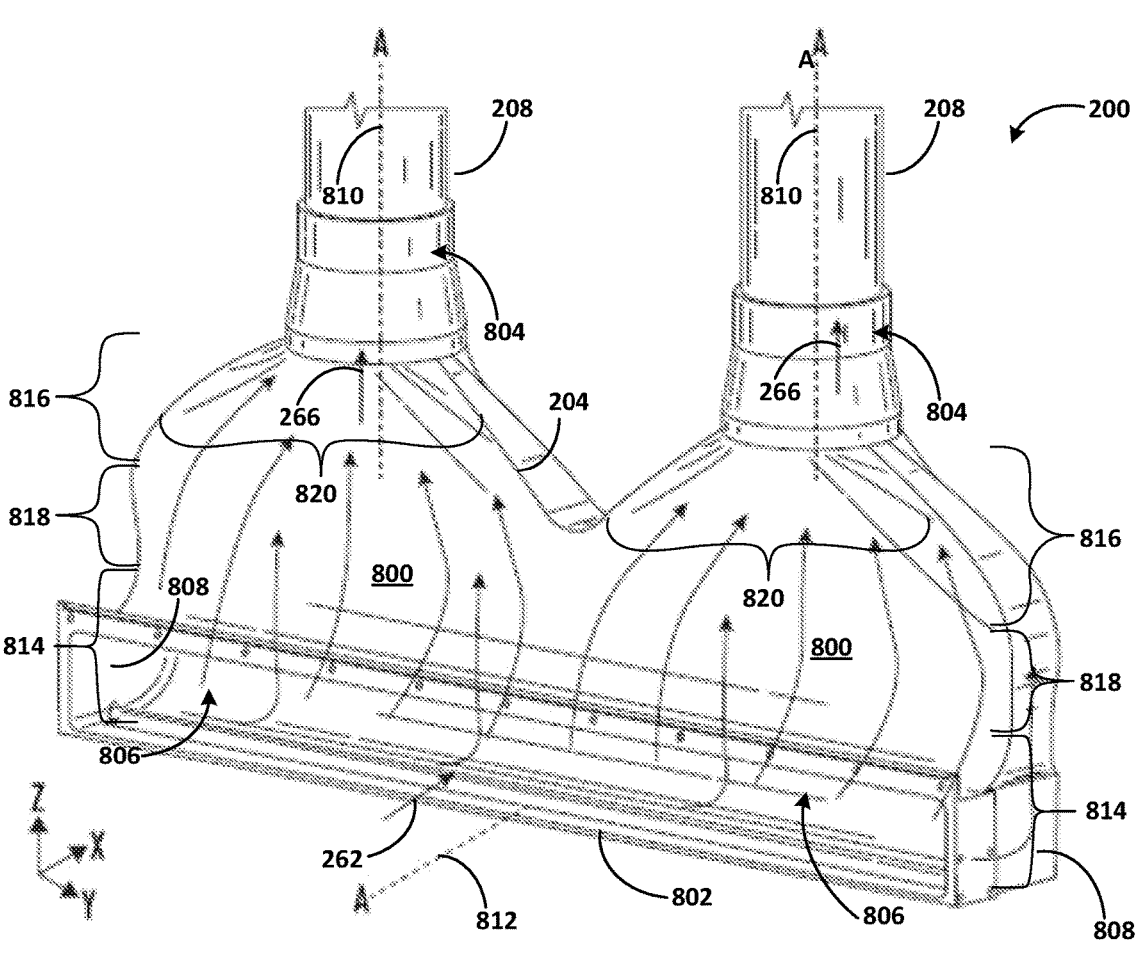
Figure 8B:
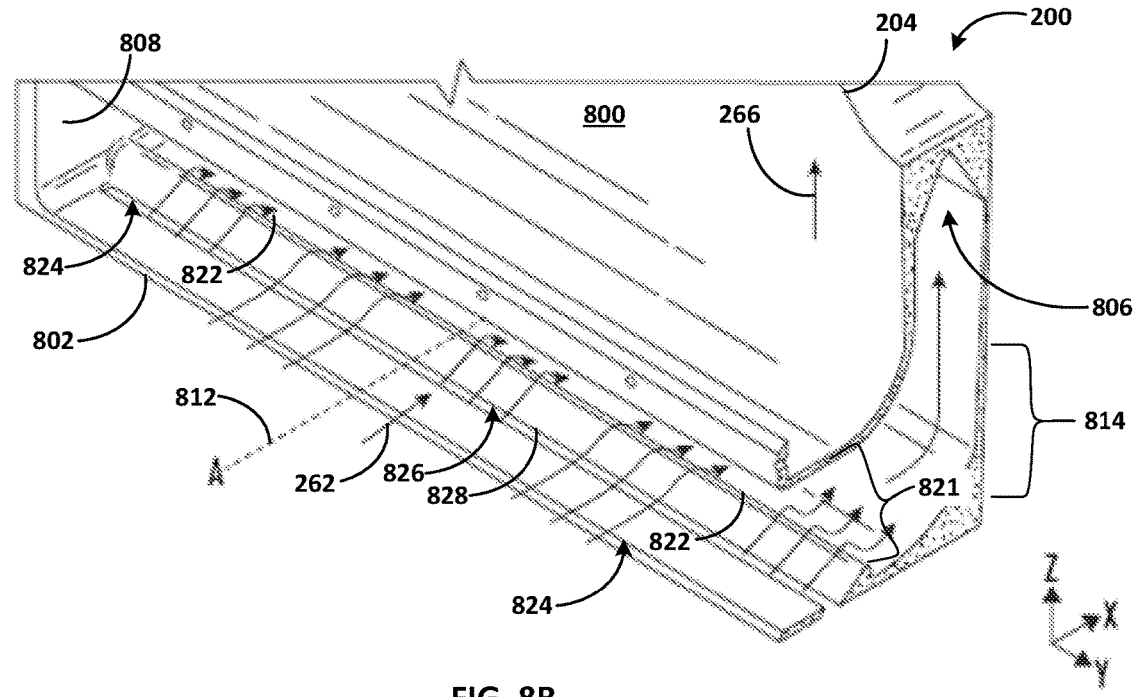
Figures 10D, 10E, 10F:
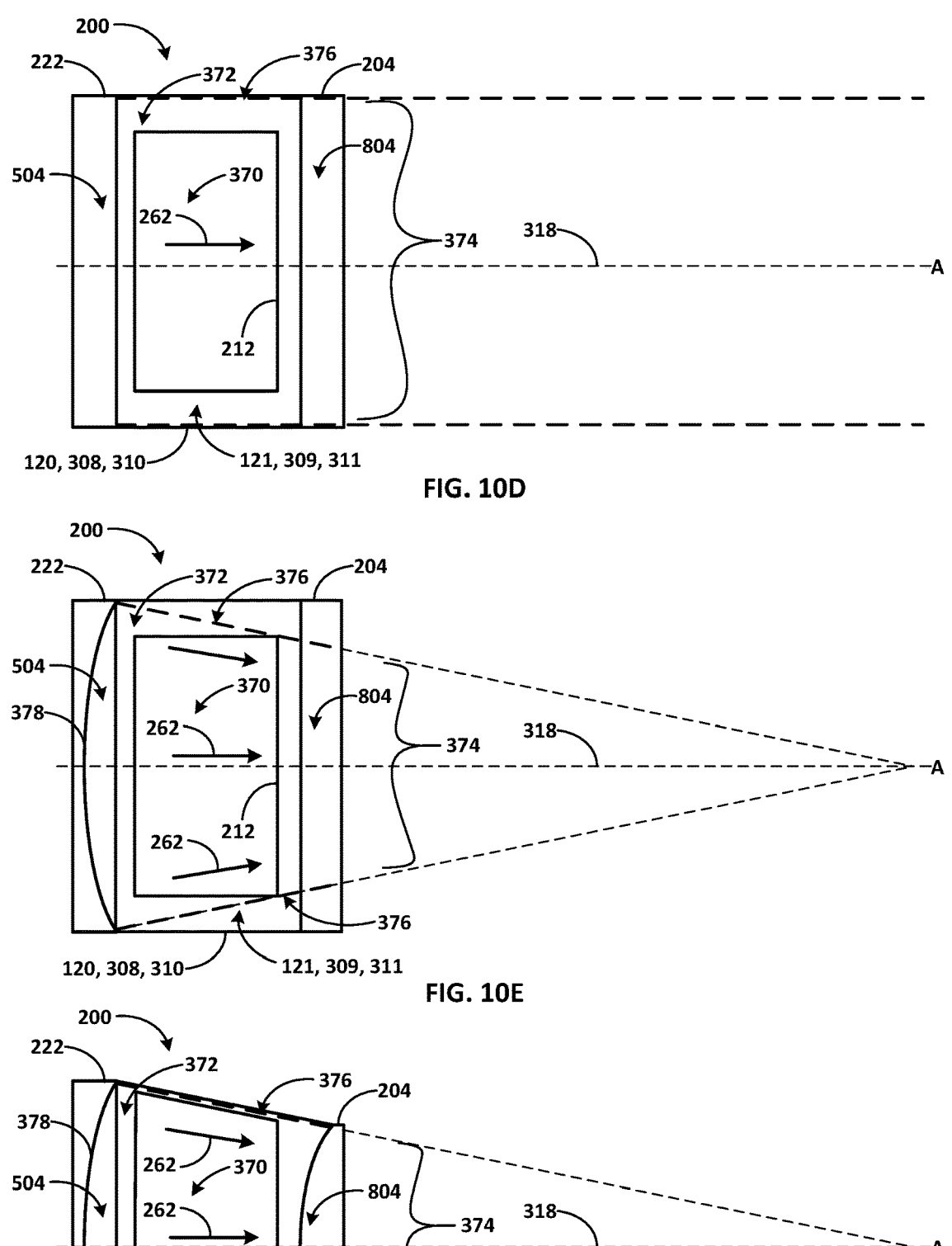
Figure 11:
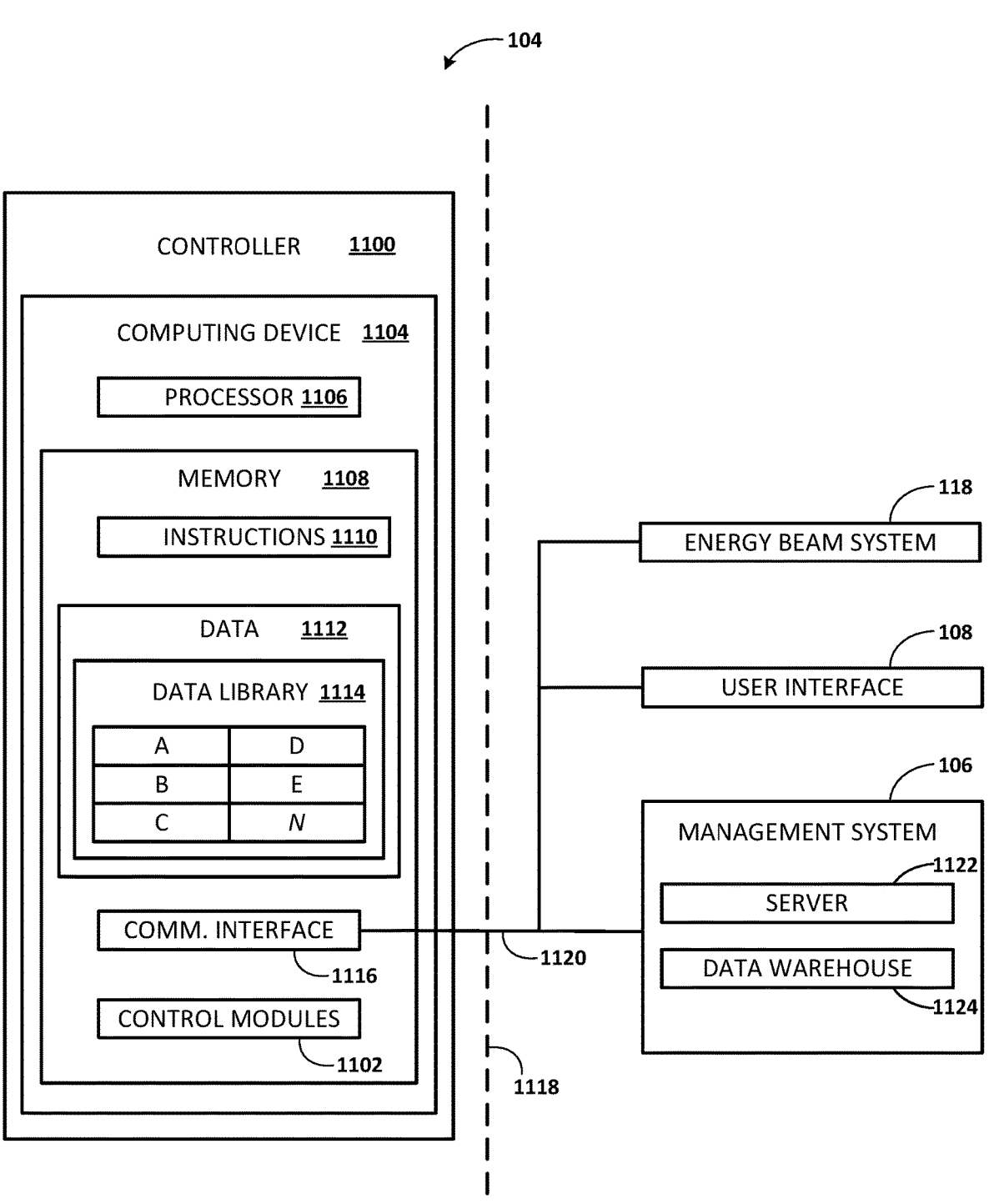

FIG. 2D schematically depicts a top view of a build unit and a build vessel of an additive manufacturing machine or system;

FIGS. 3A-3D, respectively, schematically depict a perspective view of an exemplary irradiation chamber of a build unit;

FIG. 4A schematically depicts a top perspective view of an exemplary downflow manifold for supplying downflow gas stream to a build unit;

FIG. 4B schematically depicts a cutaway top perspective view of an exemplary downflow manifold;

FIG. 4C schematically depicts a bottom perspective view of an exemplary downflow manifold;

FIG. 4D schematically depicts a cutaway side view of an exemplary downflow manifold;

FIG. 4E schematically depicts a cutaway perspective view of an exemplary downflow manifold;

FIG. 5A schematically depicts a perspective view of an exemplary crossflow manifold for supplying a crossflow gas stream to a build unit;

FIG. 5B schematically depicts a rear view of an exemplary crossflow manifold;

FIG. 6A schematically depicts a top view of an exemplary flow conditioning vanes of a crossflow manifold;

FIG. 6B schematically depicts a perspective view of an exemplary inlet flow conditioner for a crossflow manifold;

FIGS. 6C and 6D schematically depict a top view and a cross-sectional view, respectively, of an exemplary inlet flow conditioner inserted in a crossflow manifold;

FIGS. 6E and 6F schematically depict a top view and a cross-sectional view, respectively, of another exemplary inlet flow conditioner inserted in a crossflow manifold;

FIG. 7A schematically depicts a front view of an exemplary discharge flow conditioner for a crossflow manifold;

FIGS. 7B and 7C schematically depicts a front view and a top cross-sectional view, respectively, of another exemplary discharge flow conditioner for a crossflow manifold;

FIGS. 8A and 8B schematically depicts a front view and a cutaway perspective view, respectively, of an exemplary return manifold;

FIGS. 9A-9C schematically depict a perspective view, a facing view, and a side view, respectively, of an exemplary crossflow wall for a crossflow chamber of a build unit;

FIGS. 9D and 9E schematically depict a facing view, and a side view, respectively, of another exemplary crossflow wall for a crossflow chamber of a build unit;

FIGS. 10A and 10B schematically depict exemplary flow vectors superimposed upon front and side cross-sectional views, respectively, of an exemplary build unit;

FIG. 10C schematically depict exemplary flow vectors superimposed upon a top cross-sectional view taken at cross-section "A" shown in FIGS. 10A and 10B;

FIGS. 10D-10F schematically depict additional exemplary flow vectors superimposed upon a top cross-sectional view taken at cross-section "A" shown in FIGS. 10A and 10B;

FIG. 11 schematically depicts an exemplary control system for an additive manufacturing machine or system; and FIG. 12 shows a flow chart depicting an exemplary method of additively manufacturing a three-dimensional object.

Repeat use of reference characters in the present specification and drawings is intended to represent the same or analogous features or elements of the present disclosure.

DETAILED DESCRIPTION

The presently disclosed subject matter will now be described in further detail, in some instances with reference to one or more of the drawings. Examples are provided by way of explanation and should not be interpreted as limiting the present disclosure. In fact, it will be apparent to those skilled in the art that various modifications and variations can be made in the present disclosure without departing from the scope of the present disclosure. For instance, features illustrated or described in one portion of the present disclosure can be used with features illustrated or described in another portion of the present disclosure, including with modification and variations thereof. It is intended that the present disclosure covers such modifications and variations as come within the scope of the appended claims and their equivalents.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disposed herein are inclusive of the endpoints, and the endpoints are independently combinable with each other.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

As used herein, the term "build plane" refers to a plane defined by a surface upon which an energy beam impinges during an additive manufacturing process. Generally, the surface of a powder bed defines the build plane; however, during irradiation of a respective layer of the powder bed, a previously irradiated portion of the respective layer may define a portion of the build plane, and/or prior to distributing powder material across a build module, a build plate that supports the powder bed generally defines the build plane.

Additionally or alternatively suitable additive manufacturing technologies include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as fabrication of objects by building objects point-by-point, layer-by-layer, typically in a vertical direction; however, other methods of fabrication are contemplated and within the scope of the present disclosure. For example, although the discussion herein refers to the addition of material to form successive layers, the presently disposed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 $\mu$m and 200 $\mu$m, although the thickness may be selected based on any number of parameters and may be any suitable size.

The present disclosure generally pertains to build units for additive manufacturing systems or machines that include a process gas inertization system. The presently disclosed build units may be utilized with large format additive manufacturing systems or machines that include a build unit and a build vessel, for example, in which a cross-sectional surface area of the build vessel may significantly exceed the cross-sectional surface area of the build unit. The build unit and/or the build vessel may be movable relative to one another to additively manufacture relatively large objects and/or a relatively large quantity of objects within the build vessel.

The build unit may include an inertization system that includes an irradiation chamber that defines an irradiation plenum, one or more supply manifolds configured to supply process gas to one or more regions of the irradiation chamber, and one or more return manifolds configured to receive and/or evacuate process gas from one or more regions of the irradiation chamber. An energy beam system may be coupled to the irradiation chamber, and one or more optics windows may separate one or more optical elements of the energy beam system from the irradiation plenum defined by the irradiation chamber. The one or more supply manifolds may supply process gas, such as an inert gas, to the irradiation plenum, thereby providing an environment, such as an inert environment, suitable for irradiating powder material with one or more energy beams generated by the energy beam system. The one or more return manifolds may receive and/or evacuate process gas and contaminants from the irradiation plenum, such as soot, fumes, particulates, powder material, or other byproducts generated during the additive manufacturing operation.

The inertization system may be configured to provide one or more flow fields that improve the quality of the inertized environment within the irradiation chamber and/or that improve the efficiency with which process gas is utilized and/or the effectiveness in which contaminants are removed and/or evacuated from the process chamber. As used herein, the term "flow field" refers to a flow of process gas that has one or more determinable bulk flow characteristics, such as a directional vector, a velocity, a flow rate, a pressure, a boundary layer, and so forth.

An exemplary inertization system may include one or more downflow manifolds that may provide a flow field of process gas, such as a downward flow field, that prevents contaminants within the irradiation chamber from contacting and/or depositing upon components of the energy beam system and/or that reduces the quantity of contaminants that contact and/or deposit upon components of the energy beam system over time. Additionally, or in the alternative, an inertization system may include one or more crossflow manifolds that provide a flow field of process gas, such as a lateral flow field, that quickly removes or evacuates contaminants generated when an energy beam irradiates powder material, for example, without the flow field disturbing the powder bed. Further, an inertization system may include one or more return manifolds that efficiently remove and/or evacuate process gas and/or contaminants from the irradiation chamber, for example, without allowing much process gas to escape from the inertization system.

Figure 1A:
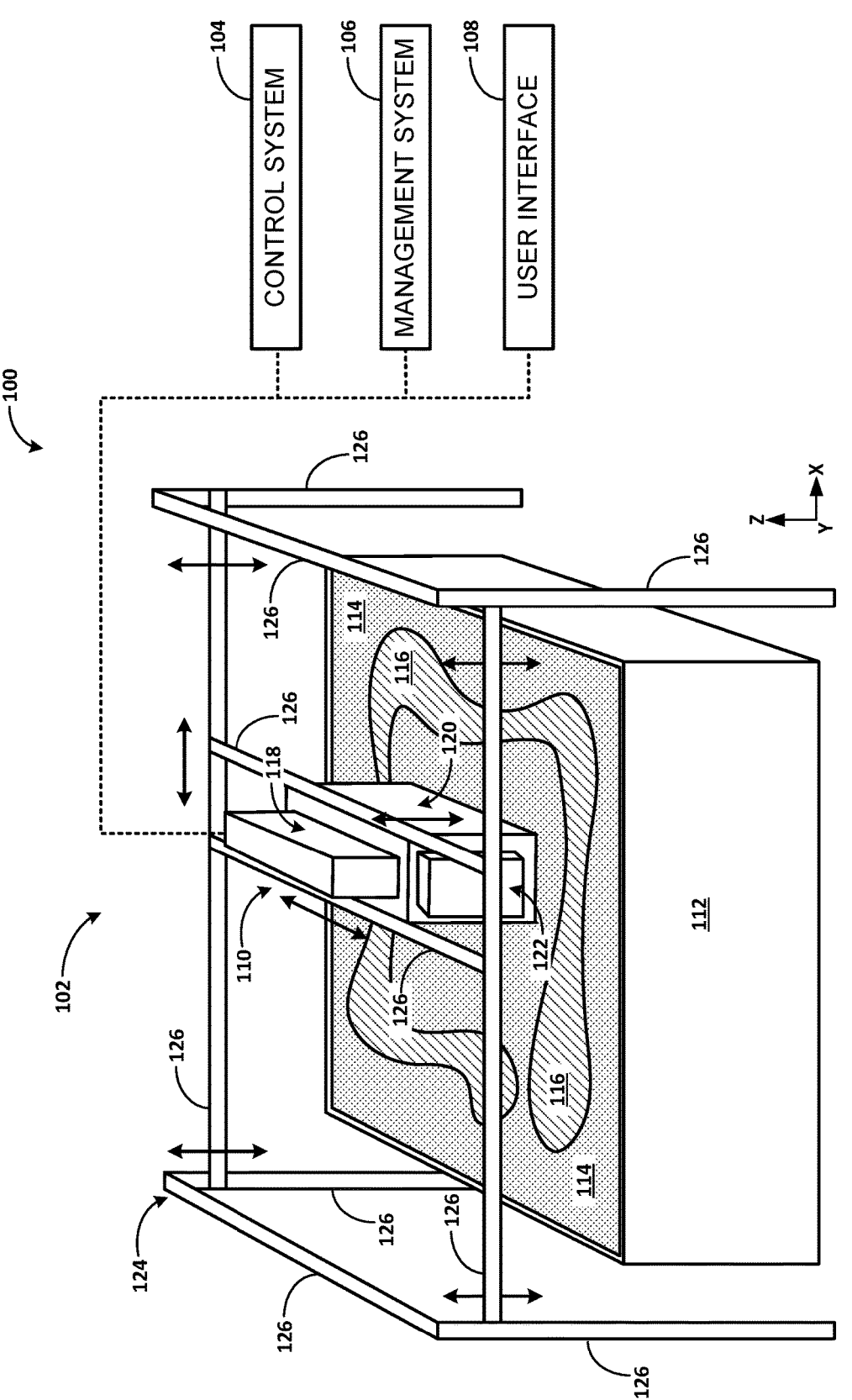
FIGS. 1A and 1B schematically depict exemplary additive manufacturing systems.
Figure 1B:
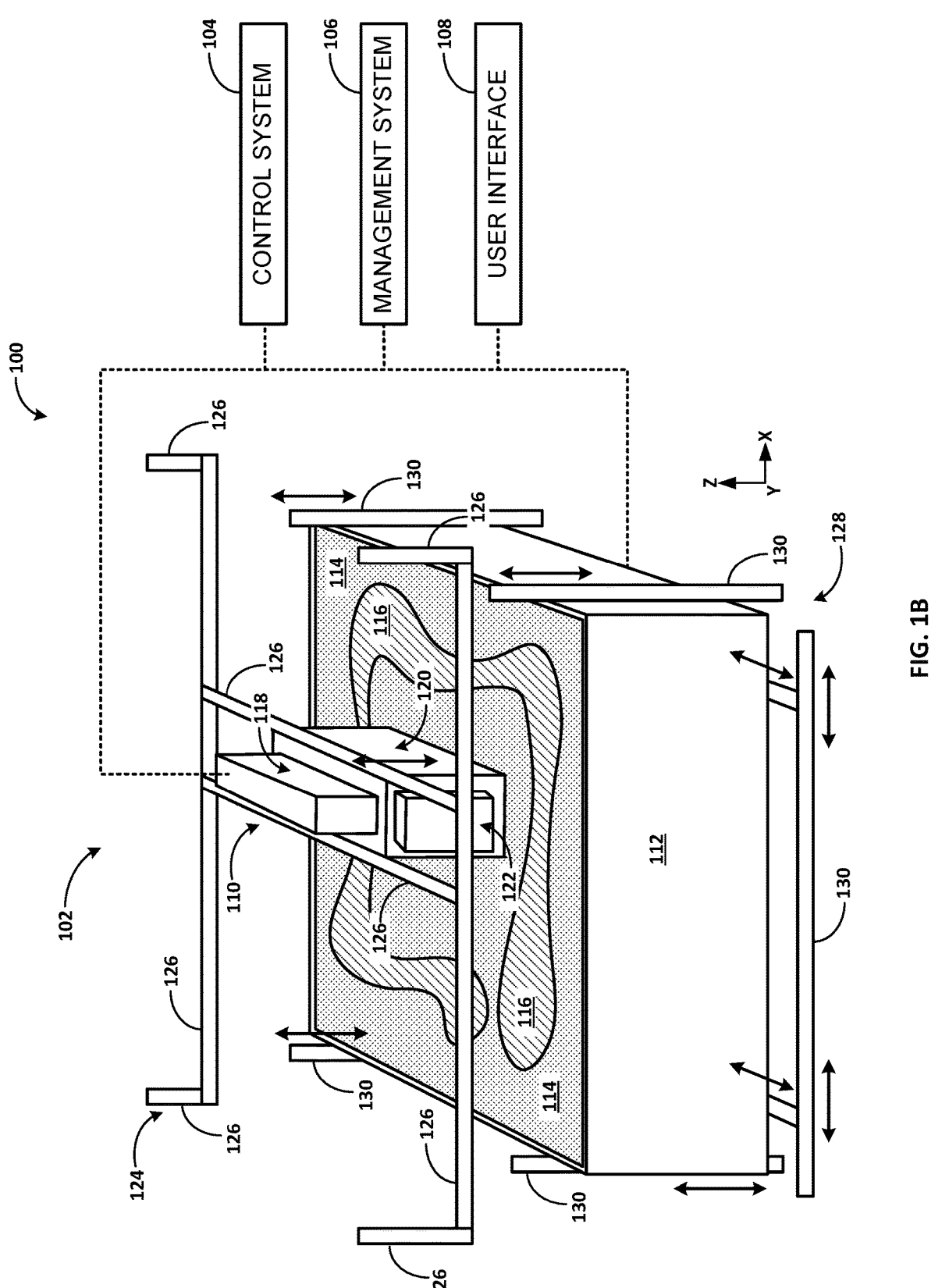

The presently disclosed subject matter will now be described in further detail. FIGS. 1A and 1B schematically depict exemplary embodiments of an additive manufacturing system 100. The additive manufacturing system 100 may include one or more additive manufacturing machines 102. The one or more additive manufacturing machines 102 may include a control system 104. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

An additive manufacturing machine 102 may include one or more build units 110. Additionally, or in the alternative, an additive manufacturing machine 102 may include a build vessel 112. The one or more build units 110 may be configured to supply powder material 114 to the build vessel 112. Additionally, or in the alternative, the one or more build units 110 may be configured to selectively solidify the powder material 114 to additively manufacture a three-dimensional object 116. As shown in FIGS. 1A and 1B, an exemplary build unit 110 may include an energy beam system 118, an irradiation chamber 120, and a powder module 122. The energy beam system 118 and the irradiation chamber 120 may be operably coupled to one another. An irradiation chamber 120 and a powder module 122 may be operably coupled to one another. Additionally, or in the alternative, an irradiation chamber 120 and a powder module 122 may be provides as separate build units 110.

The additive manufacturing system 100 or additive manufacturing machine 102 may be configured for large format additive manufacturing. For example, a build vessel 112 and/or one or more objects 116 additively manufactured therein may have a cross-sectional area that exceeds the cross-sectional area of the one or more build units 110 utilized to additively manufacture the one or more objects 116. The one or more build units 110 and/or the build vessel 112 may be movable relative to perform large-format additive manufacturing operations.

As shown in FIG. 1A, the one or more build units 110 may be operably coupled to a build unit-positioning system 124. The build unit-positioning system 124 may be configured to move the one or more build units 110 to specified build coordinates and/or along specified build vectors corresponding to a three-dimensional cartesian coordinate system in accordance with control commands provided, for example, by the control system 104. The control commands may be provided, for example, to carry out operations of the one or more build units 110 in accordance with the present disclosure. The build unit-positioning system 124 may include one or more build unit-gantry elements 126 configured to movably support the one or more build units 110. Respective build unit-gantry elements 126 may be configured to move the one or more build units 110 in one or more directions, such as an X-direction, a Y-direction, and/or a Z-direction.

As shown in FIG. 1B, the one or more build vessels 112 may be operably coupled to a build vessel-positioning system 128. The build vessel-positioning system 128 may be configured to move the build vessel 112 to specified build coordinates and/or along specified build vectors corresponding to a three-dimensional cartesian coordinate system in accordance with control commands provided, for example, by the control system 104. The control commands may be provided, for example, to carry out operations of the one or more build units 110 in accordance with the present disclosure. The build vessel-positioning system 128 may include one or more build vessel-gantry elements 130 configured to movably support the build vessel 112. Respective build vessel-gantry elements 130 may be configured to move the build vessel 112 in one or more directions, such as an X-direction, a Y-direction, and/or a Z-direction.

The one or more build vessels 112 may be operably coupled to a build vessel-positioning system 128 in addition to, or in the alternative to, one or more build units 110 operably coupled to a build unit-positioning system 124. For example, an additive manufacturing machine 102 may include a build vessel-positioning system 128 and one or more stationary build units 110. Additionally, or in the alternative, an additive manufacturing machine 102 may include a build vessel-positioning system 128 and a build unit-positioning system 124. The build vessel-positioning system 128 may be configured to move a build vessel 112 in one or more directions, and the build vessel-positioning system 128 may be configured to move a build vessel 112 in one or more directions. For example, the build vessel-positioning system 128 may be configured to move a build vessel 112 in an X-direction and/or a Y-direction. Additionally, or in the alternative, the build unit-positioning system 124 may be configured to move a build unit 110 in a Z-direction.

A build vessel-positioning system 128 may be configured to move a build vessel 112 horizontally while one or more build units 110 selectively irradiate portions of the powder material 114 in the build vessel 112. For example, the build vessel-positioning system 128 may be configured to move a build vessel 112 in accordance with an X-Y coordinate system. Additionally, or in the alternative, a build unit-positioning system 124 may be configured to move a build unit 110 horizontally while the build unit 110 selectively irradiates portions of the powder material 114 in the build vessel 112. For example, the build vessel-positioning system 128 may be configured to move a build vessel 112 in accordance with an X-Y coordinate system. A vertical position of the one or more build units 110 and/or the build vessel 112 may be augmented in connection with the addition of sequential layers of powder material 114 to the build vessel 112 and selective irradiation of the respective layers of powder material 114 in the build vessel 112. The build vessel-positioning system 128 may be configured to sequentially move the build vessel 112 vertically to provide room for the next sequential layer of powder material 114 to be added to the build vessel 112. Additionally, or in the alternative, the build unit-positioning system 124 may be configured to sequentially move a build unit 110 vertically to provide room for the next sequential layer of powder material 114 to be added to the build vessel 112. Movements of the build unit 110 and/or the build vessel 112 may be carried out before, during, or after, irradiating a sequential layer of powder material 114.

Referring now to FIGS. 2A-2D, aspects of an exemplary additive manufacturing system 100 and/or additive manufacturing machine 102 will be further described. As shown in FIGS. 2A-2D, an additive manufacturing system 100 and/or an additive manufacturing machine 102 may include one or more build units 110 situated above a build vessel 112. An exemplary build unit 110 may include an energy beam system 118, an irradiation chamber 120, and an inertization system 200. As shown, for example, in FIGS. 2B an 2D, a build unit 110 may additionally or alternatively include one or more powder modules 122.

As shown in FIGS. 2A-2D, the inertization system 200 may include one or more supply manifolds 202 configured to supply process gas to one or more regions of the irradiation chamber 120. Additionally, or in the alternative, the inertization system 200 may include one or more return manifolds 204 configured to receive and/or evacuate process gas from one or more regions of the irradiation chamber 120. The irradiation chamber 120 may define a plenum or space containing process gas, such as an inert gas, thereby providing an environment, such as an inert environment, suitable for irradiating powder material 114 with one or more energy beams. The plenum or space within the irradiation chamber 120 may sometimes be referred to as an irradiation plenum 121. Process gas may enter the irradiation plenum 121 defined by the irradiation chamber 120 through one or more supply manifolds 202. Process gas may exit the irradiation chamber 120 through one or more return manifolds 204. Process gas may flow through the irradiation chamber 120, traversing the irradiation plenum 121, along a flowpath from respective ones of the one or more supply manifolds 202 to one or more of the respective ones of the one or more return manifolds 204. The one or more supply manifolds 202 and/or the one or more return manifolds 204 may be operably coupled to the irradiation chamber 120.

Additionally, or in the alternative, the one or more supply manifolds 202 and/or the one or more return manifolds 204 may be integrally formed with at least a portion of the irradiation chamber 120 as a single component. Further additionally, or as another alternative, the one or more supply manifolds 202 and/or the one or more return manifolds 204 may define at least a portion of the irradiation chamber 120.

Process gas may be supplied to one or more supply manifolds 202 by one or more process gas supply lines 206. Process gas may be removed or evacuated from one or more return manifolds 204 by one or more process gas evacuation lines 208. The inertization system 200 may include one or more fans, pumps, or the like (not shown) configured to supply a flow of process gas to the process gas supply lines 206. The inertization system 200 may include a process gas recirculation system (not shown) configured to recirculate process gas, such as from the one or more process gas evacuation lines 208 and back to the one or more process gas supply lines 206. The recirculation system may include one or more screens, filters, or the like not shown) configured to remove contaminants such as soot, fumes, particulates, powder material, or other byproducts from the powder material and/or the process gas that may be generated when irradiating powder material. The recirculated process gas may be filtered, screened, or the like prior to being supplied to the one or more supply manifolds 202 and/or prior to being supplied to the one or more process gas supply lines 206.

An inertization system 200 may include one or more supply manifolds 202 configured and arranged as a downflow manifold 210. One or more downflow manifolds 210 may be configured to provide a downward flow of process gas through at least a portion of the irradiation chamber 120. A downflow manifold 210 may fluidly communicate with one or more process gas supply lines 206. As shown, for example, in FIGS. 2A and 2C, a downflow manifold 210 may be disposed about an upward portion of the irradiation chamber 120, such as a distal portion of the irradiation chamber 120 relative to a build vessel 112. A downflow manifold 210 may be coupled to the irradiation chamber 120. Additionally, or in the alternative, a downflow manifold 210 may be integrally formed with at least a portion of the irradiation chamber 120 as a single component. Further additionally, or as another alternative, a downflow manifold 210 may define at least a portion of an irradiation chamber 120.

As shown, for example, in FIGS. 2A and 2C, a supply manifold 202, such as a downflow manifold 210, may surround at least a portion of a scan field 212 of one or more energy beams 214 of an energy beam system 118. Additionally, or in the alternative, a supply manifold 202, such as a downflow manifold 210, may surround at least a portion of one or more irradiation devices 216 of an energy beam system 118. Additionally, or in the alternative, a supply manifold 202, such as a downflow manifold 210, may surround at least a portion of one or more monitoring devices 218 of an energy beam system 118. The one or more monitoring devices 218 may be integrated with an irradiation device 216 as part of a combined device (e.g., FIG. 2A) and/or the one or more monitoring devices 218 and the one or more irradiation devices 216 may be provided as respectively separate devices (e.g., FIG. 2D).

One or more components of an energy beam system 118 may be coupled to a supply manifold 202, such as a downflow manifold 210. For example, an energy beam system housing 220 may be coupled to a supply manifold 202. The energy beam system housing 220 may include housing elements corresponding to one or more irradiation devices 216 and/or housing elements corresponding to one or more monitoring devices 218. Additionally, or in the alternative, one or more components of an energy beam system 118, such as an energy beam system housing 220, may be integrally formed with at least a portion of a supply manifold 202, such as a downflow manifold 210, as a single component. Further additionally, or as another alternative, one or more components of an energy beam system 118, such as an energy beam system housing 220, may define at least a portion of a supply manifold 202, such as a downflow manifold 210.

A supply manifold 202, such as a downflow manifold 210, may provide a flow of process gas configured to protect components of the energy beam system 118 from contaminants within the irradiation chamber 120. For example, downward flow of process gas from a downflow manifold 210 may protect components of the energy beam system 118 from contaminants within the irradiation chamber 120. The downward flow of process gas from the downflow manifold 210 may provide a flow field that prevents contaminants within the irradiation chamber 120 from contacting and/or depositing upon components of the energy beam system 118 and/or that reduces the quantity of contaminants that contact and/or deposit upon components of the energy beam system 118 over time. In addition, or as an alternative to a downward flow, a supply manifold 202 such as a downflow manifold 210 may provide a crossflow of process gas. A crossflow of process gas may also protect components of the energy beam system 118 from contaminants within the irradiation chamber 120, including preventing contaminants from contacting and/or depositing upon components of the energy beam system 118 and/or reducing the quantity of contaminants that contact and/or deposit upon components of the energy beam system 118 over time.

An inertization system 200 may include one or more supply manifolds 202 configured and arranged as a crossflow manifold 222. One or more crossflow manifolds 222 may be configured to provide a lateral flow of process gas through at least a portion of the irradiation plenum 121 defined by the irradiation chamber 120. One or more process gas supply lines 206 may fluidly communicate with a crossflow manifold 222. A process gas supply line 206 may supply a first portion of a stream of process gas to a downflow manifold 210 and a second portion of the stream of process gas to a crossflow manifold 222.

As shown, for example, in FIGS. 2B and 2C, a crossflow manifold 222 may be disposed about a downward portion of the irradiation chamber 120, such as a proximal portion of the irradiation chamber 120 relative to a build vessel 112. A crossflow manifold 222 may be disposed laterally adjacent to a proximal portion of the irradiation chamber 120. A crossflow manifold 222 may be coupled to the irradiation chamber 120. Additionally, or in the alternative, a crossflow manifold 222 may be integrally formed with at least a portion of the irradiation chamber 120 as a single component. Further additionally, or as another alternative, a crossflow manifold 222 may define at least a portion of an irradiation chamber 120.

In addition to one or more supply manifolds 202, an inertization system 200 may include one or more return manifolds 204 configured to receive and/or evacuate process gas from the irradiation plenum 121 defined by the irradiation chamber 120.

As shown, for example, in FIG. 2C, a return manifold 204 may be disposed about a downward portion of the irradiation chamber 120, such as a proximal portion of the irradiation chamber 120 relative to a build vessel 112. A return manifold 204 may be disposed laterally adjacent to a proximal portion of the irradiation chamber 120. A return manifold 204 may be coupled to the irradiation chamber 120. Additionally, or in the alternative, a return manifold 204 may be integrally formed with at least a portion of the irradiation chamber 120 as a single component. Further additionally, or as another alternative, a return manifold 204 may define at least a portion of an irradiation chamber 120. A return manifold 204 may be disposed opposite a crossflow manifold 222. For example, a crossflow manifold 222 and a return manifold 204 may be disposed about respectively opposite sides of an irradiation chamber 120. A lateral flow of process gas from a crossflow manifold 222 may be directed at the return manifold 204. Additionally, or in the alternative, a downward flow from a downflow manifold 210 may be directed at a return manifold 204.

The one or more return manifolds 204 may be configured to work in combination with one or more supply manifolds 202. For example, one or more return manifolds 204 may be configured and arranged to receive a flow of process gas flowing through at least a portion of the irradiation plenum 121 defined by the irradiation chamber 120, such as a flow of process gas supplied from at least one of the one or more supply manifolds 202. A return manifold 204 may be configured to receive a flow of process gas supplied by one or more crossflow manifolds 222, such as a lateral flow of process gas from the one or more crossflow manifolds 222. Additionally, or in the alternative, a return manifold 204 may be configured to receive a flow of process gas supplied by one or more downflow manifolds 210, such as a downward flow of process gas from the one or more downflow manifolds 210. A crossflow of process gas, such as from a crossflow manifold 222 to a return manifold 204, may be configured to provide a flow field that quickly remove and/or evacuate contaminants generated by an energy beam irradiating powder material, for example, without disturbing the powder bed 227. The flow field provided by a crossflow manifold 222 may remove and/or evacuate contaminants from the irradiation plenum 121 defined by the irradiation chamber 120 before the contaminants have an opportunity to propagate to an upward region of the irradiation plenum 121 where components of the energy beam system are located. Contaminants that are not entrained in the lateral flow field may be redirected and/or accelerated into the lateral flow field by a downward flow field from a downflow manifold 210.

An inertization system 200 may include one or more supply manifolds 202 operably grouped with one or more return manifolds 204 with respect to a crossflow and/or a downflow. As shown in FIGS. 2A-2D, an inertization system 200 may include one or more supply manifolds 202, such as one or more downflow manifolds 210 and/or one or more crossflow manifolds 222, grouped with one or more corresponding return manifolds 204. As shown, for example, in FIG. 2C, a first crossflow manifold 222 may be paired with a first return manifold 204 with respect to a first crossflow, such as a first lateral crossflow. Additionally, or in the alternative, a second crossflow manifold 222 may be paired with a second return manifold 204 with respect to a second crossflow, such as a second lateral crossflow. The first crossflow may have a flow field oriented in a first lateral direction and the second crossflow may have a second flow field oriented in a second lateral direction that differs from the first lateral direction. For example, the first lateral direction may differ from the second lateral direction by about 90 degrees, such as from about 30 degrees to about 150 degrees.

As shown, for example, in FIG. 2B, a plurality of crossflow manifolds 222 may be disposed adjacent to one another. Additionally, or in the alternative, a crossflow manifold 222 may be coupled to a plurality of process gas supply lines 206. The plurality of process gas supply lines 206 may fluidly communicate with the one or more crossflow manifolds 222 at an interval along a width of the one or more process gas supply lines 206. A supply manifold header 224 may distribute process gas between one or more supply manifolds 202. For example, as shown, a supply manifold header 224 may distribute process gas between a downflow manifold 210 and a crossflow manifold 222. A supply manifold header 224 may include one or more supply header conjunction elements 226.

A supply manifold header 224 may include a plurality of process gas supply lines 206 configured as supply manifold distribution elements 205, such as a plurality of crossflow manifold distribution elements 207 and/or a plurality of downflow manifold distribution elements 209. By way of example, as shown, a supply manifold header 224 may include a first crossflow manifold distribution element 207 and a second crossflow manifold distribution element 207. Additionally, or in the alternative, as shown, a supply manifold header 224 may include a first downflow manifold distribution element 209 and a second downflow manifold distribution element 209. One or more of the plurality of supply manifold distribution elements 205 may fluidly communicate with one another, for example, by way of one or more supply header conjunction elements 226. For example, a first end of a supply header conjunction element 226 may fluidly communicate with a first crossflow manifold distribution element 207 and a second end of a supply header conjunction element 226 may fluidly communicate with a second crossflow manifold distribution element 207. Additionally, or in the alternative, a first end of a supply header conjunction element 226 may fluidly communicate with a downflow manifold distribution element 209 and a second end of a supply header conjunction element 226 may fluidly communicate with a second downflow manifold distribution element 209. One or more supply header conjunction elements 226 may allow a flow of process gas to distribute proportionally between respective crossflow manifold distribution elements 207 and/or between respective pathways of a crossflow manifold 222.

A supply manifold header 224 may include one or more multiway fittings 228. The one or more multiway fittings 228 may distribute process gas to the plurality of supply manifold distribution elements 205, such as to a plurality of crossflow manifold distribution elements 207 and/or a plurality of downflow manifold distribution elements 209. A supply manifold header 224 may be configured and arranged to provide a desired flow rate flow rate of process gas, and/or to equalize a flow rate of process gas, as between the plurality of supply manifold distribution elements 205, such as between a plurality of crossflow manifold distribution elements 207 and/or a plurality of downflow manifold distribution elements 209. For example, the respective supply manifold distribution elements 205 may have respective internal diameters selected to provide a desired flow rate flow rate of process gas, and/or to equalize a flow rate of process gas as between respective supply manifold distribution elements 205. Additionally, or in the alternative, a supply manifold header 224 may include one or more supply header valves 230. The one or more supply header valves 230 may be configured to regulate a flow of process gas between one or more supply manifolds 202, such as between a downflow manifold 210 and one or more crossflow manifolds 222. One or more supply header valves 230 may be integrated into a respective one of one or more multiway fittings 228. Additionally, or in the alternative, one or more one or more supply header valves 230 may be provided separately from one or more multiway fittings 228. A supply header valve 230 may be actuated manually or automatically. For example, one or more supply header valves may be controlled by a control system 104, such as to provide a desire flow rate of process gas, and/or to equalize a flow rate of process gas, as between the plurality of supply manifold distribution elements 205, such as between a plurality of crossflow manifold distribution elements 207 and/or a plurality of downflow manifold distribution elements 209.

As shown in FIG. 2C, a flow of process gas from the one or more process gas supply line 206 to the crossflow manifold 222 may have a downward directional vector 260. Additionally, or in the alternative, process gas flowing from one or more downflow manifolds 210 into the irradiation plenum 121 defined by the irradiation chamber 120 may have a downward directional vector 260. A flow of process gas flowing across the irradiation plenum 121 defined by the irradiation chamber 120, such as from a crossflow manifold 222 to a return manifold 204, may have a lateral directional vector 262. A crossflow manifold 222 may be configured to conform a flow of process gas from one or more process gas supply lines 206 having a downward directional vector 260 into a flow of process gas having a lateral directional vector 262, for example, to supply a crossflow of process gas to the irradiation chamber 120. Process gas flowing through the crossflow manifold 222 may have a laterally accelerating directional vector 264, for example, as the directional flow of the process gas changes from a downward direction to a lateral direction. The process gas flowing laterally across the irradiation plenum 121 defined by the irradiation chamber 120 may flow into one or more return manifolds 204. Process gas with a lateral directional vector 262, such as from one or more crossflow manifolds 222, may flow laterally into one or more return manifolds 204. Process gas flowing through the irradiation plenum 121 with a downward directional vector 260, such as from one or more downflow manifolds 210, may also flow into one or more return manifolds 204. The downward directional vector 260 of such process gas may be at least partially conformed to a lateral directional vector 262, for example, by way of entrainment by a crossflow of process gas from the one or more crossflow manifolds 222 and/or by way of suction from the one or more return manifolds 204. Process gas flowing from the irradiation plenum 121 into a return manifold 204 may have a laterally accelerating directional vector 264, for example, as the directional flow of the process gas changes from a downward direction to a lateral direction. A return manifold 204 may be configured to conform a flow of process gas having a lateral directional vector 262 entering the return manifold 204 to a flow of process gas having an upward directional vector 266 flowing from the return manifold into one or more process gas evacuation lines 208, for example, to remove and/or evacuate process gas from the irradiation plenum 121 defined by the irradiation chamber 120. Process gas flowing through the return manifold 204 may have an upward accelerating directional vector 268, for example, as the directional flow of the process gas changes from a lateral direction to an upward direction.

An inertization system 200 may include a plurality of supply manifolds 202 and corresponding return manifolds 204 oriented at a series of longitudinal positions of the irradiation chamber 120. For example, a first supply manifold 202, such as a crossflow manifold 222, and a first return manifold 204, may be respectively oriented about a first longitudinal region of the irradiation chamber 120. A second supply manifold 202, such as a crossflow manifold 222, and a second return manifold 204, may be respectively oriented at a second longitudinal region of the irradiation chamber 120. The first longitudinal region may include a relatively proximal portion of the irradiation chamber 120 relative to the build vessel 112, and the second longitudinal region may include a relatively midward portion of the irradiation chamber 120 and/or a relatively distal portion of the irradiation chamber 120 relative to the first longitudinal region and/or relative to the build vessel 112. The first supply manifold 202 may provide a first crossflow that has a flow field oriented in a first lateral direction, and the second supply manifold 202 may provide a second crossflow that has a second flow field oriented in a second lateral direction that differs from the first lateral direction, for example, by about 90 degrees, such as from about 30 degrees to about 150 degrees.

Referring again to FIGS. 2A and 2C, an energy beam system 118 may include one or more irradiation devices 216. The one or more irradiation devices 216 respectively configured to generate a one or more energy beams 214 and to direct the energy beams 214 upon a powder bed 227 defining a build plane 225. The build plane 225 defined by the powder bed 227 may include, for example, by a next sequential layer of powder material 114 distributed across the object 116 being additively manufactured and/or across unsolidified powder material 114 within the powder bed 227. A build unit 110, including the energy beam system 118 and the inertization system 200, may be situated above a region of the powder bed 227 to be irradiated by the one or more irradiation devices 216. The one or more energy beams 214 may be utilized to selectively irradiate a portion of the powder bed 227 above which the build unit 110 is situated. The irradiation chamber 120 may provide an irradiation plenum 121 that includes a process gas, such as an inert process gas, above the region of the powder bed 227 situated below the build unit 110 and/or the irradiation chamber 120.

An irradiation device 216 may be configured to generate a laser beam, an electron beam, or any other energy beam suitable for additive manufacturing. The irradiation device may be configured to cause the energy beam 214 to selectively solidify respective portions of the powder bed 227 defining the build plane 225. As the respective energy beams 214 selectively melt or fuse the sequential layers of powder material 114 that define the powder bed 227, the object 116 begins to take shape. Typically, with a DMLM, EBM, or SLM system, the powder material 114 is fully melted, with respective layers being melted or re-melted with respective passes of the energy beams. Conversely, with DMLS or SLS systems, typically the layers of powder material 114 are sintered, fusing particles of powder material 114 to one another generally without reaching the melting point of the powder material 114. The energy beam system 118 may include componentry integrated as part of the additive manufacturing machine 102, such as componentry integrated as part of a build unit 110. Additionally, or in the alternative, the energy beam system 118 may include componentry provided separately from the additive manufacturing machine 102 and/or separately from the build unit 110.

As shown, for example, in FIG. 2A, the energy beam system 118 may include one or more irradiation devices 216, and respective ones of the one or more irradiation devices 216 may respectively include an energy beam source 231, a scanner 232, and one or more optical elements 233 configured to condition and/or focus an energy beam 214 onto the build plane 225. Respective ones of the one or more irradiation devices 216 may be separated from the irradiation chamber 120 by one or more optics windows 234. The one or more optics windows 234 may separate one or more optical elements 233 of the energy beam system 118 from the irradiation plenum 121 defined by the irradiation chamber 120. For example, the one or more optics windows 234 may separate one or more optical elements 233 of an irradiation device 216 from the irradiation plenum 121. Additionally, or in the alternative, the one or more optics windows 234 may separate one or more optical elements 233 of a monitoring device 218 from the irradiation plenum 121. The one or more optics windows 234 may separate the one or more optical elements 233 from an optics plenum 235 defining a portion of the irradiation plenum 121 adjacent to the supply manifold 202, such as a downflow manifold 210. The one or more optics windows 234 may be supported by at least a portion of the energy beam system housing 220. The one or more optics windows 234 may define a top portion of the optics plenum 235.

The one or more optics windows 234 and/or at least a portion of the energy beam system housing 220 supporting the one or more optics windows 234 may be configured to fit at least partially within an optics plenum 235 defined by a supply manifold 202, such as a downflow manifold 210. Additionally, or in the alternative, the one or more optics windows 234 and/or at least a portion of the energy beam system housing 220 supporting the one or more optics windows 234 may be supported above the optics plenum 235 by the supply manifold 202, such as the downflow manifold 210. The supply manifold, such as the downflow manifold 210, may circumferentially surround the optics plenum 235. The optics plenum 235 may be adjacent to the optics window 234. The supply manifold 202, such as the downflow manifold 210, may surround at least a portion of the one or more optics windows 234. The one or more optics windows 234 and/or the at least a portion of the energy beam system housing 220 supporting the one or more optics windows 234 may define a portion of the supply manifold 202, such as the downflow manifold 210. The inertization system 200 may be configured to provide one or more flow fields that prevent contaminants in the irradiation plenum 121 from contacting and/or depositing upon the one or more optics windows 234 and/or other components of the energy beam system 118, and/or that reduces the quantity of contaminants that contact and/or deposit upon the one or more optics windows 234 and/or other components of the energy beam system 118 over time.

A supply manifold 202, such as a downflow manifold 210 may define an optics plenum 235 configured and arranged to interchangeably accommodate a selected one of a plurality of different energy beam systems 118, such as a selected one of a plurality of different irradiation devices 216 and/or a selected one of a plurality of different monitoring devices 218, and/or a selected one of a plurality of different optical elements 233 thereof. As shown, the optics plenum 235 may have an elongate cross-sectional surface area, such as an elongate rectangular cross-sectional surface area, configured to accommodate a plurality of adjacently disposed optical elements 233. By way of example, as shown in FIG. 2D, a downflow manifold 210 may be configured and arranged to accommodate two irradiation devices 216 and two monitoring devices 218. However, it will be appreciated that the embodiment shown in FIG. 2D is not to be limiting, and in various embodiments a supply manifold 202, such as a downflow manifold 210, may accommodate any number of irradiation devices 216 and/or any number of monitoring devices 218.

As shown in FIG. 2A, the energy beam system 118 includes a first irradiation device 216a and a second irradiation device 216b. In other embodiments, an energy beam system 118 may include three, four, six, eight, ten, or more irradiation devices 216. The plurality of irradiation devices 216 may be configured to respectively generate one or more energy beams 214 that are respectively scannable within a scan field 212 incident upon at least a portion of the build plane 225. For example, the first irradiation device 216a may generate a first energy beam 214a that is scannable within a first scan field 212a incident upon at least a first build plane region 236a. The second irradiation device 216b may generate a second energy beam 214b that is scannable within a second scan field 212b incident upon at least a second build plane region 236b. The first scan field 212a and the second scan field 212b may overlap such that the first build plane region 236a scannable by the first energy beam 214a overlaps with the second build plane region 236b scannable by the second energy beam 214b. The overlapping portion of the first build plane region 236a and the second build plane region 236b may sometimes be referred to as an interlace region 238. Portions of the powder bed 227 to be irradiated within the interlace region 238 may be irradiated by the first energy beam 214a and/or the second energy beam 214b in accordance with the present disclosure.

As shown, for example, in FIGS. 2B and 2D, a build unit 110 may include one or more powder modules 122. The one or more powder modules 122 may be coupled to an irradiation chamber 120 and/or to one or more supply manifolds 202. Additionally, or in the alternative, one or more powder modules 122 may be provided as separate build units 110. The one or more powder modules 122 may be configured to move in coordination with the irradiation chamber 120, for example, as respective parts of a combined build unit 110 and/or as separate cooperatively operated build units 110.

The powder module 122 may contain a supply of powder material 114 housed within a supply chamber 240. The powder module 122 may be coupled to an irradiation chamber 120 by one or more powder module-supports 242. The powder module 122 includes a dosing mechanism 244 configured to dispense powder material 114 from the supply chamber 240. The dosing mechanism 244 may include a piston 246 configured to open and/or close a powder door 248. As the dosing mechanism 244 actuates, a portion of the powder material 114 may be discharged out of the powder module 122. A recoater 250 such as a blade or roller may sequentially distribute thin layers of powder material 114 across the build plane 225.

To irradiate a layer of the powder bed 227, the one or more irradiation devices 216 may respectively direct the one or more energy beams 214 across the respective portions of the build plane 225 to melt or fuse the portions of the powder material 114 that are to become part of the object 116 being additively manufactured. The build unit-positioning system 124 may move the build unit 110 laterally to position the respective scan fields 212 above specified portions of the build plane 225. Additionally, or in the alternative, the build vessel-positioning system 128 may move the build vessel 112 laterally to position the respective scan fields 212 above specified portions of the build plane 225. As sequential layers of the powder material 114 are melted or fused to one another, the build vessel-positioning system 128 may sequentially gradually lower the build vessel 112 to make room for the recoater 250 to distribute sequential layers of powder material 114. The recoater 250 may include one or more recoater blades 252 or the like configured to provide a smooth layer of powder material 114. Additionally, or in the alternative, the build unit-positioning system 124 may sequentially gradually elevate the build unit 110 to make room for the recoater 250 to distribute sequential layers of powder material 114. As sequential layers of powder material 114 are applied across the build plane 225, the next sequential layer of powder material 114 defines the surface of the powder bed 227 coinciding with the build plane 225. Sequential layers of the powder bed 227 may be selectively melted or fused until a completed object 116 has been additively manufactured.

Still referring to FIGS. 2A-2D, an additive manufacturing machine 102 may include a monitoring system 254. The monitoring system 254 may include one or more monitoring devices 218 configured to detect a monitoring beam (not shown) such as an infrared beam from a laser diode and/or a reflected portion of an energy beam 214, and to determine one or more parameters associated with irradiating the sequential layers of the powder bed 227 based at least in part on the detected monitoring beam. The build unit-positioning system 124 may move the build unit 110 laterally to position the respective monitoring devices 218 above specified portions of the build plane 225. Additionally, or in the alternative, the build vessel-positioning system 128 may move the build vessel 112 laterally to position the respective monitoring devices 218 above specified portions of the build plane 225.

The one or more parameters determined by the monitoring system 254 may be utilized, for example, by the control system 104, to control one or more operations of the additive manufacturing machine 102 and/or of the additive manufacturing system 100. The monitoring system 254 may be configured to project a monitoring beam (not shown) and to detect a portion of the monitoring beam reflected from the build plane 225. Additionally, and/or in the alternative, the monitoring system 254 may be configured to detect a monitoring beam that includes radiation emitted from the build plane 225, such as radiation from an energy beam reflected from the powder bed 227 and/or radiation emitted from a melt pool in the powder bed 227 generated by an energy beam and/or radiation emitted from a portion of the powder bed 227 adjacent to the melt pool.

The monitoring system 254 may include componentry integrated as part of the additive manufacturing machine 102 and/or componentry that is provided separately from the additive manufacturing machine 102. For example, the monitoring system 254 may include componentry integrated as part of the energy beam system 118 and/or componentry integrated as part of a build unit 110. Additionally, or in the alternative, the monitoring system 254 may include separate componentry, such as in the form of an assembly, that can be installed as part of the energy beam system 118 and/or as part of the additive manufacturing machine 102, and/or as part of a separate build unit 110.

Now turning to FIGS. 3A-3D, exemplary irradiation chambers 120 will be further described. An irradiation chamber 120 may define an irradiation plenum 121, which may contain process gas, such as inert gas, suitable for irradiating at least a portion of a build plane 225. The irradiation plenum 121 may be defined by one or more irradiation chamber walls 300. The one or more irradiation chamber walls 300 may define portions of an integrally formed component. Additionally, or in the alternative, the one or more irradiation chamber walls 300 may include separate wall elements 302 coupled to one another. One or more supply manifolds 202 and/or one or more return manifolds 204 may define at least a portion of an irradiation chamber 120 and/or at least a portion of the irradiation plenum 121 defined by the one or more irradiation chamber walls 300. A bottom portion 304 of the irradiation plenum 121 defined by the irradiation chamber 120, and/or the irradiation chamber walls 300 thereof, may be at least partially open to the build plane 225. A top portion 306 of the irradiation plenum 121 defined by the irradiation chamber 120, and/or the irradiation chamber walls 300 thereof, may be defined at least in part by an energy beam system 118 and/or one or more optics windows 234. Additionally, or in the alternative, the top portion 306 of the irradiation plenum 121 defined by the irradiation chamber 120, and/or the irradiation chamber walls 300 thereof, may be at least partially open for receiving an energy beam system 118 and/or one or more optics windows 234.

An irradiation chamber 120 may include a downflow chamber 308 and/or a crossflow chamber 310. For example, an irradiation chamber 120 may include a downflow chamber 308 coupled to a crossflow chamber 310. The downflow chamber 308 may be disposed about a distal portion of the irradiation chamber 120 relative to the build plane 225. The downflow chamber 308 may define a downflow plenum 309. The downflow plenum 309 may include or refer to at least a portion of the irradiation plenum 121 in which the process gas exhibits a downflow. A downflow chamber 308 may be defined at least in part by a downflow manifold 210. Additionally, or in the alternative, a downflow chamber 308 may be defined at least in part by one or more irradiation chamber walls 300 and/or wall elements 302. Such one or more irradiation chamber walls 300 and/or wall elements 302 may be coupled to a downflow manifold 210 and/or integrally formed with the downflow manifold 210 as a single component. The crossflow chamber 310 may be disposed about a proximal portion of the irradiation chamber 120 relative to the build plane 225. The crossflow chamber 310 may define a crossflow plenum 311. The crossflow plenum 311 may include or refer to at least a portion of the irradiation plenum 121 in which process gas exhibits a crossflow. A downflow chamber 308 may include one or more downflow walls 312 coupled to a downflow manifold 210 and/or integrally formed with the downflow manifold 210 as a single component. A crossflow chamber 310 may be defined at least in part by a crossflow manifold 222 and/or at least in part by a return manifold 204. Additionally, or in the alternative, a crossflow chamber 310 may be defined at least in part by one or more irradiation chamber walls 300 and/or wall elements 302. Such one or more irradiation chamber walls 300 and/or wall elements 302 may be coupled to a crossflow manifold 222 and/or a return manifold 204, and/or integrally formed with the crossflow manifold 222 and/or the return manifold 204 as a single component. A crossflow chamber 310 may include one or more crossflow walls 314 coupled to a crossflow manifold 222 and/or a return manifold 204, and/or integrally formed with the crossflow manifold 222 and/or the return manifold 204 as a single component.

Figures 3A, 3B, 3C, 3D:
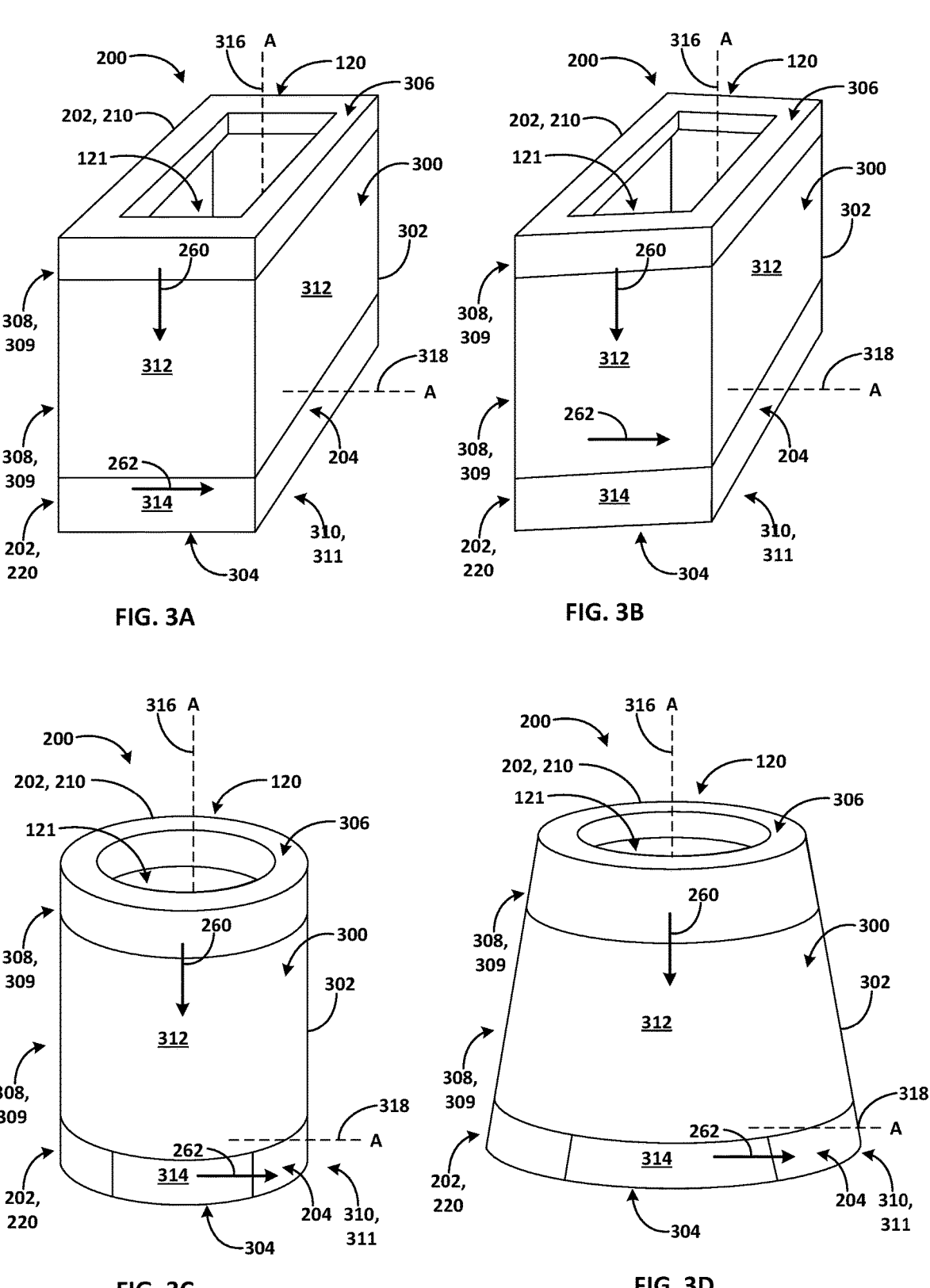

The irradiation chamber 120, and/or the irradiation plenum 121 defined by an irradiation chamber 120 and/or by one or more irradiation chamber walls 300 thereof, may exhibit any desired three-dimensional shape, including a prism, a cylinder, a frustum, or the like, as well as combinations of these. By way of example, FIGS. 3A and 3B show exemplary an irradiation chambers 120 that exhibit a prism shape. As shown in FIGS. 3A and 3B, an irradiation chamber 120 may have a rectangular prism shape. By way of further examples, FIGS. 3C and 3D show exemplary irradiation chambers 120 and/or exemplary irradiation plenums 121 that exhibit a cylinder shape. As shown in FIG. 3C, an irradiation chamber 120 and/or an irradiation plenum 121 may exhibit a frustum shape. The examples shown in FIGS. 3A-3D are provided by way of example only and are not intended to be limiting. Numerous other configurations and arrangements are contemplated, including combinations of the examples provided, all of which are within the scope of the present disclosure.

As used herein, the term "prism" refers to a polyhedron with an n-sided polygonal base and an n-sided polygonal top. A prism may include an n-sided polygonal base and a top that represents a translation of the n-sided polygonal base. The polygonal base and the polygonal top may have a different number of sized. As used herein, the term "cylinder" refers to a three-dimensional shape bounded by an elliptical bottom and an elliptical top. The elliptical top and/or the elliptical bottom of a cylinder may include any elliptical shape, including a circle, an oval, or the like. As used herein, the term "frustum" refers to a prism or a cylinder with a base and a top that have respectively different sizes. For example, a frustum may include an n-sided polygonal base and an n-sided polygonal top that have respectively different sizes. As another example, a frustum may include an elliptical base and an elliptical top that have respectively different sizes.

The one or more downflow walls 312 and/or the one or more crossflow walls 314 may be oriented parallel and/or oblique to a longitudinal axis 316 of the irradiation chamber 120 and/or crossflow chamber 310. The one or more downflow walls 312 and/or the one or more crossflow walls 314 may be oriented parallel and/or oblique to a lateral axis 318 of the irradiation chamber 120 and/or crossflow chamber 310. Additionally, or in the alternative, one or more downflow walls 312 and/or the one or more crossflow walls 314 may have a curvilinear orientation with one or more tangents that are parallel and/or oblique relative to the longitudinal axis 316 of the irradiation chamber 120 and/or crossflow chamber 310. The one or more downflow walls 312 and/or the one or more crossflow walls 314 may have a curvilinear orientation with one or more tangents that are parallel and/or oblique relative to the lateral axis 318 of the irradiation chamber 120 and/or crossflow chamber 310.

FIGS. 3A-3C show exemplary irradiation chambers 120 with downflow walls 312 oriented parallel to the longitudinal axis 316 of the irradiation chamber 120. FIGS. 3A-3C also show exemplary crossflow chambers 310 with crossflow walls 314 oriented parallel to the longitudinal axis 316 of the irradiation chamber 120. FIG. 3D shows an exemplary irradiation chamber 120 with one or more downflow walls oriented oblique to the longitudinal axis 316 of the crossflow chambers 310. FIG. 3D also shows an exemplary crossflow chamber 310 with one or more downflow walls oriented oblique to the longitudinal axis 316 of the crossflow chambers 310.

The one or more downflow walls 312 and/or the one or more crossflow walls 314 may be oriented parallel and/or oblique to a lateral axis 318 of the irradiation chamber and/or crossflow chamber 310. The lateral axis 318 may be aligned with a lateral flow field discharged from a crossflow chamber 310. Additionally, or in the alternative, one or more downflow walls 312 and/or one or more crossflow walls 314 may have a curvilinear orientation with one or more tangents that are parallel and/or oblique relative to the lateral axis 318 of the irradiation chamber 120 and/or crossflow chamber 310.

FIGS. 3A and 3C show exemplary irradiation chambers 120 with downflow walls 312 oriented parallel to the lateral axis 318 of the irradiation chamber 120. FIGS. 3A and 3C also show exemplary crossflow chambers 310 with crossflow walls 314 oriented parallel to the lateral axis 318 of the irradiation chamber 120. FIG. 3B shows an exemplary irradiation chamber 120 with one or more downflow walls 312 oriented oblique to the lateral axis 318 of the irradiation chamber 120. FIG. 3B also shows an exemplary crossflow chamber 310 with one or more crossflow walls 314 oriented oblique to the lateral axis 318 of the crossflow chamber 310. An exemplary irradiation chamber 120 may include one or more downflow walls 312 oriented laterally and oblique to the lateral axis 318 of the irradiation chamber 120 and one or more downflow walls 312 oriented transversely and perpendicular to the lateral axis of the irradiation chamber 120. An exemplary crossflow chamber 310 may include one or more crossflow walls 314 oriented laterally and oblique to the lateral axis 318 of the crossflow chamber 310 and one or more crossflow walls 314 oriented transversely and perpendicular to the lateral axis of the crossflow chamber 310. FIG. 3D shows an exemplary irradiation chamber 120 with one or more curvilinear downflow walls 312 with one or more tangents oriented parallel and/or oblique to the lateral axis 318 of the irradiation chamber 120. FIG. 3D also shows an exemplary crossflow chamber 310 with one or more curvilinear crossflow walls 314 with one or more tangents oriented parallel and/or oblique to the lateral axis 318 of the crossflow chamber 310.

An irradiation chamber 120 and/or an irradiation plenum 121 may exhibit a change in one or more dimensions corresponding at least in part to a directional vector of a flow field. One or more dimensions of the irradiation chamber 120 and/or an irradiation plenum 121 may increase or decrease corresponding at least in part with a directional vector of a flow field. As shown, for example, in FIG. 3D, a downflow manifold 210 may provide a downward flow field with a downward directional vector 260. The cross-sectional width and/or cross-sectional area of the irradiation chamber 120 and/or an irradiation plenum 121 may increase and/or decrease along the direction of the downward directional vector 260. As shown, for example, in FIG. 3B, a crossflow manifold 222 may provide a lateral flow field with a lateral directional vector 262. The cross-sectional width and/or cross-sectional area of the irradiation chamber 120 and/or an irradiation plenum 121 may increase and/or decrease along the direction of the lateral directional vector 262.

As shown, for example, in FIG. 3B, a cross-sectional width and/or cross-sectional area of the irradiation chamber 120 and/or an irradiation plenum 121 may decrease along the direction of a lateral directional vector 262, such as from a crossflow manifold 222 to a return manifold 204, and/or across at least a portion of a crossflow chamber 310. Such a decreasing cross-sectional width and/or area may improve the fluid properties of the lateral flow field. For example, a decreasing cross-sectional width and/or area may provide for an improved velocity profile, such as an improved uniformity across the width of the lateral flow field. Additionally, or in the alternative, a tendency for backflow and/or eddies along the edges of the lateral flow field may be reduced by providing a decreasing cross-sectional width and/or area across at least a portion of a crossflow chamber

310, such as across at least a portion of the lateral flowpath from a crossflow manifold 222 to a return manifold 204.

An irradiation chamber 120 and/or an irradiation plenum 121, and/or a crossflow chamber 310, with a decreasing cross-sectional width and/or area may increase the velocity of the lateral flow field as the lateral flow of process gas approaches the return manifold 204. A velocity gradient may exist in the lateral flow field of process gas, for example, increasing from the crossflow manifold 222 to the return manifold 204, and/or across at least a portion of the crossflow chamber 310. Such an increasing velocity gradient may provide for sufficiently high velocity in the flow field to move contaminants in the process gas out of the process chamber and into the one or more return manifolds 204, for example, rather than such contaminants redepositing upon the powder bed 227. Additionally, or in the alternative, a lateral flow field with a sufficiently large lateral directional vector may provide for at least partial stratification in the lateral flow field, such as in the crossflow chamber 310. For example, a lateral flow field may exhibit stratification as between at least a portion of the lateral flow field corresponding to process gas from the crossflow manifold 222 and at least a portion of the lateral flow field corresponding to process gas from the downflow manifold 210.

As shown, for example, in FIG. 3D, a cross-sectional width and/or cross-sectional area of the irradiation chamber 120 and/or an irradiation plenum 121 may increase in the direction of a downward directional vector 260, such as from a downflow manifold 210 and/or downflow chamber 308 to the crossflow chamber 310. Such an increasing cross-sectional width and/or area may reduce the velocity of the downward flow field as the downward flow of process gas approaches the build plane 225. A velocity gradient may exist in the downward flow field of process gas, for example, decreasing from the downflow manifold 210 and/or downflow chamber 308 to the crossflow chamber 310. Such a decreasing velocity gradient may provide for sufficiently high velocity in the flow field near the one or more optics windows 234 and/or other components of the energy beam system 118 for protecting the one or more optics windows 234 and/or other components of the energy beam system 118 while also providing sufficiently low velocity in the flow field near the crossflow chamber 310 and/or the powder bed 227 to avoid the downward flow of process gas from disrupting the powder bed 227. Additionally, or in the alternative, the decreasing velocity gradient may enhance entrainment of process gas in the downward flow field by process gas in the lateral flow field. Such entrainment of downward flowing process gas by the lateral flow field may help draw the downward flowing process gas into one or more return manifolds 204, such as by transitioning the downward flow field to a lateral flow field.

Now turning to FIGS. 4A-4E, exemplary downflow manifolds 210 will be further described. As shown, a downflow manifold 210 may include a downflow manifold body 400. The downflow manifold body 400 may circumferentially surround the optics plenum 235. The downflow manifold body 400 may be in fluid communication with one or more process gas supply lines 206. The one or more process gas supply lines 206 may fluidly communicate directly with the downflow manifold body 400. Additionally, or in the alternative, a downflow manifold 210 may include a supply manifold header 224 configured to supply process gas from the one or more process gas supply lines 206 to the downflow manifold body 400. The supply manifold header 224 may fluidly communicate with one or more process gas supply lines 206 (e.g., FIGS. 2B-2D). The one or more process gas supply lines 206 may be coupled to the supply manifold header 224, for example, at one or more multiway header fittings 404. As shown in FIG. 4A, and with reference to FIGS. 2B-2D, a first portion of a stream of process gas may be supplied from the one or more process gas supply lines 206 by way of a supply manifold header 224, for example, by way of a multiway header fitting 404 coupling the supply manifold header 224 to the process gas supply line 206. Additionally, or in the alternative, a second portion of the stream of process gas may be supplied to the crossflow manifold 222, for example, by way of a portion of the process gas supply line 206 extending downstream from the supply manifold header 224.

An exemplary downflow manifold body 400 may include one or more top downflow manifold walls 406, one or more bottom downflow manifold walls 408, one or more outward downflow manifold walls 410, and/or one or more inward downflow manifold walls 412. A downflow manifold body 400 may include a top downflow manifold wall 406 configured to be oriented towards an energy beam system 118, such as towards one or more irradiation devices 216 and/or one or more monitoring devices 218. The downflow manifold body 400 may include one or more attachment points 411, such as at the top downflow manifold wall 406, configured to couple the downflow manifold 210 to one or more components of the energy beam system 118. Additionally, or in the alternative, the top downflow manifold wall 406 may be integrally formed with one or more walls of an energy beam system. A downflow manifold body 400 may include one or more outward downflow manifold walls 410 that define an outer perimeter of the downflow manifold body 400. The one or more outward downflow manifold walls 410 may include attachment points 411 for attaching one or more irradiation chamber walls 300 to the downflow manifold body 400. Additionally, or in the alternative, the one or more outward downflow manifold walls 410 may be integrally formed with one or more irradiation chamber walls 300. The downflow manifold body 400 may include one or more bottom downflow manifold walls 408 config-ured to be oriented towards an irradiation plenum 121. A bottom downflow manifold wall 408 may define at least a portion of the irradiation chamber 120. For example, a bottom downflow manifold wall 408 may provide an upward boundary to the irradiation plenum 121. Additionally, or in the alternative, the one or more bottom downflow manifold walls 408 may be integrally formed with at least a portion of the irradiation chamber 120, such as with one or more irradiation chamber walls 300.

A supply manifold header 224 may fluidly communicate with a downflow manifold body 400 at a plurality of locations, such as at a top downflow manifold wall 406 and/or at one or more outward downflow manifold walls 410. The supply manifold header 224 may fluidly commu-nicate with the downflow manifold body 400 at a plurality of locations distributed about one or more outward down-flow manifold walls 410. The outward downflow manifold walls 410 may include end walls and side walls. End walls may refer to outward downflow manifold walls 410 that have a length that is less than the average length of the outward downflow manifold walls 410. Side walls may refer to outward downflow manifold walls 410 that have a length that is greater than the average length of the outward downflow manifold walls 410. The supply manifold header 224 may fluidly communicate with one or more outward downflow manifold walls 410 configured as end walls of the downflow manifold body 400 and/or with one or more outward downflow manifold walls 410 configured as side walls of the downflow manifold body 400.

The supply manifold header 224 may include a one or more downflow manifold distribution elements 209 fluidly communicating with the downflow manifold body 400, such as at one or more locations about the one or more outward downflow manifold walls 410. A first downflow manifold distribution element 209 may fluidly communicate with the downflow manifold body 400 at a first outward downflow manifold wall 410, such as a first end wall of the downflow manifold body 400. The first downflow manifold distribu-tion element 209 may fluidly communicate with a first process gas supply line 206 by way of a first multiway header fitting 404. A second downflow manifold distribution element 209 may fluidly communicate with the downflow manifold body 400 at a second outward downflow manifold wall 410, such as a second end wall of the downflow manifold body 400. The second downflow manifold distri-bution element 209 may fluidly communicate with a second process gas supply line 206 by way of a second multiway header fitting 404.

A supply manifold header 224 may include a plurality of downflow manifold distribution elements 209, such as a first downflow manifold distribution element 209 and a second downflow manifold distribution element 209, that fluidly communicate with one another, for example, by way of a supply header conjunction element 226. For example, a first end of a supply header conjunction element 226 may fluidly communicate with a first multiway header fitting 404 and a second end of a supply header conjunction element 226 may fluidly communicate with a second multiway header fitting 404. Additionally, or in the alternative, respective ends of a supply header conjunction element 226 may fluidly com-municate directly with first and second downflow manifold distribution elements 209. One or more supply header con-junction elements 226 may allow a flow of process gas to distribute proportionally between respective pathways of a downflow manifold 210, such as between respective path-ways through a supply manifold header 224 and/or between respective pathways through a downflow manifold body 400.

As shown in FIGS. 4B, 4D, and 4E, a downflow manifold body 400 may include one or more downflow manifold pathways 418 disposed therein. The one or more downflow manifold pathways 418 may be defined by the one or more internal walls of the downflow manifold body 400. A downflow manifold body 400 may include one or more downflow manifold baffles 420 disposed within the one or more downflow manifold pathways 418. The downflow manifold pathways 418 and/or the downflow manifold baffles 420 may be configured to provide desired fluid properties within the one or more downflow manifold path-ways 418. For example, the downflow manifold baffles 420 may encourage process gas to uniformly pressurize the one or more downflow manifold pathways 418.

The downflow manifold body 400 may include one or more inward downflow manifold walls 412. The one or more inward downflow manifold walls 412 may be oriented parallel or oblique to a longitudinal axis 424 of the down-flow manifold body 400. As shown, for example, in FIGS. 4B-4E, one or more inward downflow manifold walls 412 may diverge from the longitudinal axis 424 of the downflow manifold body 400. The inward downflow manifold walls 412 may diverge in a proximal direction relative to the powder bed 227, such that a distance from the longitudinal axis 424 to an inward downflow manifold wall 412 increases with increasing proximity to the powder bed 227. A divergence of the one or more inward downflow manifold walls 412 may be determined with reference to a divergence angle relative to the longitudinal axis 424 of the downflow manifold body 400. As shown, for example, in FIG. 2A, the divergence angle of the one or more inward downflow manifold walls 412 may be determined based at least in part on a location of a scan field 212 of one or more energy beams 214 of an energy beam system 118. The divergence angle of the one or more inward downflow manifold walls 412 may provide clearance for the one or more energy beams 214 of the energy beam system 118 to access the portion of the build plane 225 corresponding to the respective scan field 212, for example, without the respective scan field 212 being interrupted by the one or more inward downflow manifold walls 412.

The downflow manifold body 400 may include a plurality of downflow manifold apertures 422 disposed about one or more walls of the downflow manifold body 400, such as one or more inward downflow manifold walls 412 and/or one or more bottom downflow manifold walls 408. The apertures 422 may be in the form of pores, holes, slits, perforations, pinholes, or the like. Process gas flowing through the one or more downflow manifold pathways 418 may be discharged into the irritation plenum 121 and/or the optics plenum 235 through the plurality of downflow manifold apertures 422. The plurality of downflow manifold apertures 422 may be configured and arranged to provide a flow of process gas from the downflow manifold body 400 into the irradiation plenum 121 and/or the optics plenum 235 with desired flow characteristics. One or more downflow manifold baffles 420 may encourage process gas to flow uniformly through the plurality of downflow manifold apertures 422 and/or with respect to various regions of the downflow manifold body 400, such as with respect to the one or more inward downflow manifold walls 412 and/or the one or more bottom downflow manifold walls 408.

The plurality of downflow manifold apertures 422 may have any desired orientation. The plurality of downflow manifold apertures 422 may be configured to provide a flow field with a downward directional vector 260, such as a flow field oriented perpendicular to the build plane 225. The flow field may additionally or alternatively oriented perpendicular to the downflow manifold body 400, such as perpendicular to the one or more bottom downflow manifold walls 408. Additionally, or in the alternative, the plurality of downflow manifold apertures 422 may be configured to provide a flow field with a downward directional vector 260 oriented parallel to a longitudinal axis 424 of the downflow manifold body 400.

Additionally, or in the alternative, the plurality of downflow manifold apertures 422 may be configured to provide a flow field with a lateral directional vector 262, such as a flow field oriented parallel to the build plane 225. The flow field may additionally or alternatively oriented parallel to the downflow manifold body 400, such as parallel to the one or more bottom downflow manifold walls 408. As shown, for example, in FIGS. 4D and 4E, a directional vector of a flow field from at least some of the plurality of downflow manifold apertures 422 may have any desired orientation, including a downward directional vector 260, a lateral directional vector 262 and/or a combination thereof. At least some of the plurality of plurality of downflow manifold apertures 422 may be oriented parallel or substantially parallel to the longitudinal axis 424 of the downflow manifold body 400, such as within about 10 degrees of parallel to the longitudinal axis 424 of the downflow manifold body 400, such as within about 5 degrees of parallel, or such as within about 1 degree of parallel to the longitudinal axis 424 of the downflow manifold body 400.

A plurality of downflow manifold apertures 422 disposed about the one or more inward downflow manifold walls 412 may be oriented parallel or substantially parallel to the longitudinal axis 424 of the downflow manifold body 400. Additionally, or in the alternative, a plurality of downflow manifold apertures 422 disposed about the one or more bottom downflow manifold walls 408 may be oriented parallel or substantially parallel to the longitudinal axis 424 of the downflow manifold body 400. A majority of the downflow manifold apertures 422 may be oriented parallel or substantially parallel or substantially parallel to the longitudinal axis of the downflow manifold body 400, and/or substantially all of the downflow manifold apertures 422 may be oriented parallel or substantially parallel or substantially parallel to the longitudinal axis of the downflow manifold body 400. For example, at least 60%, at least 80%, and/or at least 90% of the downflow manifold apertures 422 may be oriented parallel or substantially parallel or substantially parallel or substantially parallel to the longitudinal axis of the downflow manifold body 400. Additionally, or in the alternative, at least some of the plurality of plurality of downflow manifold apertures 422 may be oriented oblique and/or perpendicular to the longitudinal axis 424 of the downflow manifold body 400. For example, a plurality of downflow manifold apertures 422 disposed about the one or more inward downflow manifold walls 412 may be oriented oblique and/or perpendicular to the longitudinal axis 424 of the downflow manifold body 400. Additionally, or in the alternative, a plurality of downflow manifold apertures 422 oriented perpendicular to the longitudinal axis 424 of the downflow manifold body 400 may at least partially surround the plurality of downflow manifold apertures 422 oriented oblique and/or perpendicular to the longitudinal axis 424 of the downflow manifold body 400. The plurality of downflow manifold apertures 422 oriented perpendicular to the longitudinal axis 424 may be disposed about at the one or more bottom downflow manifold walls 408 and/or the one or more inward downflow manifold walls 412.

The size, shape, and/or quantity of the plurality of downflow manifold apertures 422 may be selected based on the desired flow characteristics of the process gas provided to the irradiation plenum 121 from the downflow manifold 210. At least some of the plurality of downflow manifold apertures 422 may be configured to provide a laminar flow of process gas. Additionally, or in the alternative, at least some of the plurality of downflow manifold apertures 422 may be configured to provide a turbulent flow of process gas. For example, a downflow manifold body 400 may include a first plurality of downflow manifold apertures 422 configure to provide a laminar flow and a second plurality of downflow manifold apertures 422 configure to provide a turbulent flow.

A downflow manifold 210 may include a downflow manifold body 400 that has an annular or semiannular configuration. For example, the downflow manifold 210 shown in FIGS. 4A-4E has a downflow manifold body 400 with a rectangular annular configuration. As another example, a downflow manifold 210 may include a downflow manifold body 400 that has a curvilinear annular or semi-annular configuration. For example, a plurality of downflow manifolds 210 may respectively include a downflow manifold body 400 that has a semiannular configuration that together provide an annular configuration. Additionally, or in the alternative, a downflow manifold 210 may include a plurality of downflow manifold bodies 400 that have a semiannular configuration, for example, that together provide an annular configuration. The downflow manifold body 400 may include one or more inward downflow manifold walls 412 that define at least a portion of an irradiation plenum 121. A downflow manifold body 400 may include one or more inward downflow manifold walls 412 and one or more bottom downflow manifold wall 408, that respectively define a portion of an irradiation plenum 121. Additionally, or in the alternative, at least a portion of one or more bottom downflow manifold walls 408 may be configured and arranged externally to an irradiation plenum 121, for example, with only one or more inward downflow manifold walls 412 of the downflow manifold body 400 defining a portion of the irradiation plenum 121. However, in other embodiments, a first portion of a bottom downflow manifold wall 408 may define part of the irradiation plenum 121 while a second portion of the bottom downflow manifold wall 408 may be external to the irradiation plenum 121.

A downflow manifold 210 may include one or more inward downflow manifold walls 412 that define an optics plenum 235. The optics plenum 235 may include or refer to a portion of the irradiation plenum 121 adjacent to one or more optics windows 234 that separate one or more optical elements 233 of an irradiation device 216 from the irradiation plenum 121. The optics plenum 235 may include or refer to the portion of the irradiation plenum 121 defined by the one or more inward downflow manifold walls 412 of the downflow manifold body 400. The optics plenum 235 may be defined at least in part by one or more inward downflow manifold walls 412 that include a plurality of downflow manifold apertures 422. The plurality of downflow manifold apertures 422 disposed about the inward downflow manifold walls 412 may supply process gas to the optics plenum 235. The process gas supplied to the optics plenum 235 may prevent contaminants from contacting and/or depositing upon the one or more optics windows 234 or other components of the energy beam system 118 and/or may reduce the quantity of contaminants that contact and/or deposit upon the one or more optics windows 234 or other components of the energy beam system 118 over time.

The plurality of downflow manifold apertures 422 disposed about the inward downflow manifold walls 412 may supply a turbulent flow of process gas to the optics plenum 235, while the plurality of downflow manifold apertures 422 disposed about the one or more bottom downflow manifold walls 408 may supply a laminar flow of process gas to the irradiation plenum 121. The turbulent flow of process gas supplied by the plurality of downflow manifold apertures 422 disposed about the inward downflow manifold walls 412 may provide a turbulent region adjacent to the one or more optics windows 234. The turbulent region may occupy at least a portion of the optics plenum 235. The laminar flow of process gas supplied by the plurality of downflow manifold apertures 422 disposed about the one or more bottom downflow manifold walls 408 may provide a laminar region within at least a portion of the irradiation plenum 121. The turbulent region may be located within the optics plenum 235 defined by the one or more inward downflow manifold walls 412 and the laminar region may be disposed below the turbulent region. The laminar region may provide a flow field that laminarly propagates towards the crossflow chamber 310. The turbulent region may provide a turbulent crossflow that shields contaminants from entering the optics plenum 235 and/or that quickly removes contaminants from the optics plenum 235. Both the laminar region and the turbulent region may both exhibit turbulent flow, while still providing a similar effect. For example, the process gas supplied to the optics plenum 235 may exhibit a higher degree of turbulence than the process gas supplied to the irradiation plenum 121.

Additionally, or in the alternative, the plurality of downflow manifold apertures 422 disposed about the inward downflow manifold walls 412 may supply a laminar flow of process gas to the optics plenum 235, while the plurality of downflow manifold apertures 422 disposed about the one or more bottom downflow manifold walls 408 may supply a turbulent flow of process gas to the irradiation plenum 121. The laminar flow of process gas supplied by the plurality of downflow manifold apertures 422 disposed about the inward downflow manifold walls 412 may provide a laminar region within the optics plenum 235 and/or a stagnant region adjacent to the one or more optics windows 234. The laminar region and/or the stagnant region may occupy at least a portion of the optics plenum 235. The turbulent flow of process gas supplied by the plurality of downflow manifold apertures 422 disposed about the one or more bottom downflow manifold walls 408 may provide a turbulent region within at least a portion of the irradiation plenum 121. The laminar region and/or the stagnant region may be located within the optics plenum 235 defined by the one or more inward downflow manifold walls 412 and the turbulent region may be disposed below the laminar region and/or the stagnant region. The laminar region and/or the turbulent region may provide a flow field that propagates towards the crossflow chamber 310. The stagnant region may shield contaminants from entering the optics plenum 235 and/or may cause contaminants to fall out of the optics plenum 235 by vulture of flow stagnation within the optics plenum 235. Both the laminar region and the turbulent region may both exhibit turbulent flow and/or laminar flow, while still providing a similar effect. For example, the process gas supplied to the optics plenum 235 may exhibit a lower degree of flow than the process gas supplied to the irradiation plenum 121.

Now turning to FIGS. 5A and 5B, exemplary crossflow manifolds 222 will be further described. A crossflow manifold 222 may be in fluid communication with one or more process gas supply lines 206. The crossflow manifold 222 may be configured to provide a crossflow of process gas to an irradiation plenum 121 defined by an irradiation chamber 120, and/or to a crossflow plenum 311 defined by a crossflow chamber 310. A crossflow manifold 222 may include one or more crossflow manifold bodies 500. For example, as shown in FIGS. 5A and 5B, a crossflow manifold 222 may include a plurality of crossflow manifold bodies 500 configured and arranged along a width of the crossflow manifold 222. The plurality of crossflow manifold bodies 500 may be coupled to one another. Additionally, or in the alternative, a plurality of crossflow manifold bodies 500 may define respective portions of an integrally formed crossflow manifold 222.

A crossflow manifold body 500 may be configured to modify a cross-sectional surface area of a process gas flow field flowing into the crossflow manifold 222 and through the crossflow manifold body 500. A flow field flowing into the crossflow manifold body 500 may have a circular cross-sectional profile, corresponding, for example, to a process gas supply line 206. A flow field discharged from the crossflow manifold body 500 may have an elongate cross-sectional profile, corresponding, for example, to a crossflow plenum 311 defined by a crossflow chamber 310. Additionally, or in the alternative, a flow field flowing into the crossflow manifold body 500 may include a downward directional vector 260, corresponding, for example to an orientation of a process gas supply line 206. A flow field discharged from the crossflow manifold body 500 may include a lateral flow field with a lateral directional vector 262, corresponding, for example, to an orientation of a crossflow plenum 311 defined by a crossflow chamber 310. The flow of process gas flowing through the crossflow manifold body 500 may be conformed to an elongate flow field. The lateral flow field, such as the elongate flow field, may flow laterally across the crossflow plenum 311 defined by a crossflow chamber 310. A crossflow manifold body 500 may conform one or more circular cross-sectional flow fields with a downward directional vector 260 into one or more elongate flow fields with a lateral directional vector 262.

A crossflow manifold 222 and/or a crossflow manifold body 500 may include one or more crossflow manifold inlets 502 and one or more crossflow manifold outlets 504. The crossflow manifold 222 may include one more crossflow manifold pathways 506 defined at least in part by the one or more crossflow manifold bodies 500. One or more crossflow manifold pathway walls 508 may define at least a portion of a plurality of crossflow manifold pathways 506. The one or more crossflow manifold pathway walls 508 may be disposed within the crossflow manifold body 500, and/or the one or more crossflow manifold pathway walls 508 may be integrally formed with the crossflow manifold body 500 as a single component.

Process gas entering the one or more crossflow manifold inlets 502 may flow through the one more crossflow manifold pathways 506 and exit the crossflow manifold 222 at the one or more crossflow manifold outlets 504. As shown, for example, in FIGS. 5A and 5B, a crossflow manifold may include a plurality of crossflow manifold inlets 502 and a common crossflow manifold outlet 504. Respective ones of a plurality of crossflow manifold inlets 502 may correspond to respective ones of a plurality of crossflow manifold bodies 500. The plurality of crossflow manifold bodies 500 may have a common crossflow manifold outlet 504. One or more crossflow manifold outlets 504 may be configured to discharge a lateral flow field of process gas that has an elongate cross-sectional surface area. The crossflow manifold body 500 may have a shape that conforms the cross-sectional surface area of a flow field from an inlet cross-sectional surface area, corresponding to one or more crossflow manifold inlets 502, to an outlet cross-sectional surface area, corresponding to one or more crossflow manifold outlets 504. As shown, the one or more crossflow manifold inlets 502 may have an elliptical cross-sectional profile, such as a circular cross-sectional profile. However, crossflow manifold inlets 502 with other cross-sectional profiles are also contemplated, including crossflow manifold inlets 502 with rectangular or polygonal cross-sectional profiles. The one or more crossflow manifold outlets 504 may have an elongate cross-sectional profile. As shown, the elongate cross-sectional surface area of a crossflow manifold outlet 504 may have a rectangular cross-sectional profile; however, other cross-sectional profiles are also contemplated, including curvilinear cross-sectional profiles, such as an elliptical cross-sectional profiles.

A crossflow manifold outlet 504 may discharge a flow of process gas supplied from a plurality of crossflow manifold inlets 502. Additionally, or in the alternative, a crossflow manifold outlet 504 may discharge a flow of process gas from a plurality of crossflow manifold pathways 506. The number of crossflow manifold inlets 502 may exceed the number of crossflow manifold outlets 504 by at least one. A crossflow manifold 222 may include a plurality of crossflow manifold inlets 502 and one or more crossflow manifold outlets 504, such as from two to six crossflow manifold inlets 502 and from one to three crossflow manifold outlets 504, such as two, three, four, five, or six crossflow manifold inlets 502, and one, two, or three crossflow manifold outlets 504. As shown in FIGS. 5A and 5B, a crossflow manifold 222 may include two crossflow manifold inlets 502 and one crossflow manifold outlet 504.

The configuration and arrangement of the crossflow manifold body 500 may be determined at least in part to provide a lateral flow field with desired flow characteristics. The crossflow manifold body 500, the one or more crossflow manifold pathways 506, and/or the one or more crossflow manifold pathway walls 508 may be configured to modify a cross-sectional profile of a flow field. The cross-sectional profile of the flow field may be modified with respect to geometry and/or surface area. The cross-sectional profile of the flow field may be modified from an elliptical cross-sectional profile, such as a circular cross-sectional profile, at the one or more crossflow manifold inlets 502, to an elongate cross-sectional profile, such as a rectangular cross-sectional profile, at the crossflow manifold outlet 504. Additionally, or in the alternative, the crossflow manifold body 500, the one or more crossflow manifold pathways 506, and/or the one or more crossflow manifold pathway walls 508 may be configured to modify a directional vector of the flow field. For example, the directional vector of the flow field may be modified from a downward directional vector 260 at the one or more crossflow manifold inlets 502 to a lateral directional vector 262 at the one or more crossflow manifold outlets 504.

The crossflow manifold body 500 may include one more crossflow manifold pathways 506 that have a curvilinear profile. The curvilinear profile of the one more crossflow manifold pathways 506 may facilitate a change in one or more geometric dimensions of the one more crossflow manifold pathways 506 from the one or more crossflow manifold inlets 502 to the one or more one or more crossflow manifold outlets 504. Additionally, or in the alternative, the curvilinear profile of the one more crossflow manifold pathways 506 may facilitate a change in the directional vector of the flow field of process gas from the one or more crossflow manifold inlets 502 to the one or more one or more crossflow manifold outlets 504. The crossflow manifold body 500 may expand transversely relative to a longitudinal axis 510 of one or more crossflow manifold inlets 502 and/or relative to a lateral axis 512 of one or more crossflow manifold outlets 504. The curvilinear profile of the one more crossflow manifold pathways 506 may facilitate a change in one or more geometric dimensions, and/or a change in the directional vector of the flow field of process gas from the one or more crossflow manifold inlets 502 to the one or more one or more crossflow manifold outlets 504, without significantly disrupting a boundary layer air within the crossflow manifold body 500, such as within the respective crossflow manifold pathways 506. For example, the curvilinear profile of the one or more crossflow manifold pathways 506 may avoid form drag and flow separation, for example, by creating counter-rotating vortices which draw process gas further into the respective crossflow manifold pathways 506. At least a portion of the curvilinear profile crossflow manifold body 500 may emulate at least a portion of an NACA air duct.

The crossflow manifold body 500 may include a transverse expansion region 514 and/or a lateral translation region 516. The transverse expansion region 514 may be located downstream from a crossflow manifold inlet 502. The transverse expansion region 514 includes a region of the crossflow manifold body 500 that exhibits a transverse expansion relative to the longitudinal axis 510 of one or more crossflow manifold inlets 502 and/or relative to a lateral axis 512 of one or more crossflow manifold outlets 504. At least some of a plurality of crossflow manifold pathways 506 may exhibit a transverse expansion in the transverse expansion region 514 described with reference to the crossflow manifold body 500. The rate of transverse expansion may differ as between respective ones of the plurality of crossflow manifold pathways 506. One or more of the plurality of crossflow manifold pathways 506 need not exhibit a transverse expansion while at least some of the plurality of crossflow manifold pathways 506 exhibit a transverse expansion within the transverse expansion region 514.

The lateral translation region 516 may be located downstream from a transverse expansion region 514. Additionally, or in the alternative, the lateral translation region 516 may be located upstream from a crossflow manifold outlet 504. The lateral translation region 516 includes a region of the crossflow manifold body 500 that exhibits a lateral translation in the axial orientation of the crossflow manifold body 500, for example, relative to the longitudinal axis 510 of one or more crossflow manifold inlets 502 and/or relative to a lateral axis 512 of one or more crossflow manifold outlets 504. The axial orientation of the crossflow manifold body 500 may be aligned with the longitudinal axis 510, for example, at the one or more crossflow manifold inlets 502. The axial orientation of the crossflow manifold body 500 may be aligned with the lateral axis 512, for example, at the one or more crossflow manifold outlets 504. The alignment of the axial orientation of the crossflow manifold body 500 may transition laterally within the lateral translation region 516, for example, providing increasing alignment with the lateral axis 512 and/or decreasing alignment with the longitudinal axis 510. The lateral translation region may include a translation of the axial orientation of the crossflow manifold body 500 from being aligned with the longitudinal axis 510 to being aligned with the lateral axis 512. However, the crossflow manifold body 500 need not be aligned precisely with the longitudinal axis 510 and/or the crossflow manifold body 500 need not be aligned precisely with the lateral axis 512. At least some of a plurality of crossflow manifold pathways 506 may exhibit a lateral translation in the respective axial orientation within in the lateral translation region 516 as described with reference to the crossflow manifold body 500. The rate of lateral translation may differ as between respective ones of the plurality of crossflow manifold pathways 506.

At least a portion of the transverse expansion region 514 may overlap with at least a portion of the lateral translation region 516. Additionally, or in the alternative, at least a portion of the transverse expansion region 514 may be separated from at least a portion of the lateral translation region 516. For example, a crossflow manifold body 500 may include a longitudinal extension region 518 disposed between at least a portion of the transverse expansion region 514 and at least a portion of the lateral translation region 516. The longitudinal extension region 518 represents a region of the crossflow manifold body 500 that exhibits a longitudinal extension relative to the longitudinal axis 510 of one or more crossflow manifold inlets 502. At least some of a plurality of crossflow manifold pathways 506 may exhibit a longitudinal extension in the longitudinal extension region 518 described with reference to the crossflow manifold body 500. The degree of longitudinal extension region 518 may differ as between respective ones of the plurality of crossflow manifold pathways 506. One or more of the plurality of crossflow manifold pathways 506 need not exhibit a longitudinal extension while at least some of the plurality of crossflow manifold pathways 506 exhibit a longitudinal extension within the longitudinal extension region 518.

A crossflow manifold body 500 may include a lateral profiling region 520. The lateral profiling region 520 represents a region of the crossflow manifold body 500 that exhibits a lateral change in cross-sectional profile, for example, relative to the cross-sectional profile of the one or more crossflow manifold inlets 502. For example, the cross-sectional profile of the crossflow manifold body 500 may change laterally from a cross-sectional profile at the one or more crossflow manifold inlets 502 to a cross-sectional profile at the one or more crossflow manifold outlets 504. At least some of a plurality of crossflow manifold pathways 506 may exhibit a lateral change in cross-sectional profile in the lateral profiling region 520 described with reference to the crossflow manifold body 500. The rate of change in the lateral cross-sectional profile may differ as between respective ones of the plurality of crossflow manifold pathways 506. One or more of the plurality of crossflow manifold pathways 506 need not exhibit a lateral change in cross-sectional profile while at least some of the plurality of crossflow manifold pathways 506 exhibit a lateral change in cross-sectional profile within the lateral profiling region 520.

The lateral profiling region 520 may overlap at least a portion of the transverse expansion region 514 and/or at least a portion of the lateral translation region 516. Additionally, or in the alternative, at least a portion of the lateral profiling region 520 may be separated from at least a portion of the transverse expansion region 514 and/or from at least a portion of the lateral translation region 516. The lateral profiling region 520 may overlap at least a portion of the longitudinal extension region 518. Additionally, or in the alternative, at least a portion of the lateral profiling region 520 may be separated from at least a portion of the longitudinal extension region 518. The longitudinal extension region 518 may be disposed between at least a portion of the lateral profiling region 520 and at least a portion of the lateral translation region 516. The longitudinal extension region 518 may exhibit a longitudinal extension relative to the longitudinal axis 510 of one or more crossflow manifold inlets 502, without a lateral change in cross-sectional profile such as may be exhibited in the lateral profiling region 520. At least some of a plurality of crossflow manifold pathways 506 may exhibit a longitudinal extension in the longitudinal extension region 518, without a lateral change in cross-sectional profile such as may be exhibited in the lateral profiling region 520. One or more of the plurality of crossflow manifold pathways 506 need not exhibit a lateral change in cross-sectional profile, while at least some of the plurality of crossflow manifold pathways 506 exhibit a lateral change in cross-sectional profile within the lateral profiling region 520.

One or more geometric properties of the one or more crossflow manifold pathways 506, and/or of the cross-sectional profile of the flow field, may be modified at one or more regions from the one or more crossflow manifold inlets 502 to the one or more crossflow manifold outlets 504. For example, an elliptical cross-sectional profile, such as a circular cross-sectional profile, at the one or more crossflow manifold inlets 502 may be confirmed to an elongate cross-sectional profile, such as a rectangular cross-sectional profile, at the one or more crossflow manifold outlets 504. Additionally, or in the alternative, the cross-sectional surface area of the cross-sectional profile of the flow field may be modified as between the one or more crossflow manifold inlets 502 and the one or more crossflow manifold outlets 504. In various embodiments, the cross-sectional surface area may be increased, decreased, and/or maintained. The cross-sectional surface area of the flow field may remain substantially equivalent as between the one or more crossflow manifold inlets 502 and the one or more crossflow manifold outlets 504. Additionally, or in the alternative, the cross-sectional surface area may be increased from the one or more crossflow manifold inlets 502 to the one or more crossflow manifold outlets 504, for example, for example, in an amount of from about 5% to about 90%, such as from about 10% to about 80%, or such as from about 25% to about 75%. The increasing cross-sectional surface area may provide a pressure reduction and/or a decrease in velocity of the flow field, which may result in a lateral flow field with desired flow characteristics. Additionally, or in the alternative, the cross-sectional surface area may be decreased from the one or more crossflow manifold inlets 502 to the one or more crossflow manifold outlets 504, for example, in an amount of from about 5% to about 90%, such as from about 10% to about 80%, or such as from about 25% to about 75%. The decreasing cross-sectional surface area may provide a pressure increase and/or an increase in velocity of the flow field, which may result in a lateral flow field with desired flow characteristics. The cross-sectional surface area of the one or more crossflow manifold inlets 502 and the cross-sectional surface area of the one or more crossflow manifold outlets 504 may be within about 25% of one another, such as within about 10% of one another, such as within about 5% of one another, or such as within about 1% of one another. Additionally, or in the alternative, the cross-sectional surface area of the one or more crossflow manifold inlets 502 and the cross-sectional surface area of the one or more crossflow manifold outlets 504 may differ from one another by up to 125%, such as up to 100%, such as up to 50%, such as up to 25%. Such a pressure increase and/or decrease may be determined from pressure measurements obtained with one or more pressure sensors configured to determine an upstream pressure and a downstream pressure, and or a pressure differential. By way of example, such pressure or pressure differential may be determined by a differential pressure sensor.

The one or more crossflow manifold outlets 504 may have a width and a height that are proportioned such that the width exceeds the height, for example, by a factor of from about 10:1 to 100:1, such as from about 10:1 to about 50:1, or such as from about 10:1 to about 20:1. A width of the lateral flow field of process gas discharged from the one or more crossflow manifold outlets 504 may exceed a height of the lateral flow field. For example, a ratio of the width of the lateral flow field to the height of the lateral flow field may be from about 10:1 to 100:1, such as from about 10:1 to about 50:1, or such as from about 10:1 to about 20:1.

In addition, or in the alternative, to changing a cross-sectional profile of a flow field, the crossflow manifold body 500 may be configured to change a directional vector of the flow field. The crossflow manifold body 500 may include one or more crossflow manifold inlets 502 respectively fluidly communicating with a process gas supply line 206. The crossflow manifold body 500 may be configured to change a direction vector of the flow field at the one or more crossflow manifold inlets 502 to a directional vector at the one or more crossflow manifold outlets 504. The crossflow manifold body 500 may modify a downward directional vector 260 at the one or more crossflow manifold inlets 502 to a lateral directional vector 262 at the one or more crossflow manifold outlets 504. The crossflow manifold body 500 may provide a laterally accelerating directional vector 264. The modification to the directional vector from the one or more crossflow manifold inlets 502 to the one or more crossflow manifold outlets 504 may be about 90 degrees, such as from about 80 degrees to about 100 degrees, such as from about 70 degrees to about 90 degrees, or such as from about 85 to about 95 degrees. Additionally, or in the alternative, the directional vector of a flow field may be modified from the one or more crossflow manifold inlets 502 to the one or more crossflow manifold outlets 504 in an amount of from about 10 degrees to about 100 degrees, such as from about 30 degrees to about 90 degrees, such as from about 60 degrees to about 90 degrees, or from about 10 degrees to about 45 degrees.

A longitudinal axis 510 of one or more crossflow manifold inlets 502 may be oriented perpendicular to the build plane 225, or substantially perpendicular to the build plane 225, such as at about 90 degrees relative to the build plane 225, such as from about 80 to 100 degrees relative to the build plane 225, or such as from about 85 to 95 degrees relative to the build plane. Additionally, or in the alternative, a longitudinal axis 510 of one or more crossflow manifold inlets 502 may be oriented parallel or substantially parallel to the build plane 225, such as within about 10 degrees of parallel to the build plane 225, such as within about 5 degrees of parallel to the build plane 225, or within about 1 degree of parallel to the build plane 225. Additionally, or in the alternative, a longitudinal axis 510 of one or more crossflow manifold inlets 502 may be oriented oblique to the build plane 225, such as from about 5 degrees to about 85 degrees, such as from about 30 degrees to about 85, such as from about 60 degrees to about 80 degrees, or such as from about 10 degrees to about 45 degrees relative to the build plane 225.

In addition, or in the alternative, to an orientation of the longitudinal axis 510 of one or more crossflow manifold inlets 502 relative to the build plane 225, the longitudinal axis 510 of one or more crossflow manifold inlets 502 may be oriented may be oriented parallel or substantially parallel to the longitudinal axis 424 of the downflow manifold body 400, such as such as within about 10 degrees of the longitudinal axis 424 of the downflow manifold body 400, such as within about 5 degrees of the longitudinal axis 424 of the downflow manifold body 400, or such as within about 1 degree of the longitudinal axis 424 of the downflow manifold body 400. Additionally, or in the alternative, the longitudinal axis 510 of one or more crossflow manifold inlets 502 may be oriented oblique to the longitudinal axis 424 of the downflow manifold body 400, such as from about 5 degrees to about 85 degrees relative to the longitudinal axis 424 of the downflow manifold body 400, such as from about 30 degrees to about 85, such as from about 60 degrees to about 80 degrees, such as from about 10 degrees to about 45 degrees relative to the longitudinal axis 424 of the downflow manifold body 400.

Additionally, or in the alternative, the longitudinal axis 510 of one or more crossflow manifold inlets 502 may be oriented parallel or substantially parallel to the longitudinal axis 316 of the irradiation chamber 120 and/or crossflow chamber 310, such as within about 10 degrees of parallel to the longitudinal axis 316 of the irradiation chamber 120 and/or crossflow chamber 310, such as within about 5 degrees of parallel to the longitudinal axis 316 of the irradiation chamber 120 and/or crossflow chamber 310, or within about 1 degree of parallel to the longitudinal axis 316 of the irradiation chamber 120 and/or crossflow chamber 310. Additionally, or in the alternative, the longitudinal axis 510 of one or more crossflow manifold inlets 502 may be oriented oblique to the longitudinal axis 316 of the irradiation chamber 120 and/or crossflow chamber 310, such as from about 5 degrees to about 85 degrees relative to the longitudinal axis 316 of the irradiation chamber 120 and/or crossflow chamber 310, such as from about 30 degrees to about 85, such as from about 60 degrees to about 80 degrees, such as from about 10 degrees to about 45 degrees relative to the longitudinal axis 316 of the irradiation chamber 120 and/or crossflow chamber 310. Additionally, or in the alternative, the longitudinal axis 510 of one or more crossflow manifold inlets 502 may be oriented perpendicular or substantially perpendicular to the longitudinal axis 316 of the irradiation chamber 120 and/or crossflow chamber 310, such as within about 10 degrees of perpendicular to the longitudinal axis 316 of the irradiation chamber 120 and/or crossflow chamber 310, such as within about 5 degrees of perpendicular to the longitudinal axis 316 of the irradiation chamber 120 and/or crossflow chamber 310, or within about 1 degree of perpendicular to the longitudinal axis 316 of the irradiation chamber 120 and/or crossflow chamber 310.

A lateral axis 512 of the one or more crossflow manifold outlets 504 may be oriented parallel to the build plane 225, or substantially parallel to the build plane 225, such as at about 0 degrees relative to the build plane 225, such as within about 10 degrees of parallel to the build plane 225, such as within about 5 degrees of parallel to the build plane 225, or within about 1 degree of parallel to the build plane 225. The one or more crossflow manifold outlets 504 may discharge a lateral flow field with a lateral directional vector 262 oriented parallel to the build plane 225, or substantially parallel to the build plane 225, such as at about 0 degrees relative to the build plane 225, such as within about 10 degrees of parallel to the build plane 225, such as within about 5 degrees of parallel to the build plane 225, or within about 1 degree of parallel to the build plane 225. The lateral directional vector 262 may be oriented oblique and/or upward relative to the build plane 225, such as from about 1 degree to about 20 degrees oblique and/or upward relative to the build plane 225, such as from about 1 degree to about 10 degrees oblique and/or upward relative to the build plane 225, or such as from about 1 degree to about 5 degrees oblique and/or upward relative to the build plane 225.

Referring now to FIGS. 6A-6F, exemplary crossflow manifold inlets 502 will be further described. As shown in FIG. 6A, one or more crossflow manifold pathway walls 508 may be disposed within a crossflow manifold inlet 502. Additionally, or in the alternative, one or more crossflow manifold pathway walls 508 may be located within the crossflow manifold body 500 downstream from the crossflow manifold inlet 502. At least some of the crossflow manifold pathway walls 508, and/or at least a portion of a respective crossflow manifold pathway walls 508 may be oriented parallel to a lateral axis 512 of the crossflow manifold body 500, or substantially parallel to the lateral axis 512 of the crossflow manifold body 500, such as within about 10 degrees of parallel to the lateral axis 512 of the crossflow manifold body 500, such as within about 5 degrees of parallel to the lateral axis 512 of the crossflow manifold body 500, or within about 1 degree of parallel to the lateral axis 512 of the crossflow manifold body 500. However, additionally, or in the alternative, at least some of the crossflow manifold pathway walls 508, and/or at least a portion of a respective crossflow manifold pathway walls 508 may be oriented oblique and/or perpendicular to the lateral axis 512 of the crossflow manifold body 500. A plurality of crossflow manifold pathway walls 508 may have a spacing determined based at least in part on a desired cross-sectional surface area of respective crossflow manifold pathways 506. A plurality of crossflow manifold pathway walls 508 may be spaced relative to one another so as to provide a uniformly sized cross-sectional surface area as between respective crossflow manifold pathways 506. The uniformly sized cross-sectional surface areas may differ in cross-sectional profile, for example, corresponding at least in part to the cross-sectional profile of the crossflow manifold inlet 502.

As shown in FIGS. 6B-6F, a crossflow manifold inlet 502 may include, and/or may be configured to receive, one or more inlet flow conditioners 600. An inlet flow conditioner 600 may include a lattice 602 defining a plurality of inlet flow conditioning channels 604. The plurality of inlet flow conditioning channels 604 may be configured and arranged in an array, such as an array of inlet flow conditioning channels 604. The inlet flow conditioning channels 604 may have any desired geometry. Suitable geometry for the plurality and/or array of inlet flow conditioning channels 604 may be selected based at least in part on the effect of the inlet flow conditioner 600 on flow of process gas through the crossflow manifold 222. For example, as shown, an inlet flow conditioner 600 may include a lattice 602 defining a plurality and/or an array of inlet flow conditioning channels 604 that have a hexagonal cross section. Additionally, or in the alternative, the plurality and/or array of inlet flow conditioning channels 604 may have any other desired geometric configuration, including a polygonal, elliptical, and/or curvilinear configuration.

As shown in FIGS. 6C and 6D, at least some of the plurality of inlet flow conditioning channels 604 may be oriented parallel to a longitudinal axis 510 of the crossflow manifold inlet 502. Additionally, or in the alternative, as shown in FIGS. 6E and 6F, at least some of the plurality of inlet flow conditioning channels 604 may be oriented oblique to the longitudinal axis 510 of the crossflow manifold inlet 502. For example, at least some of the plurality of inlet flow conditioning channels 604 may have an orientation that diverges from the longitudinal axis 510 of the crossflow manifold inlet 502. The obliquely oriented and/or converging inlet flow conditioning channels 604 may have an angle relative to the longitudinal axis 510 of the crossflow manifold inlet 502 of from about 0.1 degrees to about 20 degrees, such as from about 1 degree to about 10 degrees, or from about 0.1 degrees to about 5 degrees.

At least some of the plurality of inlet flow conditioning channels 604 may be oriented relative to a normal line perpendicular to a tangent of a curvilinear plane. For example, the curvilinear plane may correspond to a portion of a sphere, an ovoid, or the like. The orientation of at least some of the inlet flow conditioning channels 604 may at least partially correspond to an orientation of the respective crossflow manifold pathways 506 downstream from the inlet flow conditioning channels 604. For example, a longitudinal axis of at least some of the inlet flow conditioning channels 604 may be parallel, or substantially parallel, to a longitudinal axis of a respectively corresponding crossflow manifold pathway 506 determined, for example, about a region of the crossflow manifold inlet 502 and/or crossflow manifold body 500 adjacently downstream from the inlet flow conditioner 600 and/or the respectively oriented inlet flow conditioning channels 604. By way of example, a longitudinal axis of at least some of the inlet flow conditioning channels 604 may be within about 10 degrees of a longitudinal axis of a respectively corresponding crossflow manifold pathway 506, such as within about 5 degrees, or such as within about 1 degree of a longitudinal axis of a respectively corresponding crossflow manifold pathway 506, determined, for example, about a region of the crossflow manifold inlet 502 and/or crossflow manifold body 500 adjacently downstream from the inlet flow conditioner 600 and/or the respectively oriented inlet flow conditioning channels 604.

An inlet flow conditioner 600 may include one or more features configured to fit the inlet flow conditioner 600 to a crossflow manifold inlet 502. For example, as shown in FIGS. 6C-6F, the inlet flow conditioner 600 may have an outward circumference that corresponds to an inward circumference of the crossflow manifold inlet 502. The inlet flow conditioner 600 may be removably and/or fixedly inserted into the crossflow manifold inlet 502. For example, the inlet flow conditioner 600 may exhibit a snap-fit or press-fit characteristic when inserted into an inward circumference of a crossflow manifold inlet 502. The inlet flow conditioner 600 may include one or more alignment tabs 606. The one or more alignment tabs 606 may fit with a corresponding one or more alignment slots 608 in the crossflow manifold inlet 502. Additionally, or in the alternative, one or more alignment tabs 606 may be provided as part of the crossflow manifold inlet 502, and the inlet flow conditioner 600 may include a corresponding one or more alignment slots 608. Additionally, or in the alternative, an inlet flow conditioner 600 may be integrally formed as part of the crossflow manifold body 500 defining the crossflow manifold inlet 502.

Referring now to FIGS. 7A-7C, and with further reference to FIG. 5A, a crossflow manifold 222 may include an outlet flow conditioner 700 disposed in a crossflow manifold outlet 504. The crossflow manifold outlet may be configured to receive the outlet flow conditioner 700. Exemplary outlet flow conditioners 700 are shown in FIGS. 7A-7C. As shown in FIG. 5A, a crossflow manifold body 500 and/or a crossflow manifold outlet 504 may include one or more crossflow manifold sidewall 522 that respectively have one or more outlet flow conditioner access ports 524. One or more crossflow manifold bodies 500 may include one or more outlet flow conditioner slots 526 extending transversely across at least a portion of the one or more crossflow manifold bodies 500. A respective outlet flow conditioner access ports 524 may provide access to the one or more outlet flow conditioner slots 526. The one or more outlet flow conditioner slots 526 may extending transversely across the one or more crossflow manifold bodies adjacent to and/or upstream from the crossflow manifold outlet 504. One or more outlet flow conditioners 700 may be removably inserted through the respective outlet flow conditioner access ports 524 and transversely into a corresponding outlet flow conditioner slot 526. Additionally, or in the alternative, an outlet flow conditioner 700 may be integrally formed as part of the crossflow manifold outlet 504 and/or as part of the crossflow manifold body 500.

As shown in FIGS. 7A-7C, an outlet flow conditioner 700 may include a lattice 702 defining a plurality of outlet flow conditioning channels 704. The plurality of outlet flow conditioning channels 704 may be configured and arranged in an array, such as an array of outlet flow conditioning channels 704. The outlet flow conditioning channels 704 may have any desired geometry. Suitable geometry for the plurality and/or array of outlet flow conditioning channels 704 may be selected based at least in part on the effect of the outlet flow conditioner 700 on flow of process gas discharging from the crossflow manifold outlet 504. For example, as shown, an outlet flow conditioner 700 may include a lattice 702 defining a plurality and/or an array of outlet flow conditioning channels 704 that have a hexagonal cross section. Additionally, or in the alternative, the plurality and/or array of outlet flow conditioning channels 704 may have any other desired geometric configuration, including a polygonal, elliptical, and/or curvilinear configuration.

As shown in FIG. 7A, at least some of the plurality of outlet flow conditioning channels 704 may be oriented parallel to a lateral axis 512 of the crossflow manifold outlet 504. Additionally, or in the alternative, as shown in FIGS. 7B and 7C, at least some of the plurality of outlet flow conditioning channels 704 may be oriented oblique to the lateral axis 512 of the crossflow manifold outlet 504. For example, at least some of the plurality of outlet flow conditioning channels 704 may have an orientation that converges towards the lateral axis 512 of the crossflow manifold outlet 504 in a direction of the flow of process gas through the outlet flow conditioning channels 704. The obliquely oriented and/or converging outlet flow conditioning channels 704 may have an angle relative to the lateral axis 512 of the crossflow manifold outlet 504 of from about 0.1 degrees to about 20 degrees, such as from about 1 degree to about 10 degrees, or from about 0.1 degrees to about 5 degrees. An oblique and/or converging orientation of the outlet flow conditioning channels 704 may provide a pressure increase and/or an increase in velocity of a lateral flow field discharging from the crossflow manifold outlet 504, providing desired flow characteristics.

At least some of the plurality of outlet flow conditioning channels 704 may be oriented relative to a normal line perpendicular to a tangent of a curvilinear plane. For example, the curvilinear plane may correspond to a portion of a sphere, an ovoid, or the like. The orientation of at least some of the outlet flow conditioning channels 704 may at least partially correspond to a desired configuration of a lateral flow field discharging from the crossflow manifold outlet 504. For example, orientation of the outlet flow conditioning channels 704 may be configured to provide a converging lateral flow field discharging from the crossflow manifold outlet 504. A converging lateral flow field may provide a uniform crossflow of process gas, such as from a crossflow manifold 222 to a return manifold 204. Additionally, or in the alternative, a converging lateral flow field may prevent or reduce the tendency for process gas to escape from beneath the crossflow walls 314 of the crossflow chamber 310. By way of example, at least some of the outlet flow conditioning channels 704 may be oriented along a normal line perpendicular to a tangent of a curvilinear plane in which the length of the outlet flow conditioner 700 transverse to the lateral axis 512 of the crossflow manifold outlet 504 corresponds to a chord length of an arc extending transversely across the curvilinear plane, such as an arc. Additionally, or in the alternative, a width of the outlet flow conditioner 700 may correspond to a sagitta of the arc extending transversely across the curvilinear plane, such as an arc. Additionally, or in the alternative, at least some of the outlet flow conditioning channels 704 may be oriented along normal lines that intersect at a point corresponding to a radius of the arc extending transversely across the curvilinear plane. The arc length may be from about 1 degree to about 90 degrees, such as from about 5 degrees to about 60 degrees, such as from about 10 degrees to about 30 degrees.

Referring again to FIG. 5A, a crossflow manifold body 500 and/or a crossflow manifold outlet 504 may include one or more features configured to retain the one or more outlet flow conditioners 700 in respective outlet flow conditioner slots 526. For example, the crossflow manifold body 500 and/or the crossflow manifold outlet 504 may have one or more outlet ridges 528 that retain respective ones of the one or more outlet flow conditioners 700. An outlet flow conditioner 700 may have a cross-sectional profile configured to mate with a cross-sectional profile of an outlet flow conditioner access port 524 and/or an outlet flow conditioner slot 526. For example, as shown, an outlet flow conditioner access port 524 and/or an outlet flow conditioner slot 526 may have a "D" shaped cross-sectional profile, and an outlet flow conditioner 700 may have a corresponding "D" shape. Additionally, or in the alternative, an outlet flow conditioner 700 may include one or more alignment tabs similar to those described with reference to the inlet flow conditioners 600. The one or more alignment tabs 606 may fit with a corresponding one or more alignment slots 608 in the crossflow manifold outlet 504.

Now turning to FIGS. 8A-8B, exemplary return manifolds 204 will be described. A return manifold 204 may be in fluid communication with one or more process gas evacuation lines 208. The return manifold 204 may be configured to receive and/or evacuate a flow of process gas from an irradiation plenum 121 defined by an irradiation chamber 120. Additionally, or in the alternative, the return manifold 204 may be configured to receive and/or evacuate a flow of process gas from a crossflow plenum 311 defined by a crossflow chamber 310 and/or from a downflow plenum 309 defined by a downflow chamber 308. For example, a return manifold 204 may receive and/or evacuate a flow of process gas from a crossflow manifold 222 and/or a flow of process gas from a downflow manifold 210. A return manifold 204 may include one or more return manifold bodies 800. For example, as shown in FIGS. 8A and 8B, a return manifold body 800 may include a plurality of return manifold bodies 800 configured and arranged along a width of the return manifold 204. The plurality of return manifold bodies 800 may be coupled to one another. Additionally, or in the alternative, a plurality of return manifold bodies 800 may define respective portions of an integrally formed return manifold 204.

A return manifold body 800 may be configured to modify a cross-sectional surface area of a process gas flow field flowing into the return manifold 204 and through the return manifold body 800. A flow field flowing into the return manifold body 800 may have an elongate cross-sectional profile, corresponding, for example, to a crossflow plenum 311 defined by a crossflow chamber 310 and/or a downflow plenum 309 defined by a downflow chamber 308. A flow field exiting the return manifold body 800, such as into one or more process gas evacuation lines 208, may have a circular cross-sectional profile, corresponding, for example, to the one or more process gas evacuation lines 208. A flow field flowing into the return manifold body 800 may include a lateral flow field with a lateral directional vector 262. The lateral flow field and/or the lateral directional vector 262 may correspond to an orientation of a crossflow plenum 311 defined by a crossflow chamber 310. Additionally, or in the alternative, the lateral flow field and/or the lateral directional vector 262 may correspond to an orientation of a downward flow of process gas redirected and/or accelerated laterally into the return manifold body 800. A flow field existing the return manifold body 800 may include an upward directional vector 266 corresponding, for example to an orientation of a process gas evacuation line 208.

A return manifold 204 may include one or more return manifold inlets 802 and one or more return manifold outlets 804. The return manifold 204 may include one more return manifold pathways 806 defined at least in part by the return manifold body 800. One or more return manifold pathway walls 808 may define at least a portion of one or more return manifold pathways 806. The one or more return manifold pathway walls 808 may be disposed within the return manifold body 800, and/or the one or more return manifold pathway walls 808 may be integrally formed with the return manifold body 800 as a single component. Process gas entering a return manifold inlet 802 may flow through the one more return manifold pathways 806 and exit the return manifold 204 at the one or more return manifold outlets 804.

The one or more return manifold inlets 802 may be configured to receive a lateral flow of process gas, such as from a crossflow plenum 311 defined by a crossflow chamber 310 and/or from an irradiation plenum 121 defined by an irradiation chamber 120. Additionally, or in the alternative, the one or more return manifold inlets 802 may be configured to receive a flow of process gas, such as a lateral flow and/or a laterally accelerating flow from a downflow plenum 309 defined by a downflow chamber 308 and/or from an irradiation plenum 121 defined by an irradiation chamber 120. The lateral flow of process gas received by a return manifold inlet 802 may have an elongate cross-sectional surface area. The return manifold body 800 may have a shape that conforms the cross-sectional surface area of a flow field from an inlet cross-sectional surface area, corresponding to one or more return manifold inlets 802, to an outlet cross-sectional surface area, corresponding to one or more return manifold outlets 804.

As shown, a return manifold inlet 802 may have an elongate cross-sectional profile, such as a circular cross-sectional profile. As shown, the elongate cross-sectional surface area of a return manifold inlet 802 may have a rectangular cross-sectional profile; however, other cross-sectional profiles are also contemplated, including curvilinear cross-sectional profiles, such as an elliptical cross-sectional profiles. The one or more return manifold outlets 804 may have an elliptical cross-sectional profile, such as a circular cross-sectional profile. However, return manifold outlets 804 with other cross-sectional profiles are also contemplated, including return manifold inlets 802 with rectangular or polygonal cross-sectional profiles.

A return manifold outlet 804 may discharge a flow of process gas supplied from one or more return manifold inlets 802. Additionally, or in the alternative, a return manifold outlet 804 may discharge a flow of process gas from one or more return manifold pathways 806. The number of return manifold outlets 804 may exceed the number of return manifold inlets 802 by at least one. A return manifold 204 may include one or more return manifold inlets 802 and a plurality of return manifold outlets 804, such as from one to three return manifold outlets 804 and from two to six return manifold inlets 802, such as one, two, or three return manifold inlets 802, and two, three, four, five, or six return manifold outlets 804. As shown in FIG. 8A, a return manifold 204 may include one return manifold inlet 802 and two return manifold outlets 804.

The configuration and arrangement of the return manifold body 800 may be determined at least in part to receive a lateral flow field with desired flow characteristics. The return manifold body 800, the one or more return manifold pathways 806, and/or the one or more return manifold pathway walls 808 may be configured to modify a cross-sectional profile of a flow field received by the return manifold 204. The cross-sectional profile of the flow field may be modified with respect to geometry and/or surface area. The cross-sectional profile of the flow field may be modified from an elongate cross-sectional profile, such as a rectangular cross-sectional profile, at the return manifold inlet 802, to an elliptical cross-sectional profile, such as a circular cross-sectional profile, at the one or more return manifold outlets 804. Additionally, or in the alternative, the return manifold body 800, the one or more return manifold pathways 806, and/or the one or more return manifold pathway walls 808 may be configured to modify a directional vector of the flow field. For example, the directional vector of the flow field may be modified from a lateral directional vector 262 at the return manifold inlet 802 to an upward directional vector 266 at the one or more return manifold outlets 804.

The return manifold body 800 may include one more return manifold pathways 806 that have a curvilinear profile. The curvilinear profile of the one more return manifold pathways 806 may facilitate a change in one or more geometric dimensions of the one more return manifold pathways 806 from the one or more return manifold inlets 802 to the one or more one or more return manifold outlets 804. Additionally, or in the alternative, the curvilinear profile of the one more return manifold pathways 806 may facilitate a change in the directional vector of the flow field of process gas from the one or more return manifold inlets 802 to the one or more one or more return manifold outlets 804. The return manifold body 800 may contract transversely relative to a longitudinal axis 810 of one or more return manifold outlets 804 and/or relative to a lateral axis 812 of a return manifold inlet 802. The curvilinear profile of the one more return manifold pathways 806 may facilitate a change in one or more geometric dimensions, and/or a change in the directional vector of the flow field of process gas from the return manifold inlet 802 to the one or more one or more return manifold outlets 804, without significantly disrupting a boundary layer air within the return manifold body 800, such as within the one or more respective return manifold pathways 806. For example, the curvilinear profile of the one or more return manifold pathways 806 may avoid form drag and flow separation, for example, by creating counter-rotating vortices which draw process gas further into the one or more respective return manifold pathways 806. At least a portion of the curvilinear profile return manifold body 800 may emulate at least a portion of an NACA air duct.

The return manifold body 800 may include an upward translation region 814 and/or a transverse contraction region 816. The upward translation region 814 may be located downstream from a return manifold inlet 802. The upward translation region 814 includes a region of the return manifold body 800 that exhibits an upward translation in the axial orientation of the return manifold body 800, for example, relative to the lateral axis 812 of a return manifold inlet 802 and/or relative to a longitudinal axis 810 of one or more return manifold outlets 804. The axial orientation of the return manifold body 800 may be aligned with the lateral axis 812, for example, at the return manifold inlet 802. The axial orientation of the return manifold body 800 may be aligned with the longitudinal axis 810, for example, at the one or more return manifold outlets 804. The alignment of the axial orientation of the return manifold body 800 may transition upwardly within the upward translation region 814, for example, providing increasing alignment with the longitudinal axis 810 and/or decreasing alignment with the lateral axis 812. The upward translation region 814 may include a translation of the axial orientation of the return manifold body 800 from being aligned with the lateral axis 812 to being aligned with the longitudinal axis 810. However, the return manifold body 800 need not be aligned precisely with the lateral axis 812 and/or the return manifold body 800 need not be aligned precisely with the longitudinal axis 810. At least some of a plurality of return manifold pathways 806 may exhibit an upward translation in the respective axial orientation within in the upward translation region 814 as described with reference to the return manifold body 800. The rate of upward translation may differ as between respective ones of the plurality of return manifold pathways 806.

The transverse contraction region 816 may be located downstream from an upward translation region 814. Additionally, or in the alternative, the transverse contraction region 816 may be located upstream from a return manifold outlet 804. The transverse contraction region 816 includes a region of the return manifold body 800 that exhibits a transverse contraction relative to the lateral axis 812 of a return manifold inlet 802 and/or relative to a longitudinal axis 810 of one or more return manifold outlets 804. At least one of the one or more return manifold pathways 806 may exhibit a transverse contraction in the transverse contraction region 816 described with reference to the return manifold body 800. The rate of transverse contraction may differ as between respective ones of a plurality of return manifold pathways 806. One or more of a plurality of return manifold pathways 806 need not exhibit a transverse contraction while at least some of the plurality of return manifold pathways 806 exhibit a transverse contraction within the transverse contraction region 816.

At least a portion of the upward translation region 814 may overlap with at least a portion of the transverse contraction region 816. Additionally, or in the alternative, at least a portion of the upward translation region 814 may be separated from at least a portion of the transverse contraction region 816. For example, a return manifold body 800 may include a longitudinal extension region 818 disposed between at least a portion of the upward translation region 814 and at least a portion of the transverse contraction region 816. The longitudinal extension region 818 represents a region of the return manifold body 800 that exhibits a longitudinal extension relative to the longitudinal axis 810 of a return manifold outlet 804. At least one of the one or more return manifold pathways 806 may exhibit a longitudinal extension in the longitudinal extension region 818 described with reference to the return manifold body 800. The degree of longitudinal extension region 818 may differ as between respective ones of the one or more return manifold pathways 806. At least one of the one or more return manifold pathways 806 need not exhibit a longitudinal extension while at least one of the one or more return manifold pathways 806 may exhibit a longitudinal extension within the longitudinal extension region 818.

A return manifold body 800 may include a lateral profiling region 820. The lateral profiling region 820 represents a region of the return manifold body 800 that exhibits a lateral change in cross-sectional profile, for example, relative to the cross-sectional profile of the return manifold inlet 802. For example, the cross-sectional profile of the return manifold body 800 may change laterally from a cross-sectional profile at the return manifold inlet 802 to a cross-sectional profile at the one or more return manifold outlets 804. At least some of a plurality of return manifold pathways 806 may exhibit a lateral change in cross-sectional profile in the lateral profiling region 820 described with reference to the return manifold body 800. The rate of change in the lateral cross-sectional profile may differ as between respective ones of the plurality of return manifold pathways 806. One or more of the plurality of return manifold pathways 806 need not exhibit a lateral change in cross-sectional profile while at least some of the plurality of return manifold pathways 806 exhibit a lateral change in cross-sectional profile within the lateral profiling region 820.

The lateral profiling region 820 may overlap at least a portion of the upward translation region 814 and/or at least a portion of the transverse contraction region 816. Additionally, or in the alternative, at least a portion of the lateral profiling region 820 may be separated from at least a portion of the upward translation region 814 and/or from at least a portion of the transverse contraction region 816. The lateral profiling region 820 may overlap at least a portion of the longitudinal extension region 818. Additionally, or in the alternative, at least a portion of the lateral profiling region 820 may be separated from at least a portion of the longitudinal extension region 818. The longitudinal extension region 818 may be disposed between at least a portion of the lateral profiling region 820 and at least a portion of the upward translation region 814. The longitudinal extension region 818 may exhibit a longitudinal extension relative to the longitudinal axis 810 of a return manifold outlet 804, without a lateral change in cross-sectional profile such as may be exhibited in the lateral profiling region 820. At least one of the one or more return manifold pathways 806 may exhibit a longitudinal extension in the longitudinal extension region 818, without a lateral change in cross-sectional profile such as may be exhibited in the lateral profiling region 820. At least one of the one or more plurality of return manifold pathways 806 need not exhibit a lateral change in cross-sectional profile, while at least one of the one or more return manifold pathways 806 may exhibit a lateral change in cross-sectional profile within the lateral profiling region 820.

One or more geometric properties of the one or more return manifold pathways 806, and/or of the cross-sectional profile of the flow field, may be modified at one or more regions from the return manifold inlet 802 to the one or more return manifold outlets 804. For example, an elongate cross-sectional profile, such as a rectangular cross-sectional profile, at the return manifold inlet 802 may be confirmed to an elliptical cross-sectional profile, such as a circular cross-sectional profile, at the one or more return manifold outlets 804. Additionally, or in the alternative, the cross-sectional surface area of the cross-sectional profile of the flow field may be modified as between the return manifold inlet 802 and the one or more return manifold outlets 804. In various embodiments, the cross-sectional surface area may be increased, decreased, and/or maintained. The cross-sectional surface area of the flow field may remain substantially equivalent as between the return manifold inlet 802 and the one or more return manifold outlets 804. Additionally, or in the alternative, the cross-sectional surface area may be decreased from the return manifold inlet 802 to the one or more return manifold outlets 804, for example, in an amount of from about 5% to about 90%, such as from about 10% to about 80%, or such as from about 25% to about 75%. The decreasing cross-sectional surface area may provide a pressure increase and/or an increase in velocity of the flow field, which may result in good receipt and evacuation of the process gas. The cross-sectional surface area of the return manifold inlet 802 and the cross-sectional surface area of the one or more return manifold outlets 804 may be within about 25% of one another, such as within about 10% of one another, such as within about 5% of one another, or such as within about 1% of one another. Additionally, or in the alternative, the cross-sectional surface area of the return manifold inlet 802 and the cross-sectional surface area of the one or more return manifold outlets 804 may differ from one another by up to 125%, such as up to 100%, such as up to 50%, such as up to 25%. Such a pressure increase may be determined from pressure measurements obtained with one or more pressure sensors configured to determine an upstream pressure and a downstream pressure, and or a pressure differential. By way of example, such pressure or pressure differential may be determined by a differential pressure sensor The one or more return manifold inlets 802 may have a width and a height that are proportioned such that the width exceeds the height, for example, by a factor of from about 10:1 to 100:1, such as from about 10:1 to about 50:1, or such as from about 10:1 to about 20:1. A width of the lateral flow field of process gas discharged from the one or more return manifold outlets 804 may exceed a height of the lateral flow field. For example, a ratio of the width of the lateral flow field to the height of the lateral flow field may be from about 10:1 to 100:1, such as from about 10:1 to about 50:1, or such as from about 10:1 to about 20:1.

A cross-sectional surface area of one or more return manifold inlets 802 may correspond to a cross-sectional surface area of one or more crossflow manifold outlets 504 and/or to a cross-sectional surface area of a plurality of downflow manifold pathways 418. For example, a cross-sectional surface area of one or more return manifold inlets 802 may be configured to receive a volume of process gas corresponding to a volume of process gas from one or more crossflow manifold outlets 504 and/or from one or more downflow manifold pathways 418. A cross-sectional surface area of one or more return manifold inlets 802 may be substantially equivalent to the cross-sectional surface area of one or more crossflow manifold outlets 504 and/or one or more downflow manifold pathways 418 from which the one or more return manifold inlets 802 are intended to receive process gas. For example, the a cross-sectional surface area of one or more return manifold inlets 802 may be within about 25% of the cross-sectional surface area of one or more crossflow manifold outlets 504 and/or one or more downflow manifold pathways 418 from which the one or more return manifold inlets 802 are intended to receive process gas, such as within about 15%, such as within about 10%, or such as within about 5% of the cross-sectional surface area of one or more crossflow manifold outlets 504 and/or one or more downflow manifold pathways 418 from which the one or more return manifold inlets 802 are intended to receive process gas. Additionally, or in the alternative, the a cross-sectional surface area of one or more return manifold inlets 802 may be slightly larger, such as up to about 25% larger, than the cross-sectional surface area of one or more crossflow manifold outlets 504 and/or one or more downflow manifold pathways 418 from which the one or more return manifold inlets 802 are intended to receive process gas, such as up to about 15% larger, such as up to about 10% larger, or such as up to about 5% larger than the cross-sectional surface area of one or more crossflow manifold outlets 504 and/or one or more downflow manifold pathways 418 from which the one or more return manifold inlets 802 are intended to receive process gas.

In addition, or in the alternative, to changing a cross-sectional profile of a flow field, the return manifold body 800 may be configured to change a directional vector of the flow field. The return manifold body 800 may include one or more return manifold inlets 802 respectively fluidly communicating with an irradiation plenum 121 defined by an irradiation chamber 120, a crossflow plenum 311 defined by a crossflow chamber 310, and/or a downflow plenum 309 defined by a downflow chamber 308. The return manifold body 800 may be configured to change a direction vector of the flow field at the return manifold inlet 802 to a directional vector at the one or more return manifold outlets 804. The return manifold body 800 may modify a lateral directional vector 262 at the return manifold inlet 802 to an upward directional vector 266 at the one or more return manifold outlets 804. The return manifold body 800 may provide an upward accelerating directional vector 268. The modification to the directional vector from the return manifold inlet 802 to the one or more return manifold outlets 804 may be about 90 degrees, such as from about 80 degrees to about 100 degrees, such as from about 85 to about 95 degrees. Additionally, or in the alternative, the directional vector of a flow field may be modified from the return manifold inlet 802 to the one or more return manifold outlets 804 in an amount of from about 10 degrees to about 100 degrees, such as from about 30 degrees to about 90 degrees, such as from about 60 degrees to about 90 degrees, or from about 10 degrees to about 45 degrees.

A lateral axis 812 of a return manifold inlet 802 may be oriented parallel to the build plane 225, or substantially parallel to the build plane 225, such as within about 10 degrees of parallel to the build plane 225, such as within about 5 degrees of parallel to the build plane 225, or within about 1 degree of parallel to the build plane 225. Additionally, or in the alternative, a lateral axis 812 of a return manifold inlet 802 may be oriented oblique to the build plane 225, such as from about 5 degrees to about 85 degrees, such as from about 30 degrees to about 85, such as from about 60 degrees to about 80 degrees, or such as from about 10 degrees to about 45 degrees relative to the build plane 225. Additionally, or in the alternative, a lateral axis 812 of a return manifold inlet 802 may be oriented perpendicular to the build plane 225, or substantially perpendicular to the build plane 225, such as at about 90 degrees relative to the build plane 225, such as from about 80 to 100 degrees relative to the build plane 225, or such as from about 85 to 95 degrees relative to the build plane.

In addition, or in the alternative, to an orientation of the lateral axis 812 of a return manifold inlet 802 relative to the build plane 225, the lateral axis 812 of a return manifold inlet 802 may be oriented may be oriented perpendicular, or substantially perpendicular to the longitudinal axis 424 of the downflow manifold body 400, such as such as within about 10 degrees of perpendicular to the longitudinal axis 424 of the downflow manifold body 400, such as within about 5 degrees of perpendicular to the longitudinal axis 424 of the downflow manifold body 400, or such as within about 1 degree of perpendicular the longitudinal axis 424 of the downflow manifold body 400. Additionally, or in the alternative, the lateral axis 812 of a return manifold inlet 802 may be oriented oblique to the longitudinal axis 424 of the downflow manifold body 400, such as from about 5 degrees to about 85 degrees relative to the longitudinal axis 424 of the downflow manifold body 400, such as from about 30 degrees to about 85, such as from about 60 degrees to about 80 degrees, such as from about 10 degrees to about 45 degrees relative to the longitudinal axis 424 of the downflow manifold body 400.

Additionally, or in the alternative, the lateral axis 812 of a return manifold inlet 802 may be oriented perpendicular or substantially perpendicular to the longitudinal axis 316 of the irradiation chamber 120 and/or crossflow chamber 310, such as within about 10 degrees of perpendicular to the longitudinal axis 316 of the irradiation chamber 120 and/or crossflow chamber 310, such as within about 5 degrees of perpendicular to the longitudinal axis 316 of the irradiation chamber 120 and/or crossflow chamber 310, or within about 1 degree of perpendicular to the longitudinal axis 316 of the irradiation chamber 120 and/or crossflow chamber 310. Additionally, or in the alternative, the lateral axis 812 of a return manifold inlet 802 may be oriented oblique to the longitudinal axis 316 of the irradiation chamber 120 and/or crossflow chamber 310, such as from about 5 degrees to about 85 degrees relative to the longitudinal axis 316 of the irradiation chamber 120 and/or crossflow chamber 310, such as from about 30 degrees to about 85, such as from about 60 degrees to about 80 degrees, such as from about 10 degrees to about 45 degrees relative to the longitudinal axis 316 of the irradiation chamber 120 and/or crossflow chamber 310. Additionally, or in the alternative, the lateral axis 812 of a return manifold inlet 802 may be oriented parallel or substantially parallel to the longitudinal axis 316 of the irradiation chamber 120 and/or crossflow chamber 310, such as within about 10 degrees of parallel to the longitudinal axis 316 of the irradiation chamber 120 and/or crossflow chamber 310, such as within about 5 degrees of parallel to the longitudinal axis 316 of the irradiation chamber 120 and/or crossflow chamber 310, or within about 1 degree of parallel to the longitudinal axis 316 of the irradiation chamber 120 and/or crossflow chamber 310.

A longitudinal axis 810 of the one or more return manifold outlets 804 may be oriented perpendicular to the build plane 225, or substantially perpendicular to the build plane 225, such as at about 90 degrees relative to the build plane 225, such as within about 10 degrees of perpendicular to the build plane 225, such as within about 5 degrees of perpendicular to the build plane 225, or within about 1 degree of perpendicular to the build plane 225. The one or more return manifold outlets 804 may discharge an upward flow field with an upward directional vector 266 oriented perpendicular to the build plane 225, or substantially perpendicular to the build plane 225, such as at about 90 degrees relative to the build plane 225, such as within about 10 degrees of perpendicular to the build plane 225, such as within about 5 degrees of perpendicular to the build plane 225, or within about 1 degree of perpendicular to the build plane 225. The upward directional vector 266 may be oriented oblique relative to the build plane 225, such as from about 5 degrees to about 85 degrees relative to the build plane 225, such as from about 30 degree to about 60 degrees relative to the build plane 225, or such as from about 45 degrees to about 85 degrees relative to the build plane 225.

Referring now to FIG. 8B, a return manifold 204 may include one or more narrowing regions 821 representing a reduction in cross-sectional height of a return manifold inlet 802 and/or within a return manifold pathway 806. The one or more narrowing regions 821 may extend across all or a portion of a width of the return manifold inlet 802 and/or return manifold pathway 806. The one or more narrowing regions 821 may be located upstream from an upward translation region 814 of the return manifold body 800. The reduction in cross-sectional height may be provided with respect to a portion of the return manifold body 800 disposed above and/or below the return manifold inlet 802 and/or return manifold pathway 806. The one or more narrowing regions 821 may provide a venturi effect that accelerates process gas into and/or through the return manifold inlet 802 and/or the return manifold pathway 806.

As shown in FIG. 8B, in addition, or in the alternative to, one or more narrowing regions 821, a return manifold 204 may include one or more rib elements 822 protruding into the return manifold inlet 802 and/or into the return manifold pathway 806. The narrowing region 821 and/or the one or more rib elements 822 may be disposed about a return manifold inlet 802 and/or within a return manifold pathway 806. For example, as shown in FIG. 8B, a narrowing region 821 and/or a rib element 822 may be disposed within a return manifold pathway 806 and downstream from an inlet edge 824 of a return manifold inlet 802. Additionally, or in the alternative, as shown, a narrowing region 821 and/or a rib element 822 may be disposed within the return manifold pathway 806 and upstream from the upward translation region 814 of the return manifold body 800. The one or more narrowing regions 821 and/or the one or more rib elements 822 may be located at any position about the return manifold inlet 802 and/or within a return manifold pathway 806. As shown, a narrowing region and/or a rib element 822 may be disposed across a bottom portion of a return manifold pathway 806. Additionally, or in the alternative, one or more narrowing regions 821 and/or one or more rib elements 822 may be disposed across a top portion and/or a side portion of a return manifold pathway 806. A narrowing region 821 and/or a rib element 822 may extend across all or part of a bottom, top, or side portion of a return manifold pathway 806. The one or more narrowing regions 821 and/or the one or more rib elements 822 may be integrally formed as part of a return manifold body 800. Additionally, or in the alternative, one or more narrowing regions 821 and/or one or more rib elements 822 may be fixedly coupled to a return manifold body 800 as a separate component.

The one or more narrowing regions 821 and/or the one or more rib elements 822 may provide a pressure reduction within the return manifold inlet 802 and/or within the one or more return manifold pathways 806 that accelerates process gas flowing into the return manifold inlet 802 and/or through the one or more return manifold pathways 806. Such a pressure reduction may be determined from pressure measurements obtained with one or more pressure sensors configured to determine an upstream pressure and a downstream pressure, and or a pressure differential, with respect to the one or more narrowing regions 821 and/or the one or more rib elements 822. By way of example, such pressure or pressure differential may be determined by a differential pressure sensor. The one or more narrowing regions 821 and/or the one or more rib elements 822 may increase the efficiency of process gas recapture by the return manifold 204, for example, by drawing process gas into the return manifold inlet 802. Additionally, or in the alternative, the one or more narrowing regions 821 and/or the one or more rib elements 822 may reduce or prevent process gas losses. For example, a narrowing region 821 and/or a rib element 822 disposed across a bottom portion of a return manifold pathway may prevent process gas from flowing beneath the return manifold inlet 802 and/or the return manifold body 800.

As shown in FIG. 8B, a return manifold body 800 may include one or more recapture pathways 826 configured to receive process gas that flows past the return manifold inlet 802 into the one or more return manifold pathways 806. For example, the one or more recapture pathways 826 may receive process gas that flows beneath the return manifold inlet 802. The one or more recapture pathways 826 may be in the form of an elongate slit; however, other pathway configurations are also contemplated, such as an array of apertures, an array of perforations, a lattice, a grating, or the like. The one or more recapture pathways 826 may be disposed across at least a portion of a return manifold pathway 806, such as across a bottom portion, a top portion, and/or a side portion of a return manifold pathway 806. For example, as shown, a recapture pathway 826 may be disposed transversely across a bottom portion of a return manifold pathway 806. As shown, the one or more recapture pathways 826 may fluidly communicate with a return manifold pathway 806 downstream from an inlet edge 824 of a return manifold inlet 802. Additionally, or in the alternative, One or more recapture pathways 826 may fluidly communicate with a return manifold pathway 806 upstream from a narrowing region and/or a rib element 822, such as upstream from a foil edge 828 of a rib element 822. Additionally, or in the alternative, as shown, one or more recapture pathways 826 may be disposed within a return manifold pathway 806 and upstream from an upward translation region 814 of a return manifold body 800.

The one or more recapture pathways 826 may recapture process gas that flows past the return manifold inlet 802. For example, as shown in FIG. 8B, process gas flowing beneath the return manifold inlet 802 and/or the return manifold body 800 may be recaptured and drawn into the return manifold pathway 806 by the one or more recapture pathways 826. When the one or more recapture pathways 826 are disposed upstream from one or more narrowing regions 821 and/or one or more rib elements 822, a pressure reduction provided by the one or more narrowing regions 821 and/or the one or more rib elements 822 may accelerate process gas through the one or more recapture pathways 826 and into the return manifold pathway 806. For example, a recapture pathway 826 followed by a narrowing region 821 and/or a rib element 822 disposed across a bottom portion of a return manifold pathway 806 may work with one another to recapture process gas that may flow beneath the return manifold inlet 802.

Now turning to FIGS. 9A-9D, exemplary crossflow walls 314 of a crossflow chamber 310 will be further described. As shown in FIGS. 9A-9D, a crossflow wall 314 may include one or more flanges 900 with attachment points 901 configured to couple a crossflow wall 314 to a crossflow manifold 222, to a return manifold 204, and/or to a downflow wall 312. Additionally, or in the alternative, a crossflow wall 314 may be integrally formed with a crossflow manifold 222, a return manifold 204, and/or to a downflow wall 312, as a single component.

As shown, a crossflow wall 314 may include a crossflow manifold flange 902 with one or more attachment points 901 configured to couple the crossflow wall 314 to a crossflow manifold 222. Additionally, or in the alternative, a crossflow wall 314 may include a return manifold flange 904 with one or more attachment points 901 configured to couple the crossflow wall 314 to a return manifold 204. Further additionally, or in the alternative, a crossflow wall 314 may include a downflow wall flange 906 with one or more attachment points 901 configured to couple the crossflow wall 314 to a downflow wall 312.

A crossflow wall 314 may include one or more bevels 908 disposed between a face 910 of the crossflow wall 314 and respective ones of the one or more flanges 900. The one or more bevels 908 may slope away from the respective flanges 900, which may help prevent contaminants from accumulating around the respective flanges 900 and/or reduce accumulation of contaminants from around the respective flanges 900, such as where the flanges respectively attach to a crossflow manifold 222, to a return manifold 204, and/or to a downflow wall 312. The respective attachment points 901 of the crossflow manifold 222, the return manifold 204, and/or the downflow wall 312 may have a corresponding bevel (not shown) configured to mate with the respective bevel 908 on the crossflow wall 314.

As shown, a crossflow wall 314 may include a crossflow manifold bevel 912 corresponding to a crossflow manifold flange 902. Additionally, or in the alternative, a crossflow wall 314 may include a return manifold bevel 914 corresponding to a return manifold flange 904. Further additionally, or in the alternative, a crossflow wall 314 may include a downflow wall bevel 916 corresponding to a downflow wall flange 906.

As shown in FIGS. 9D and 9E, a crossflow wall 314 may include a crossflow ledge 918 disposed along a bottom portion of the crossflow wall 314, such as a bottom inward lateral edge of the crossflow wall 314. The crossflow ledge 918 may protrude transversely from the crossflow wall 314, such as inward towards a lateral axis 318 of a crossflow chamber 310 (e.g., FIGS. 3A-3D). The crossflow ledge 918 may prevent process gas from escaping under the bottom portion of the crossflow wall 314. For example, the crossflow ledge 918 may generate turbulence that lifts process gas flowing adjacent to the crossflow ledge 918 and redirects such process gas into the bulk flow of the flow field flowing through the crossflow plenum 311 defined by the crossflow chamber 310.

As shown in FIGS. 9E, a crossflow wall 314 may include an outward ledge 920 disposed along a bottom portion of the crossflow wall 314, such as a bottom outward lateral edge of the crossflow wall 314. A crossflow wall may include an outward ledge 920 in addition, or in the alternative to, a crossflow ledge 918. The outward ledge 920 may protrude transversely from the crossflow wall 314, such as exterior from the crossflow chamber 310 (e.g., FIGS. 3A-3D). The outward ledge 920 may prevent process gas from escaping under the bottom portion of the crossflow wall 314. For example, the outward ledge 920 may present an increased distance for process gas to travel before escaping from under the bottom portion of the crossflow wall 314. The outward ledge 920 may function independently from, or in coordination with, the crossflow ledge 918. For example, turbulence generated by the crossflow ledge 918 may draw process gas from beneath the outward ledge and back into the crossflow chamber 310.

Now turning to FIGS. 10A-10F, exemplary flow fields will be described. As shown in FIGS. 10A and 10B, process gas flowing through one or more process gas supply line 206 to a crossflow manifold 222 may have a downward directional vector 260. Process gas flowing from a crossflow manifold 222 into a crossflow plenum 311 may have a laterally accelerating directional vector 264, for example, as the directional flow of the process gas changes from a downward direction to a lateral direction. Process gas flowing through a crossflow plenum 311 may have a lateral directional vector 262. Process gas may flow from the crossflow plenum 311 into a return manifold 204 with a lateral directional vector. Process gas flowing through the return manifold 204 may have an upward accelerating directional vector 268. Process gas may exit the return manifold 204, flowing into one or more process gas evacuation lines 208 with an upward directional vector. Additionally, or in the alternative, process gas flowing into an irradiation plenum 121 and/or a downflow plenum 309 may have a downward directional vector 260. Process gas flowing from the irradiation plenum into the crossflow plenum 311 and/or into the return manifold 204 may have a laterally accelerating directional vector 264.

A flow field of process gas may have different properties with respect to different regions of an irradiation plenum 121, a crossflow plenum 311, and/or a downflow plenum 309. Additionally, or in the alternative, a plurality of flow fields with one or more respectively different properties may be determinable within the irradiation plenum 121, the crossflow plenum 311, and/or the downflow plenum 309. As shown in FIG. 10A, a flow of process gas through a crossflow flow plenum 311 may include a crossflow flow field 350 with a relatively high velocity, for example, in comparison to one or more other flow fields within the irradiation plenum 121 and/or the downflow plenum 309. The crossflow flow field 350 may occupy all or a portion of the crossflow plenum 311. A crossflow flow field 350 may represent the highest velocity in the irradiation plenum 121.

As shown in FIGS. 10A and 10B, a flow of process gas through a downflow plenum 309 may include a primary downflow flow field 352. The primary downflow flow field 352 may include a region of the downward flow of process gas that has a relatively moderate velocity, for example, relative to the crossflow flow field 350. The primary downflow flow field 352 may occupy an annular or semiannular region extending longitudinally below at least a portion of the downflow manifold 210. The process gas in the primary downflow flow field 352 may be supplied from a downflow manifold 210, such as from a plurality of downflow manifold apertures 422 disposed about one or more walls of the downflow manifold 210. A flow of process gas through a downflow plenum 309 may include a quiescent downflow flow field 354. The quiescent downflow flow field 354 may represent a region of the downflow plenum 309 that exhibits a relatively quiescent flow of process gas, such as relatively latent, mild, and/or gentle flow of process gas. The quiescent downflow flow field 354 may be disposed below one or more optics windows 234 that separate one or more optical elements 233 of an irradiation device 216 from the irradiation plenum 121. The quiescent downflow flow field 354 may be at least partially surrounded by the primary downflow flow field 352. For example, at least a portion of the primary downflow flow field 352 may circumferentially surround at least a portion of the quiescent downflow flow field 354. The quiescent downflow flow field 354 may exhibit a crossflow, for example, with a radially outward directional vector and/or a downwardly accelerating directional vector 360. Such a crossflow may be located in a region of the downflow plenum 309 adjacent to the one or more optics windows 234.

A flow of process gas through a downflow plenum 309 may include an intermediate downflow flow field 356. The intermediate downflow flow field 356 may be disposed between a primary downflow flow field 352 and a quiescent downflow flow field 354. The intermediate downflow flow field 356 may represent a transition region of the downflow plenum 309, such as a transition from the primary downflow flow field 352 to the quiescent downflow flow field 354. The intermediate downflow flow field 356 may occupy an annular or semiannular region of the downflow plenum 309, such as an annular or semiannular region extending longitudinally below at least a portion of the downflow manifold 210 and/or at least a portion of the one or more optics windows 234 that separate one or more optical elements 233 of an irradiation device 216 from the irradiation plenum 121.

The intermediate downflow flow field 356 may be at least partially surrounded by the primary downflow flow field 352. For example, at least a portion of the primary downflow flow field 352 may circumferentially surround at least a portion of the intermediate downflow flow field 356. Additionally, or in the alternative, the intermediate downflow flow field 356 may at least partially surround the quiescent downflow flow field 354. For example, at least a portion of the intermediate downflow flow field 356 may circumferentially surround at least a portion of the quiescent downflow flow field 354. At least a portion of the intermediate downflow flow field 356 may occupy a radially inward region of the downflow plenum 309, such as a radially inward region extending longitudinally below at least a portion of the quiescent downflow flow field 354.

Still referring to FIGS. 10A and 10B, a flow of process gas through a downflow plenum 309 may include a lateral acceleration flow field 358. The lateral acceleration flow field 358 may include a portion of the downflow plenum 309 in which process gas laterally accelerates, for example, as a result of acceleration and entrainment by the crossflow flow field 350 and/or suction from the return manifold 204. The lateral acceleration flow field 358 may represent a transition region of the downflow plenum 309, such as a transition from the primary downflow flow field 352 to the crossflow flow field 350. At least a portion of the lateral acceleration flow field 358 may be disposed between a primary downflow flow field 352 and a crossflow flow field 350. Additionally, or in the alternative, at least a portion of the lateral acceleration flow field 358 may be biased laterally towards a return manifold inlet 802 and/or relative to the longitudinal axis 316 of the irradiation chamber 120. The lateral acceleration flow field 358 may occupy a proximal region of the downflow plenum 309 relative to the build plane 225, such as a proximal region extending longitudinally below at least a portion of the downflow manifold 210 and/or at least a portion of the one or more optics windows 234 that separate one or more optical elements 233 of an irradiation device 216 from the irradiation plenum 121.

A flow of process gas through a downflow plenum 309 may include an intermediate lateral acceleration flow field 362. The intermediate lateral acceleration flow field 362 may include a portion of the downflow plenum 309 in which process gas laterally accelerates in a relatively intermediate rate, for example, in comparison to the lateral acceleration flow field 358, such as from entrainment by the crossflow flow field 350 and/or suction from the return manifold 204. The intermediate lateral acceleration flow field 362 may represent a transition region of the downflow plenum 309, such as a transition from the intermediate downflow flow field 356 to the crossflow flow field 350. At least a portion of the intermediate lateral acceleration flow field 362 may be disposed between an intermediate downflow flow field 356 and a crossflow flow field 350. Additionally, or in the alternative, at least a portion of the intermediate lateral acceleration flow field 362 may be biased centrally relative to the longitudinal axis 316 of the irradiation chamber 120 and/or laterally towards a crossflow manifold outlet 504. The intermediate lateral acceleration flow field 362 may occupy a proximal region of the downflow plenum 309 relative to the build plane 225, such as a proximal region extending longitudinally below at least a portion of the intermediate downflow flow field 356, and/or below at least a portion of the downflow manifold 210 and/or at least a portion of the one or more optics windows 234. At least a portion of the lateral acceleration flow field 358 may be disposed laterally adjacent to at least a portion of the intermediate lateral acceleration flow field 362. For example, the lateral acceleration flow field 358 may be disposed laterally outward relative to the longitudinal axis 316 of the irradiation chamber 120, and/or the intermediate lateral acceleration flow field 362 may be disposed laterally inward relative to the longitudinal axis 316 of the irradiation chamber 120.

The bulk flow rate of the process gas in the downflow plenum 309 may be selected to suitably capture contaminants that may propagate out of the crossflow plenum 311. The regional velocity of the process gas in the downflow plenum 309 may differ as between different flow field within the downflow plenum 309. By way of example, an exemplary downflow velocity curve 364 represents a differing velocity as between respective flow fields is shown in FIGS. 10A and 10B. Relatively higher velocity may be exhibited in the primary downflow flow field 352, for example, in comparison to relatively lower velocity in the quiescent downflow flow field 354. Additionally, or in the alternative, relatively intermediate velocity may be exhibited in the intermediate downflow flow field 356. It will be appreciated that the downflow velocity curve 364 shown in FIGS. 10A and 10B is provided by way of example only, and not to be limiting. It will be appreciated that other velocity curves are contemplated and are within the scope of the present disclosure, and that such other velocity curves may be realized by various embodiments and/or modifications of the features of the presently disclosed inertization system 200.

Referring now to FIG. 10C, an exemplary crossflow plenum 311 is shown, taken from cross-section C-C shown in FIG. 10A. The crossflow plenum 311 may exhibit a crossflow flow field 350. The process gas in the crossflow flow field 350 may be supplied from a crossflow manifold 222, such as from a crossflow manifold outlet 504. A lateral velocity of the process gas in the crossflow flow field 350 flowing through the crossflow plenum 311 may exceed a downward velocity of the process gas in the irradiation plenum 121 and/or the downflow plenum 309. For example, the velocity of the process gas in the crossflow flow field 350 may be relatively higher than the velocity of the process gas in the primary downflow flow field 352, in the intermediate downflow flow field 356, and/or in the quiescent downflow flow field 354.

The bulk flow rate of the process gas in the crossflow plenum 311 may be selected to suitably remove and/or evacuate contaminants from the irradiation plenum 121, including the crossflow plenum 311 and/or the downflow plenum 309. The velocity of process gas in the crossflow plenum 311 may be selected to rapidly remove and/or evacuate contaminants without disturbing powder material 114 in the powder bed 227. The regional velocity of the process gas in the crossflow plenum 311 may be relatively uniform across the crossflow plenum 311. By way of example, an exemplary crossflow velocity curve 366 represents a relatively uniform velocity across the crossflow flow field 350. It will be appreciated that the crossflow velocity curve 366 shown in FIG. 10C is provided by way of example only, and not to be limiting. It will be appreciated that other velocity curves are contemplated and are within the scope of the present disclosure, and that such other velocity curves may be realized by various embodiments and/or modifications of the features of the presently disclosed inertization system 200.

Referring now to FIGS. 10D-10F, exemplary irradiation chambers 120 and irradiation plenums 121, such as crossflow chambers 310 and crossflow plenums 311, and/or downflow chambers 308 and downflow plenums 309, will be further described. An irradiation chamber 120 may define an irradiation plenum 121 that includes an irradiation zone 370. Additionally, or in the alternative, a downflow chamber 308 may define a downflow plenum 309 that includes an irradiation zone 370, and/or a crossflow chamber may define a crossflow plenum 311 that includes an irradiation zone 370. The irradiation zone 370 may represent a portion of an irradiation plenum 121, a downflow plenum 309, and/or a crossflow plenum 311, utilized by an energy beam 214 during additive manufacturing. An irradiation zone 370 may include one or more dimensions that correspond to one or more dimensions of a scan field 212 of one or more energy beams 214. For example, an irradiation zone 370 and a scan field 212 may have the same cross-sectional surface area at one or more locations along a longitudinal axis 316 of an irradiation chamber 120. Additionally, or in the alternative, an irradiation zone 370 may have a cross-sectional surface area that is smaller than the scan field 212 of one or more energy beams 214, for example, at one or more locations along a longitudinal axis 316 of an irradiation chamber 120.

The irradiation zone 370 may occupy all or a portion of a crossflow plenum 311. A crossflow plenum 311 may include an ancillary zone 372. The ancillary zone 372 may include a portion of the crossflow plenum 311 that is not utilized by the one or more energy beams 214 during additive manufacturing. The ancillary zone 372 may represent a portion of an irradiation plenum 121, a downflow plenum 309, and/or a crossflow plenum 311, that may remain unused by an energy beam 214 during additive manufacturing. An ancillary zone 372 may represent a region outside the scan field of the one or more energy beams 214. For example, the ancillary zone 372 may surround at least a portion of the irradiation zone 370.

As shown in FIG. 10D-10F, an irradiation chamber 120 may define an irradiation plenum 121 that includes an ancillary zone 372 circumferentially surrounding an irradiation zone 370. For example, an irradiation chamber 120 may have a rectangular cross-sectional profile. Additionally, or in the alternative, a crossflow chamber 310 may define a crossflow plenum 311 with a rectangular cross-sectional profile, and/or downflow chamber 308 may define a downflow plenum 309 with a rectangular cross-sectional profile. As shown in FIG. 10D, a lateral flow field within the irradiation zone 370 and/or the ancillary zone 372 may have a lateral directional vector 262.

As shown in FIG. 10D, a bulk flow 374 of the lateral flow field may be substantially perpendicular to a lateral axis 318 of the irradiation chamber 120, of the crossflow chamber 310, and/or of the downflow chamber 308. Additionally, or in the alternative, as shown in FIGS. 10E and 10F, a bulk flow 374 of the lateral flow field may converge towards the lateral axis 318 of the irradiation chamber 120, of the crossflow chamber 310, and/or of the downflow chamber 308. A converging bulk flow 374 may be realized by a configuration and arrangement of a crossflow manifold 222, such as a configuration and arrangement of a crossflow manifold outlet 504. A crossflow manifold outlet 504 may be configured to provide a converging bulk flow 374 with a lateral directional vector 262 that converges towards the lateral axis 318. For example, a crossflow manifold outlet 504 may include one or more crossflow manifold pathway walls 508 oriented relative to a normal line perpendicular to a tangent of a curvilinear crossflow plane 378. Additionally, or in the alternative, a crossflow manifold outlet 504 may include an outlet flow conditioner 700 configured to provide a converging bulk flow 374. An outlet flow conditioner 700 may include a plurality of outlet flow conditioning channels 704 oriented relative to a normal line perpendicular to a tangent of a curvilinear crossflow plane 378.

The convergence of the bulk flow 374 towards the lateral axis 318 may orient the flow of process gas with respect to the irradiation zone 370, for example, in favor of the ancillary zone 372. For example, as shown in FIG. 10E, by converging the bulk flow 374 towards the lateral axis 318, a portion of the ancillary zone 372 may be untraversed by the bulk flow 374. Additionally, or in the alternative, a boundary layer 376 of the bulk flow 374 may cut across the ancillary zone 372. A converging bulk flow 374 may help a return manifold 204 recapture process gas. For example, converging bulk flow 374 may direct process gas into the return manifold inlet 802. Additionally, or in the alternative, a converging bulk flow 374 may reduce or minimize eddy currents along the boundary layer 376 of the bulk flow 374, and/or a converging bulk flow 374 may reduce disruption of the boundary layer 376, such as by interaction from eddy currents and/or by interactions with the crossflow walls 314.

An irradiation chamber 120, a downflow chamber 308, and/or a crossflow chamber 310, may include one or more crossflow walls 314 that are substantially aligned with a boundary layer 376 of a converging bulk flow 374 of process gas. For example, as shown in FIG. 10F, an irradiation chamber 120, a downflow chamber 308, and/or a crossflow chamber 310 may have a trapezoidal cross-sectional profile. Additionally, or in the alternative, one or more crossflow walls 314 may be oriented convergingly towards a lateral axis 318. With the one or more crossflow walls 314 oriented convergingly towards the lateral axis 318, the return manifold may exhibit improved recapture of process gas. For example, the converging crossflow walls 314 may direct process gas into the return manifold inlet 802. Additionally, or in the alternative, the converging crossflow walls 314 may reduce or minimize eddy currents along the boundary layer 376 of the bulk flow 374, and/or the converging crossflow walls 314 may reduce disruption of the boundary layer 376, such as by interaction from eddy currents and/or by interactions between the bulk flow 374 and the crossflow walls 314.

As depicted, for example, in FIG. 10F, a return manifold 204 may be configured to receive a converging bulk flow 374. For example, a return manifold inlet 802 may be configured to receive a converging bulk flow 374. A return manifold inlet 802 may include one or more return manifold pathway walls 808 oriented relative to a normal line perpendicular to a tangent of a curvilinear evacuation plane 380. The normal line perpendicular to the tangent of the curvilinear evacuation plane 380 may coincide with a normal line perpendicular to a tangent of a curvilinear crossflow plane 378 of a crossflow manifold outlet 504 and/or of an outlet flow conditioner 700.

Now turning to FIG. 11, an exemplary control system for an additive manufacturing machine 102 or additive manufacturing system 100 will be described. A control system 104 may be configured to perform one or more control operations. A control system 104 may be configured to output one or more control commands associated with an additive manufacturing machine 102. The control commands may be configured to control one or more controllable components of an additive manufacturing machine 102.

As shown in FIG. 11 an exemplary control system 104 includes a controller 1100. The controller may include one or more control modules 1102 configured to cause the controller 1100 to perform one or more control operations. The one or more control modules 1102 may include control logic executable to determine one or more operating parameters for an additive manufacturing machine 102, such as setpoints for one or more build units 110 and/or setpoints for one or more inertization systems 200, for example, for performing operations in accordance with the present disclosure. Additionally, or in the alternative, the one or more control modules 1102 may include control logic executable to provide control commands configured to control one or more controllable components associated with an additive manufacturing machine 102, such as controllable components associated with one or more build units 110 and/or one or more inertization systems 200. For example, a control module 1102 may be configured to provide one or more control commands based at least in part on one or more setpoints for performing operations in accordance the present disclosure.

The controller 1100 may be communicatively coupled with an additive manufacturing machine 102. The controller 1100 may be communicatively coupled with one or more components of an additive manufacturing machine 102, such as one or more components of an energy beam system 118, and/or a monitoring system 254. The controller 1100 may also be communicatively coupled with a management system 106 and/or a user interface 108.

The controller 1100 may include one or more computing devices 1104, which may be located locally or remotely relative to the additive manufacturing machine 102 and/or the monitoring system 254. The one or more computing devices 1104 may include one or more processors 1106 and one or more memory devices 1108. The one or more processors 1106 may include any suitable processing device, such as a microprocessor, microcontroller, integrated circuit, logic device, and/or other suitable processing device. The one or more memory devices 1108 may include one or more computer-readable media, including but not limited to non-transitory computer-readable media, RAM, ROM, hard drives, flash drives, and/or other memory devices 1108.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1108 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1108 may store information accessible by the one or more processors 1106, including computer-executable instructions 1110 that can be executed by the one or more processors 1106. The instructions 1110 may include any set of instructions which when executed by the one or more processors 1106 cause the one or more processors 1106 to perform operations, including optical element monitoring operations, maintenance operations, cleaning operations, calibration operations, and/or additive manufacturing operations.

The memory devices 1108 may store data 1112 accessible by the one or more processors 1106. The data 1112 can include current or real-time data 1112, past data 1112, or a combination thereof. The data 1112 may be stored in a data library 1114. As examples, the data 1112 may include data 1112 associated with or generated by an additive manufacturing system 100 and/or an additive manufacturing machine 102, including data 1112 associated with or generated by the controller 1100, an additive manufacturing machine 102, an energy beam system 118, a monitoring system 254, a management system 106, a user interface 108, and/or a computing device 1104. Such data 1112 may pertain to operation of one or more build units 110 and/or one or more inertization systems 200. The data 1112 may also include other data sets, parameters, outputs, information, associated with an additive manufacturing system 100 and/or an additive manufacturing machine 102.

The one or more computing devices 1104 may also include a communication interface 1116, which may be used for communications with a communication network 1118 via wired or wireless communication lines 1120. The communication interface 1116 may include any suitable components for interfacing with one or more network(s), including for example, transmitters, receivers, ports, controllers, antennas, and/or other suitable components. The communication interface 1116 may allow the computing device 1104 to communicate with various nodes on the communication network 1118, such as nodes associated with the additive manufacturing machine 102, one or more build units 110, one or more inertization systems 200, the management system 106, and/or a user interface 108. The communication network 1118 may include, for example, a local area network (LAN), a wide area network (WAN), SATCOM network, VHF network, a HF network, a Wi-Fi network, a WiMAX network, a gatelink network, and/or any other suitable communication network 1118 for transmitting messages to and/or from the controller 1100 across the communication lines 1120. The communication lines 1120 of communication network 1118 may include a data bus or a combination of wired and/or wireless communication links.

The communication interface 1116 may allow the computing device 1104 to communicate with various components of an additive manufacturing system 100 and/or an additive manufacturing machine 102 communicatively coupled with the communication interface 1116 and/or communicatively coupled with one another, including one or more build units 110 and/or one or more inertization systems 200. The communication interface 1116 may additionally or alternatively allow the computing device 1104 to communicate with the management system 106 and/or the user interface 108. The management system 106 may include a server 1122 and/or a data warehouse 1124. As an example, at least a portion of the data 1112 may be stored in the data warehouse 1124, and the server 1122 may be configured to transmit data 1112 from the data warehouse 1124 to the computing device 1104, and/or to receive data 1112 from the computing device 1104 and to store the received data 1112 in the data warehouse 1124 for further purposes. The server 1122 and/or the data warehouse 1124 may be implemented as part of a control system 104 and/or as part of the management system 106.

Now turning to FIG. 12, exemplary methods of additively manufacturing three-dimensional objects will be described. As shown, an exemplary method 1200 may include, at block 1202, positioning a build unit 110 above a region of a powder bed 227. The region of the powder bed 227 may include a portion of the powder bed 227 intended to be irradiated. Positioning the build unit 110 may include moving the build unit 110, such as with a build unit-positioning system 124. Additionally, or in the alternative, moving the build unit 110 may include moving a build vessel 112 configured to support the powder bed 227 beneath the build unit 110, for example, with a build vessel-positioning system 128. The build unit 110 may include an energy beam system 118 and an inertization system 200. The energy beam system 118 may include one or more irradiation devices 216 respectively configured to direct one or more energy beams 214 onto a region of a powder bed 227 corresponding to a respective scan field 212 of the one or more energy beams 214. The inertization system 200 may include an irradiation chamber 120 defining an irradiation plenum 121. The inertization system 200 may additionally or alternatively include one or more supply manifolds 202 configured to supply process gas to the irradiation plenum 121 and/or and a return manifold 204 configured to receive and/or evacuate process gas from the irradiation plenum.

An exemplary method 1200 may include, at block 1204, irradiating a region of a powder bed 227 with the build unit 110 situated above the region of the powder bed 227 intended to be irradiated. At block 1206, an exemplary method 1200 may include flowing process gas through the one or more supply manifolds 202 and into the irradiation plenum 121 while irradiating the powder bed 227. The one or more supply manifolds 202 may include a downflow manifold 210 configured to provide a downward flow of process gas through at least a portion of the irradiation plenum 121 defined by the irradiation chamber 120. Additionally, or in the alternative, the one or more supply manifolds 202 may include a crossflow manifold 222 configured to provide a lateral flow of process gas through at least a portion of the irradiation plenum 121 defined by the irradiation chamber 120.

Flowing process gas through the one or more supply manifolds 202 and into the irradiation plenum 121 may include flowing process gas through a plurality of downflow manifold apertures 422 disposed within the one or more inward downflow manifold walls 412. The plurality of downflow manifold apertures 422 may fluidly communicate between one or more downflow manifold pathways 418 and an optics plenum 235. The one or more downflow manifold pathways 418 may be defined by the downflow manifold body 400. The downflow manifold body 400 may include one or more inward downflow manifold walls 412 defining the optics plenum 235. The optics plenum may include a distal portion of the irradiation plenum 121 relative to the powder bed 227. The plurality of plurality of downflow manifold apertures 422 may be oriented parallel to a longitudinal axis 424 of the downflow manifold body 400 or within 10 degrees of parallel to the longitudinal axis 424 of the downflow manifold body 400.

Additionally, or in the alternative, flowing process gas through the one or more supply manifolds 202 and into the irradiation plenum 121 may include transversely expanding the process gas at a transverse expansion region 514 of respective ones of a plurality of crossflow manifold bodies 500 of a crossflow manifold 222, followed by laterally translating the process gas at a lateral translation region 516 of respective ones of the plurality of crossflow manifold bodies 500. The transverse expansion region 514 may be located downstream from a crossflow manifold inlet 502 of a respective crossflow manifold body 500. The lateral translation region 516 may be located downstream from the transverse expansion region 514 and upstream from a crossflow manifold outlet 504 of the crossflow manifold 222. The transverse expansion region 514 may exhibit a transverse expansion relative to a longitudinal axis 510 of the respective crossflow manifold inlet 502 and/or relative to a lateral axis 512 of the crossflow manifold outlet 504. The lateral translation region 516 may exhibit a lateral translation in an axial orientation of the respective crossflow manifold body 500 relative to the longitudinal axis 510 of the respective crossflow manifold inlet 502 and/or relative to a lateral axis 512 of the crossflow manifold outlet 504.

An exemplary method 1200 may include, at block 1208, evacuating process gas from the irradiation plenum 121 through a return manifold body 800 while irradiating the powder bed 227. Evacuating process gas from the irradiation plenum 121 may include accelerating process gas flowing into a return manifold inlet 802 of a return manifold 204 and/or through one or more return manifold pathways 806 defined by a respective one or more return manifold bodies 800. The process gas may be accelerated by way of a pressure reduction within the return manifold inlet 802 and/or within the one or more return manifold pathways 806. The pressure reduction may be provided by one or more narrowing regions 821 and/or one or more rib elements 822 disposed about the return manifold inlet 802 and/or within the one or more return manifold pathways 806.

Further aspects of the presently disclosed subject matter are provided by the following clauses:

1. A build unit for additively manufacturing three-dimensional objects, the build unit comprising: an energy beam system, the energy beam system comprising one or more irradiation devices respectively configured to direct one or more energy beams onto a region of a powder bed; and an inertization system, the inertization system comprising an irradiation chamber defining an irradiation plenum, one or more supply manifolds, and a return manifold; wherein the one or more supply manifolds comprises a downflow manifold configured to provide a downward flow of a process gas through at least a portion of the irradiation plenum defined by the irradiation chamber, and a crossflow manifold configured to provide a lateral flow of the process gas through at least a portion of the irradiation plenum defined by the irradiation chamber.

2. The build unit of any clause herein, wherein the downflow manifold is configured and arranged to interchangeably accommodate a selected one of a plurality of different energy beam systems, and/or to interchangeably accommodate a selected one of a plurality of different irradiation devices and/or monitoring devices, and/or to interchangeably accommodate a selected one of a plurality of different optical elements that may be included in the selected one of a plurality of different irradiation devices and/or monitoring devices.

3. The build unit of any clause herein, wherein the downflow manifold comprises one or more inward downflow manifold walls defining an optics plenum configured to receive one or more irradiation devices; and wherein the optics plenum is configured and arranged to interchangeably accommodate a selected one of a plurality of different energy beam systems, and/or to interchangeably accommodate a selected one of a plurality of different irradiation devices and/or monitoring devices, and/or to interchangeably accommodate a selected one of a plurality of different optical elements that may be included in the selected one of a plurality of different irradiation devices and/or monitoring devices.

4. The build unit of any clause herein, wherein the downflow manifold comprises a downflow manifold body defining one or more downflow manifold pathways within the downflow manifold body.

5. The build unit of any clause herein, wherein the downflow manifold body comprises one or more inward downflow manifold walls, the one or more inward downflow manifold walls defining an optics plenum coinciding with a distal portion of the irradiation plenum relative to the powder bed.

6. The build unit of any clause herein, wherein the one or more inward downflow manifold walls diverge from a longitudinal axis of the downflow manifold body in a proximal direction relative to the powder bed at a divergence angle allowing the one or more energy beams from the energy beam system to access the portion of the powder bed corresponding to a scan field of the one or more energy beams.

7. The build unit of any clause herein, wherein the one or more inward downflow manifold walls comprise a plurality of downflow manifold apertures oriented parallel to a longitudinal axis of the downflow manifold body or within 10 degrees of parallel to the longitudinal axis of the downflow manifold body.

8. The build unit of any clause herein, wherein the crossflow manifold comprises a plurality of crossflow manifold bodies arranged along a width of the crossflow manifold, the plurality of crossflow manifold bodies respectively coupled to one another or defining a respective integrally formed portion of the crossflow manifold.

9. The build unit of any clause herein, wherein, respective ones of the plurality of crossflow manifold bodies comprise a crossflow manifold inlet fluidly communicating with a process gas supply line and a plurality of crossflow manifold pathways defined by the respective one of the plurality of crossflow manifold bodies.

10. The build unit of any clause herein, wherein the crossflow manifold comprises a crossflow manifold outlet defined at least in part by respective ones of the plurality of crossflow manifold bodies, the crossflow manifold outlet fluidly communicating with the irradiation plenum defined by the irradiation chamber and the plurality of crossflow manifold pathways of the respective ones of the plurality of crossflow manifold bodies.

11. The build unit of any clause herein, wherein the crossflow manifold outlet has an elongate cross-sectional profile, and wherein respective ones of the plurality of crossflow manifold bodies comprise a transverse expansion region and a lateral translation region, the transverse expansion region exhibiting a transverse expansion of the respective crossflow manifold body relative to a longitudinal axis of the respective crossflow manifold inlet and/or relative to a lateral axis of the crossflow manifold outlet, and the lateral translation region exhibiting a lateral translation in an axial orientation of the respective crossflow manifold body relative to the longitudinal axis of the respective crossflow manifold inlet and/or relative to a lateral axis of the crossflow manifold outlet.

12. The build unit of any clause herein, wherein the transverse expansion region is located downstream from the respective crossflow manifold inlet, and the lateral translation region located downstream from the transverse expansion region and upstream from the crossflow manifold outlet.

13. The build unit of any clause herein, wherein the return manifold is configured to receive and/or evacuate process gas from the irradiation plenum while irradiating a powder bed, the process gas flowing through the irradiation plenum and into the return manifold.

14. The build unit of any clause herein, wherein the return manifold comprises a plurality of evacuation manifold bodies arranged along a width of the return manifold, the plurality of evacuation manifold bodies respectively coupled to one another or defining a respective integrally formed portion of the return manifold.

15. The build unit of any clause herein, wherein the return manifold comprises a return manifold inlet and one or more evacuation manifold pathways defined at least in part by respective ones of the plurality of evacuation manifold bodies, the return manifold inlet fluidly communicating with the irradiation plenum defined by the irradiation chamber and the one or more evacuation manifold pathways defined by the respective ones of the plurality of evacuation manifold bodies.

16. The build unit of any clause herein, wherein respective ones of the plurality of evacuation manifold bodies comprise a return manifold outlet fluidly communicating with the one or more evacuation manifold pathways of the respective evacuation manifold body and a process gas evacuation line.

17. The build unit of any clause herein, wherein the return manifold inlet has an elongate cross-sectional profile, and wherein the return manifold comprises one or more narrowing regions and/or one or more rib elements disposed about the return manifold inlet and/or within the one or more evacuation manifold pathways.

18. The build unit of any clause herein, wherein the one or more narrowing regions and/or the one or more rib elements are configured to provide a pressure reduction within the return manifold inlet and/or within the one or more evacuation manifold pathways, the pressure reduction accelerating the process gas flowing into the return manifold inlet and/or through the one or more evacuation manifold pathways.

19. The build unit of any clause herein, wherein the return manifold is configured to receive a lateral flow of the process gas from at least a portion of an irradiation plenum defined by the irradiation chamber.

20. A build unit for additively manufacturing three-dimensional objects, the build unit comprising: an energy beam system, the energy beam system comprising one or more irradiation devices respectively configured to direct one or more energy beams onto a region of a powder bed; and an inertization system, the inertization system comprising an irradiation chamber defining an irradiation plenum and one or more supply manifolds configured to supply a process gas to the irradiation plenum while irradiating the region of the powder bed with the build unit situated above the region of the powder bed, the process gas flowing through the one or more supply manifolds and into the irradiation plenum while irradiating the region of the powder bed; wherein the one or more supply manifolds comprises a downflow manifold configured to provide a downward flow of the process gas through at least a portion of the irradiation plenum defined by the irradiation chamber; wherein the downflow manifold comprises a downflow manifold body defining one or more downflow manifold pathways within the downflow manifold body, the downflow manifold body comprising one or more inward downflow manifold walls defining an optics plenum coinciding with a distal portion of the irradiation plenum relative to the powder bed; and wherein the one or more inward downflow manifold walls diverge from a longitudinal axis of the downflow manifold body in a proximal direction relative to the powder bed at a divergence angle allowing the one or more energy beams of the energy beam system to access the portion of the powder bed corresponding to a scan field of the one or more energy beams; wherein the one or more inward downflow manifold walls comprise a plurality of downflow manifold apertures fluidly communicating between the optics plenum and one or more downflow manifold pathways defined by the downflow manifold body, the plurality of downflow manifold apertures oriented parallel to a longitudinal axis of the downflow manifold body or within 10 degrees of parallel to the longitudinal axis of the downflow manifold body.

21. The build unit of any clause herein, wherein the one or more inward downflow manifold walls comprise a second plurality of plurality of downflow manifold apertures oriented oblique and/or perpendicular to the longitudinal axis of the downflow manifold body.

22. The build unit of any clause herein, comprising: an optics window separating one or more optical elements of the energy beam system from the optics plenum, the optics window defining a top portion of the optics plenum.

23. The build unit of any clause herein, wherein the downflow manifold and/or the optics plenum are configured and arranged to interchangeably accommodate a plurality of different energy beam systems, and/or to interchangeably accommodate a plurality of different irradiation devices and/or monitoring devices, and/or to interchangeably accommodate a plurality of different optical elements that may be included in an irradiation device or a measurement device.

24. The build unit of any clause herein, wherein the irradiation plenum has an elongate cross-sectional surface area configured to accommodate a plurality of adjacently disposed optical elements utilized by the energy beam system.

25. The build unit of any clause herein, wherein the downflow manifold body comprises one or more bottom downflow manifold walls defining a distal portion of the irradiation plenum relative to the powder bed; and wherein the one or more bottom downflow manifold walls comprise a second plurality of downflow manifold apertures fluidly communicating between the irradiation plenum and the one or more downflow manifold pathways defined by the downflow manifold body, the plurality of downflow manifold apertures oriented parallel to a longitudinal axis of the downflow manifold body or within 10 degrees of parallel to the longitudinal axis of the downflow manifold body.

26. The build unit of any clause herein, wherein the one or more bottom downflow manifold walls comprise a third plurality of plurality of downflow manifold apertures oriented oblique and/or perpendicular to the longitudinal axis of the downflow manifold body.

27. The build unit of any clause herein, wherein the downflow manifold body comprises one or more downflow manifold baffles disposed within the one or more downflow manifold pathways.

28. The build unit of any clause herein, wherein the energy beam system comprises an energy beam housing, the energy beam housing coupled to the downflow manifold and/or the energy beam housing defining a portion of the downflow manifold.

29. The build unit of any clause herein, wherein the irradiation chamber comprises one or more downflow walls may be oriented parallel and/or oblique to a longitudinal axis of the irradiation chamber.

30. The build unit of any clause herein, comprising: a supply manifold header, the supply manifold header configured to distribute the process gas to the one or more supply manifolds, the supply manifold header comprising a plurality of supply manifold distribution elements.

31. The build unit of any clause herein, wherein the supply manifold header comprises one or more supply header conjunction elements, the one or more supply header conjunction elements providing fluid communication between at least some of the plurality of supply manifold distribution elements.

32. The build unit of any clause herein, wherein the one or more supply manifolds comprises a crossflow manifold configured to provide a lateral flow of the process gas through at least a portion of the irradiation plenum defined by the irradiation chamber.

33. The build unit of any clause herein, comprising: a return manifold configured to receive and/or evacuate the process gas from the irradiation plenum.

34. A build unit for additively manufacturing three-dimensional objects, the build unit comprising: an energy beam system, the energy beam system comprising one or more irradiation devices respectively configured to direct one or more energy beams onto a region of a powder bed; and an inertization system, the inertization system comprising an irradiation chamber defining an irradiation plenum and one or more supply manifolds configured to supply a process gas to the irradiation plenum while irradiating the region of the powder bed with the build unit situated above the region of the powder bed, the process gas flowing through the one or more supply manifolds and into the irradiation plenum while irradiating the region of the powder bed; wherein the one or more supply manifolds comprises a crossflow manifold configured to provide a lateral flow of the process gas through at least a portion of the irradiation plenum defined by the irradiation chamber; wherein the crossflow manifold comprises a plurality of crossflow manifold bodies arranged along a width of the crossflow manifold, the plurality of crossflow manifold bodies respectively coupled to one another or defining a respective integrally formed portion of the crossflow manifold, respective ones of the plurality of crossflow manifold bodies comprising a crossflow manifold inlet fluidly communicating with a process gas supply line and a plurality of crossflow manifold pathways defined by the respective crossflow manifold body, and the crossflow manifold comprising a crossflow manifold outlet defined at least in part by respective ones of the plurality of crossflow manifold bodies, the crossflow manifold outlet fluidly communicating with the irradiation plenum defined by the irradiation chamber and the plurality of crossflow manifold pathways of the respective ones of the plurality of crossflow manifold bodies; and wherein the crossflow manifold outlet has an elongate cross-sectional profile, and wherein respective ones of the plurality of crossflow manifold bodies comprise a transverse expansion region and a lateral translation region, the transverse expansion region located downstream from the respective crossflow manifold inlet, and the lateral translation region located downstream from the transverse expansion region and upstream from the crossflow manifold outlet, the transverse expansion region exhibiting a transverse expansion of the respective crossflow manifold body relative to a longitudinal axis of the respective crossflow manifold inlet and/or relative to a lateral axis of the crossflow manifold outlet, and the lateral translation region exhibiting a lateral translation in an axial orientation of the respective crossflow manifold body relative to the longitudinal axis of the respective crossflow manifold inlet and/or relative to a lateral axis of the crossflow manifold outlet.

35. The build unit of any clause herein, wherein the crossflow manifold comprises a plurality of crossflow manifold pathway walls, the plurality of crossflow manifold pathway walls respectively defining at least a portion of respective ones of the plurality of crossflow manifold pathways.

36. The build unit of any clause herein, wherein respective ones of the plurality of crossflow manifold bodies comprise a longitudinal extension region disposed between at least a portion of the transverse expansion region and at least a portion of the lateral translation region, the longitudinal extension region exhibiting a longitudinal extension in the respective crossflow manifold body relative to the longitudinal axis of the respective crossflow manifold inlet.

37. The build unit of any clause herein, wherein respective ones of the plurality of crossflow manifold bodies comprise a lateral profiling region coinciding with a location of at least a portion of the transverse expansion region and/or at least a portion of the lateral translation region, the lateral profiling region exhibiting a lateral change in cross-sectional profile of the respective crossflow manifold body relative to a cross-sectional profile of the respective crossflow manifold inlet.

38. The build unit of any clause herein, wherein the crossflow manifold comprises a plurality of inlet flow conditioners, respective ones of the plurality of inlet flow conditioners disposed in a respective crossflow manifold inlet.

39. The build unit of any clause herein, wherein respective ones of the plurality of inlet flow conditioners comprise a lattice defining a plurality of inlet flow conditioning channels, respective ones of the plurality of inlet flow conditioning channels comprising a polygonal cross-sectional profile, an elliptical cross-sectional profile, and/or a curvilinear cross-sectional profile.

40. The build unit of any clause herein, wherein respective ones of the plurality of inlet flow conditioners are removably and/or fixedly inserted within the respective crossflow manifold inlet, or wherein respective ones of the plurality of inlet flow conditioners are integrally formed as part of the respective crossflow manifold body defining the respective crossflow manifold inlet.

41. The build unit of any clause herein, wherein the crossflow manifold comprises an outlet flow conditioner disposed in the crossflow manifold outlet.

42. The build unit of any clause herein, wherein the outlet flow conditioner comprises a lattice defining a plurality of outlet flow conditioning channels, respective ones of the plurality of outlet flow conditioning channels comprising a polygonal cross-sectional profile, an elliptical cross-sectional profile, and/or a curvilinear cross-sectional profile.

43. The build unit of any clause herein, wherein at least some of the plurality of outlet flow conditioning channels have an oblique orientation that converges towards a lateral axis of the crossflow manifold outlet in a direction of a flow of process gas through the plurality of outlet flow conditioning channels.

44. The build unit of any clause herein, wherein at least some of the plurality of outlet flow conditioning channels are oriented relative to a normal line perpendicular to a tangent of a curvilinear plane, the curvilinear plane corresponding to a portion of a sphere or an ovoid.

45. The build unit of any clause herein, wherein the outlet flow conditioner is removably and/or fixedly inserted within the crossflow manifold outlet, or wherein the outlet flow conditioner is integrally formed as part of the plurality of crossflow manifold bodies defining the crossflow manifold outlet.

46. The build unit of any clause herein, wherein the plurality of crossflow manifold bodies comprises one or more crossflow manifold sidewalls with an outlet flow conditioner access port configured to receive the outlet flow conditioner.

47. The build unit of any clause herein, wherein the plurality of crossflow manifold bodies comprises one or more outlet flow conditioner slots configured to receive an outflow conditioner, the one or more outlet flow conditioner slots extending transversely across the plurality of crossflow manifold bodies adjacent to and/or upstream from the crossflow manifold outlet.

48. The build unit of any clause herein, comprising: a supply manifold header configured to distribute process gas to the one or more supply manifolds; and a plurality of process gas supply lines, respective ones of the process gas supply lines fluidly communicating between the supply manifold header and the respective crossflow manifold inlet.

49. The build unit of any clause herein, comprising: one or more supply header conjunction elements, respective ones of the one or more supply header conjunction elements fluidly communicating between a respective first and second ones of the plurality of process gas supply lines, the one or more supply header conjunction elements configured to allow a flow of process gas to distribute proportionally between the plurality of process gas supply lines.

50. The build unit of any clause herein, wherein the inertization system comprises a return manifold configured to receive and/or evacuate process gas from the irradiation plenum while irradiating the region of the powder bed with the build unit situated above the region of the powder bed, the process gas flowing through the irradiation plenum and into the return manifold while irradiating the region of the powder bed.

51. The build unit of any clause herein, wherein the one or more supply manifolds comprises a downflow manifold configured to provide a downward flow of the process gas through at least a portion of the irradiation plenum defined by the irradiation chamber.

52. The build unit of any clause herein, wherein the irradiation chamber comprises a crossflow chamber defining a crossflow plenum occupying at least a portion of the irradiation plenum, wherein the crossflow manifold is configured to provide a lateral flow of the process gas through the crossflow plenum, and wherein the crossflow chamber comprises one or more crossflow walls oriented parallel or oblique to a lateral axis of the crossflow chamber.

53. A build unit for additively manufacturing three-dimensional objects, the build unit comprising: an energy beam system, the energy beam system comprising one or more irradiation devices respectively configured to direct one or more energy beams onto a region of a powder bed; and an inertization system, the inertization system comprising an irradiation chamber defining an irradiation plenum and a return manifold configured to receive and/or evacuate a process gas from the irradiation plenum while irradiating the region of the powder bed with the build unit situated above the region of the powder bed, the process gas flowing through the irradiation plenum and into the return manifold while irradiating the region of the powder bed; wherein the return manifold comprises a plurality of return manifold bodies arranged along a width of the return manifold, the plurality of return manifold bodies respectively coupled to one another or defining a respective integrally formed portion of the return manifold, the return manifold comprising a return manifold inlet defined at least in part by respective ones of the plurality of return manifold bodies, respective ones of the plurality of return manifold bodies comprising one or more return manifold pathways and a return manifold outlet fluidly communicating with the one or more return manifold pathways of the return manifold body and a process gas evacuation line, and the return manifold inlet fluidly communicating with the irradiation plenum defined by the irradiation chamber and the one or more return manifold pathways defined by the respective ones of the plurality of return manifold bodies; wherein the return manifold is configured to receive a lateral flow of the process gas from at least a portion of an irradiation plenum defined by the irradiation chamber, wherein the return manifold inlet has an elongate cross-sectional profile, and wherein the return manifold comprises one or more narrowing regions and/or one or more rib elements disposed about the return manifold inlet and/or within the one or more return manifold pathways.

54. The build unit of any clause herein, wherein the plurality of return manifold bodies comprises one or more recapture pathways disposed about a bottom portion of the one or more return manifold pathways, the one or more recapture pathways configured to receive the process gas into the one or more return manifold pathways that flows past the return manifold inlet.

55. The build unit of any clause herein, wherein the one or more recapture pathways comprise an elongate slit disposed transversely across a bottom portion of the one or more return manifold pathways.

56. The build unit of any clause herein, wherein the one or more recapture pathways fluidly communicate with the one or more return manifold pathways downstream from an inlet edge of a return manifold inlet.

57. The build unit of any clause herein, wherein the one or more recapture pathways fluidly communicate with the one or more return manifold pathways upstream from at least one of the one or more narrowing elements and/or from at least one of the one or more rib elements.

58. The build unit of any clause herein, wherein the one or more recapture pathways comprise a slit, an array of perforations, a lattice, or a grating, the one or more recapture pathways disposed about at least a portion of the one or more return manifold pathways.

59. The build unit of any clause herein, wherein respective ones of the plurality of the return manifold bodies comprise an upward translation region located downstream from the return manifold inlet, the upward translation region exhibiting an upward translation in an axial orientation of the respective crossflow manifold body relative to a longitudinal axis of the respective crossflow manifold inlet and/or relative to a lateral axis of the respective return manifold outlet.

60. The build unit of any clause herein, wherein respective ones of the plurality of the return manifold bodies comprise a transverse contraction region located downstream from the respective upward translation region and upstream from the respective return manifold outlet, the transverse contraction region exhibiting a transverse contraction in the respective return manifold body relative to a lateral axis of the return manifold inlet and/or relative to a longitudinal axis of the respective return manifold outlet.

61. The build unit of any clause herein, wherein respective ones of the plurality of the return manifold bodies comprise a lateral profiling region coinciding with a location of at least a portion of the transverse contraction region and/or at least a portion of the upward translation region, the lateral profiling region exhibiting a lateral change in cross-sectional profile of the respective return manifold body relative to a cross-sectional profile of the respective crossflow manifold inlet.

62. The build unit of any clause herein, wherein respective ones of the plurality of return manifold bodies comprises a longitudinal extension region disposed between at least a portion of the upward translation region and at least a portion of the transverse contraction region, the longitudinal extension region exhibiting a longitudinal extension of the respective return manifold body relative to the longitudinal axis of the respective return manifold outlet.

63. The build unit of any clause herein, wherein the inertization system comprises: one or more supply manifolds configured to supply the process gas to the irradiation plenum while irradiating the region of the powder bed with the build unit situated above the region of the powder bed, the process gas flowing through the one or more supply manifolds and into the irradiation plenum while irradiating the region of the powder bed.

64. The build unit of any clause herein, wherein the one or more supply manifolds comprises a crossflow manifold configured to provide a lateral flow of the process gas through at least a portion of the irradiation plenum defined by the irradiation chamber.

65. The build unit of any clause herein, wherein the one or more supply manifolds comprises a downflow manifold configured to provide a downward flow of the process gas through at least a portion of the irradiation plenum defined by the irradiation chamber.

66. The build unit of any clause herein, wherein the return manifold is configured to receive the lateral flow of the process gas from the crossflow manifold and/or the downward flow of the process from the downflow manifold.

67. The build unit of any clause herein, wherein the irradiation chamber comprises a crossflow chamber defining a crossflow plenum occupying at least a portion of the irradiation plenum, wherein the crossflow manifold is configured to provide a lateral flow of the process gas through the crossflow plenum, and wherein the crossflow chamber comprises one or more crossflow walls oriented parallel or oblique to a lateral axis of the crossflow chamber.

68. The build unit of any clause herein, wherein respective ones of the one or more crossflow walls comprise: one or more flanges having attachment points configured to couple the respective crossflow wall to a crossflow manifold, to a return manifold, and/or to a downflow wall of the irradiation chamber; and one or more bevels, respective ones of the one or more bevels disposed between a face of the respective crossflow wall and respective ones of the one or more flanges, respective ones of the one or more bevels sloping away from the one of the one or more flanges.

69. The build unit of any clause herein, wherein the irradiation chamber comprises a downflow chamber defining a downflow plenum occupying at least a portion of the irradiation plenum, wherein the downflow manifold is configured to provide a downward flow of the process gas through the downflow plenum, and wherein the downflow chamber comprises one or more downflow walls oriented parallel or oblique to a longitudinal axis of the downflow chamber.

70. An additive manufacturing system, comprising: a build unit; a build vessel; a build unit-positioning system and/or a build vessel-positioning system; and wherein the build unit comprises: an energy beam system, the energy beam system comprising one or more irradiation devices respectively configured to direct one or more energy beams onto a region of a powder bed; and an inertization system, the inertization system comprising an irradiation chamber defining an irradiation plenum, one or more supply manifolds, and a return manifold; wherein the one or more supply manifolds comprises a downflow manifold configured to provide a downward flow of a process gas through at least a portion of the irradiation plenum defined by the irradiation chamber, and a crossflow manifold configured to provide a lateral flow of a process gas through at least a portion of the irradiation plenum defined by the irradiation chamber.

71. The additive manufacturing system of any clause herein, wherein the build unit-positioning system is configured to move the build unit to specified build coordinates and/or along specified build vectors.

72. The additive manufacturing system of any clause herein, wherein the build vessel-positioning system is configured to move the build vessel to specified build coordinates and/or along specified build vectors.

73. The additive manufacturing system of any clause herein, comprising:

a control system configured to control one or more operations of the additive manufacturing system.

74. The additive manufacturing system of any clause herein, comprising the build unit of any clause herein.

75. A method of additively manufacturing a three-dimensional object, the method comprising: irradiating a powder bed with a build unit situated above a powder bed, the build unit comprising an energy beam system and an inertization system, wherein the inertization system comprises: an irradiation chamber defining an irradiation plenum, one or more supply manifolds configured to supply process gas to the irradiation plenum, and a return manifold configured to receive and/or evacuate process gas from the irradiation plenum; flowing a process gas through the one or more supply manifolds and into the irradiation plenum while irradiating the powder bed, wherein the one or more supply manifolds comprises a downflow manifold configured to provide a downward flow of the process gas through at least a portion of the irradiation plenum defined by the irradiation chamber, and a crossflow manifold configured to provide a lateral flow of the process gas through at least a portion of the irradiation plenum defined by the irradiation chamber; and evacuating the process gas from the irradiation plenum through the return manifold while irradiating the powder bed.

76. The method of any clause herein, wherein flowing the process gas through the one or more supply manifolds and into the irradiation plenum comprises flowing the process gas through a plurality of downflow manifold apertures disposed within one or more inward downflow manifold walls of the downflow manifold.

77. The method of any clause herein, wherein flowing the process gas through the one or more supply manifolds and into the irradiation plenum comprises transversely expanding the process gas at a transverse expansion region of respective ones of a plurality of crossflow manifold bodies followed by laterally translating the process gas at a lateral translation region of respective ones of the plurality of crossflow manifold bodies, the transverse expansion region located downstream from the respective crossflow manifold inlet, and the lateral translation region located downstream from the transverse expansion region and upstream from a crossflow manifold outlet, the transverse expansion region exhibiting a transverse expansion relative to a longitudinal axis of the respective crossflow manifold inlet and/or relative to a lateral axis of the crossflow manifold outlet, and the lateral translation region exhibiting a lateral translation in an axial orientation of the respective crossflow manifold body relative to the longitudinal axis of the respective crossflow manifold inlet and/or relative to a lateral axis of the crossflow manifold outlet.

78. The method of any clause herein, wherein evacuating the process gas from the irradiation plenum comprises accelerating process gas flowing into a return manifold inlet and/or through one or more evacuation manifold pathways by way of a pressure reduction within the return manifold inlet and/or within the one or more evacuation manifold pathways, the pressure reduction provided by one or more narrowing regions and/or one or more rib elements disposed about the return manifold inlet and/or within the one or more evacuation manifold pathways.

79. A method of additively manufacturing a three-dimensional object, the method comprising: irradiating a region of a powder bed with a build unit situated above the region of the powder bed, the build unit comprising an energy beam system and an inertization system, the energy beam system comprising one or more irradiation devices respectively configured to direct one or more energy beams onto a region of a powder bed, and the inertization system comprising an irradiation chamber defining an irradiation plenum and one or more supply manifolds configured to supply process gas to the irradiation plenum; and flowing a process gas through the one or more supply manifolds and into the irradiation plenum while irradiating the powder bed, wherein the one or more supply manifolds comprises a downflow manifold configured to provide a downward flow of the process gas through at least a portion of the irradiation plenum defined by the irradiation chamber; wherein the downflow manifold comprises a downflow manifold body defining one or more downflow manifold pathways within the downflow manifold body, the downflow manifold body comprising one or more inward downflow manifold walls defining an optics plenum comprising a distal portion of the irradiation plenum relative to the powder bed; and wherein the one or more inward downflow manifold walls diverge from a longitudinal axis of the downflow manifold body in a proximal direction relative to the powder bed at a divergence angle allowing the one or more energy beams of the energy beam system to access the portion of the powder bed corresponding to a scan field of the one or more energy beams; wherein flowing process gas through the one or more supply manifolds and into the irradiation plenum comprises flowing the process gas through a plurality of downflow manifold apertures disposed within the one or more inward downflow manifold walls, the plurality of downflow manifold apertures fluidly communicating between the optics plenum and the one or more downflow manifold pathways defined by the downflow manifold body, the plurality of downflow manifold apertures oriented parallel to a longitudinal axis of the downflow manifold body or within 10 degrees of parallel to the longitudinal axis of the downflow manifold body.

80. The method of any clause herein, comprising: positioning the build unit above the region of a powder bed at least in part by moving the build unit with a build unit-positioning system and/or by moving a build vessel configured to support the powder bed beneath the build unit, the build vessel moved at least in part by a build vessel-positioning system.

81. The method of any clause herein, wherein the irradiation plenum comprises a downflow plenum, the downward flow of the process gas flowing through the downflow plenum, wherein the downward flow of the process gas comprises a primary downflow flow field and a quiescent downflow flow field at least partially surrounded by the primary downflow flow field, the primary downflow flow field occupying an annular or semiannular region extending longitudinally below at least a portion of the downflow manifold, and the quiescent downflow flow field occupying at least a portion of the optics plenum.

82. The method of any clause herein, wherein flowing the process gas through the one or more supply manifolds and into the irradiation plenum comprises flowing the process gas through a crossflow manifold configured to provide a lateral flow of the process gas through at least a portion of the irradiation plenum defined by the irradiation chamber.

83. The method of any clause herein, wherein the irradiation plenum comprises a crossflow plenum, wherein the lateral flow of the process gas flowing through the crossflow plenum has a lateral velocity that exceeds a downward velocity of the downward flow of the process gas flowing through the irradiation plenum.

84. The method of any clause herein, comprising:
evacuating the process gas from the irradiation plenum through a return manifold while irradiating the powder bed.

85. A method of additively manufacturing a three-dimensional object, the method comprising: irradiating a region of a powder bed with a build unit situated above the region of the powder bed, the build unit comprising an energy beam system and an inertization system, the energy beam system comprising one or more irradiation devices respectively configured to direct one or more energy beams onto a region of a powder bed, and the inertization system comprising an irradiation chamber defining an irradiation plenum and one or more supply manifolds configured to supply process gas to the irradiation plenum; and flowing a process gas through the one or more supply manifolds and into the irradiation plenum while irradiating the powder bed, wherein the one or more supply manifolds comprises a crossflow manifold configured to provide a lateral flow of the process gas through at least a portion of the irradiation plenum defined by the irradiation chamber; wherein the crossflow manifold comprises a plurality of crossflow manifold bodies arranged along a width of the crossflow manifold, the plurality of crossflow manifold bodies respectively coupled to one another or defining a respective integrally formed portion of the crossflow manifold, respective ones of the plurality of crossflow manifold bodies comprising a crossflow manifold inlet fluidly communicating with a process gas supply line and a plurality of crossflow manifold pathways defined by the respective crossflow manifold body, and the crossflow manifold comprising a crossflow manifold outlet defined at least in part by respective ones of the plurality of crossflow manifold bodies, the crossflow manifold outlet having an elongate cross-sectional profile, and the crossflow manifold outlet fluidly communicating with the irradiation plenum defined by the irradiation chamber and the plurality of crossflow manifold pathways of the respective ones of the plurality of crossflow manifold bodies; wherein flowing the process gas through the one or more supply manifolds and into the irradiation plenum comprises transversely expanding the process gas at a transverse expansion region of respective ones of the plurality of crossflow manifold bodies followed by laterally translating the process gas at a lateral translation region of respective ones of the plurality of crossflow manifold bodies, the transverse expansion region located downstream from the respective crossflow manifold inlet, and the lateral translation region located downstream from the transverse expansion region and upstream from the crossflow manifold outlet, the transverse expansion region exhibiting a transverse expansion relative to a longitudinal axis of the respective crossflow manifold inlet and/or relative to a lateral axis of the crossflow manifold outlet, and the lateral translation region exhibiting a lateral translation in an axial orientation of the respective crossflow manifold body relative to the longitudinal axis of the respective crossflow manifold inlet and/or relative to a lateral axis of the crossflow manifold outlet.

86. A method of additively manufacturing a three-dimensional object, the method comprising: irradiating a region of a powder bed with a build unit situated above the region of the powder bed, the build unit comprising an energy beam system and an inertization system, the energy beam system comprising one or more irradiation devices respectively configured to direct one or more energy beams onto a region of a powder bed, and the inertization system comprising an irradiation chamber defining an irradiation plenum and a return manifold configured to receive and/or evacuate a process gas from the irradiation plenum; and evacuating the process gas from the irradiation plenum through the return manifold while irradiating the powder bed, wherein the return manifold comprises a plurality of return manifold bodies arranged along a width of the return manifold, the plurality of return manifold bodies respectively coupled to one another or defining a respective integrally formed portion of the return manifold, the return manifold comprising a return manifold inlet defined at least in part by respective ones of the plurality of return manifold bodies, respective ones of the plurality of return manifold bodies comprising one or more return manifold pathways and a return manifold outlet fluidly communicating with the one or more return manifold pathways of the respective return manifold body and a process gas evacuation line, the return manifold inlet having an elongate cross-sectional profile, and the return manifold inlet fluidly communicating with the irradiation plenum defined by the irradiation chamber and the one or more return manifold pathways defined by the respective ones of the plurality of return manifold bodies; wherein evacuating the process gas from the irradiation plenum comprises accelerating the process gas flowing into the return manifold inlet and/or through the one or more return manifold pathways by way of a pressure reduction within the return manifold inlet and/or within the one or more return manifold pathways, the pressure reduction provided by one or more narrowing regions and/or one or more rib elements disposed about the return manifold inlet and/or within the one or more return manifold pathways.

87. The method of any clause herein, comprising: flowing the process gas through the one or more supply manifolds and into the irradiation plenum while irradiating the powder bed, wherein the one or more supply manifolds comprises a downflow manifold configured to provide a downward flow of the process gas through at least a portion of the irradiation plenum defined by the irradiation chamber, and a crossflow manifold configured to provide a lateral flow of the process gas through at least a portion of the irradiation plenum defined by the irradiation chamber.

88. The method of any clause herein, comprising: positioning the build unit above the region of a powder bed at least in part by moving the build unit with a build unit-positioning system and/or by moving a build vessel configured to support the powder bed beneath the build unit, the build vessel moved at least in part by a build vessel-positioning system; and wherein evacuating the process gas from the irradiation plenum through the return manifold while irradiating the powder bed comprises evacuating the lateral flow of the process gas and the downward flow of the process gas through the return manifold.

89. The method of any clause herein, wherein the method is performed using the additive manufacturing system of any clause herein, and/or wherein the method is performed using the build unit of any clause herein.

90. A computer-readable medium comprising computer-executable instructions, which when executed by a processor associated with an additive manufacturing machine, cause the additive manufacturing machine to perform a method of additively manufacturing a three-dimensional object, the method comprising: irradiating a powder bed with a build unit situated above a powder bed, the build unit comprising an energy beam system and an inertization system, wherein the inertization system comprises: an irradiation chamber defining an irradiation plenum, one or more supply manifolds configured to supply process gas to the irradiation plenum, and a return manifold configured to receive and/or evacuate process gas from the irradiation plenum; flowing a process gas through the one or more supply manifolds and into the irradiation plenum while irradiating the powder bed, wherein the one or more supply manifolds comprises a downflow manifold configured to provide a downward flow of the process gas through at least a portion of the irradiation plenum defined by the irradiation chamber, and a crossflow manifold configured to provide a lateral flow of the process gas through at least a portion of the irradiation plenum defined by the irradiation chamber; and evacuating process gas from the irradiation plenum through the return manifold while irradiating the powder bed. The computer-readable medium may be configured to cause the additive manufacturing machine to perform the method of any clause herein.

This written description uses exemplary embodiments to describe the presently disposed subject matter, including the best mode, and also to enable any person skilled in the art to practice such subject matter, including making and using any devices or systems and performing any incorporated methods. The patentable scope of the presently disposed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A build unit for additively manufacturing three-dimensional objects, the build unit comprising:

an energy beam system, the energy beam system comprising one or more irradiation devices respectively configured to direct one or more energy beams toward a build plane and onto a region of a powder bed; and an inertization system, the inertization system comprising an irradiation chamber defining an irradiation plenum and a return manifold configured to receive and/or evacuate a process gas from the irradiation plenum while irradiating the region of the powder bed with the build unit situated above the region of the powder bed, the process gas flowing through the irradiation plenum and into the return manifold while irradiating the region of the powder bed;

wherein the return manifold comprises a plurality of return manifold bodies arranged along a width of the return manifold, each of the plurality of return manifold bodies defining a respective one of a plurality of return manifold outlets of the return manifold, the plurality of return manifold bodies respectively coupled to one another or defining a respective integrally formed portion of the return manifold, the return manifold comprising a return manifold inlet disposed at a bottom portion of the irradiation chamber and defined at least in part by each of the plurality of return manifold bodies, respective ones of the plurality of return manifold bodies comprising one or more return manifold pathways downstream of the return manifold inlet fluidly connecting the return manifold inlet to respective ones of the plurality of return manifold outlets and a process gas evacuation line, and the return manifold inlet fluidly communicating with the irradiation plenum defined by the irradiation chamber and the one or more return manifold pathways defined by the respective ones of the plurality of return manifold bodies;

wherein the plurality of return manifold bodies comprises one or more recapture pathways disposed across at least a portion of the one or more return manifold pathways to recapture the process gas into the one or more return manifold pathways that escapes past and beneath the return manifold inlet.

2. The build unit of claim 1, wherein the one or more recapture pathways are disposed about a bottom portion of the one or more return manifold pathways.

3. The build unit of claim 1, wherein the one or more recapture pathways comprise an elongate slit disposed transversely across a bottom portion of the one or more return manifold pathways.

4. The build unit of claim 1, wherein the one or more recapture pathways fluidly communicate with the one or more return manifold pathways downstream from an inlet edge of the return manifold inlet.

5. The build unit of claim 1, wherein the one or more recapture pathways comprise a slit, an array of perforations, or a lattice.

6. A build unit for additively manufacturing three-dimensional objects, the build unit comprising:

an energy beam system comprising one or more irradiation devices respectively configured to direct one or more energy beams onto a region of a powder bed; and an inertization system comprising an irradiation chamber defining an irradiation plenum and a return manifold configured to receive and/or evacuate a process gas from the irradiation plenum while irradiating the region of the powder bed with the build unit situated above the region of the powder bed, the process gas flowing through the irradiation plenum and into the return manifold while irradiating the region of the powder bed;

wherein the return manifold comprises a plurality of return manifold bodies arranged along a width of the return manifold, the plurality of return manifold bodies respectively coupled to one another or defining a respective integrally formed portion of the return manifold, the return manifold comprising one or more return manifold inlets defined at least in part by respective ones of the plurality of return manifold bodies, respective ones of the plurality of return manifold bodies comprising one or more return manifold pathways and a plurality of return manifold outlets fluidly communicating with the one or more return manifold pathways of the return manifold body and a process gas evacuation line, and the one or more return manifold inlets fluidly communicating with the irradiation plenum defined by the irradiation chamber and the one or more return manifold pathways defined by the respective ones of the plurality of return manifold bodies;

wherein the return manifold inlet is configured to receive a lateral flow of the process gas from at least a portion of an irradiation plenum defined by the irradiation chamber, the lateral flow of the process gas having a lateral directional vector and an elongate cross-sectional surface area, and wherein a number of the plurality of return manifold outlets exceeds a number of the one or more return manifold inlets.

7. The build unit of claim 6, wherein respective ones of the plurality of the return manifold bodies comprise an upward translation region located downstream from the one or more return manifold inlets, the upward translation region exhibiting an upward translation having an upward directional vector in an axial orientation of the respective return manifold body relative to a longitudinal axis of the respective one or more return manifold inlets and/or relative to a lateral axis of the respective plurality of return manifold outlets.

8. The build unit of claim 7, wherein respective ones of the plurality of the return manifold bodies comprise a transverse contraction region located downstream from the respective upward translation region and upstream from the respective plurality of return manifold outlets, the transverse contraction region exhibiting a transverse contraction in the respective return manifold body relative to a lateral axis of the respective one or more return manifold inlets and/or relative to a longitudinal axis of the respective plurality of return manifold outlets.

9. The build unit of claim 8, wherein respective ones of the plurality of the return manifold bodies comprise a lateral profiling region coinciding with a location of at least a portion of the transverse contraction region and/or at least a portion of the upward translation region, the lateral profiling region exhibiting a lateral change in cross-sectional profile of the respective return manifold body relative to a cross-sectional profile of the respective one or more return manifold inlets.

10. The build unit of claim 8, wherein respective ones of the plurality of return manifold bodies comprises a longitudinal extension region disposed between at least a portion of the upward translation region and at least a portion of the transverse contraction region, the longitudinal extension region exhibiting a longitudinal extension of the respective return manifold body relative to the longitudinal axis of the respective plurality of return manifold outlets.

11. The build unit of claim 8, wherein the transverse contraction region comprises a first transverse contraction region and a second transverse contraction region, wherein the first transverse contraction region exhibits a first rate of transverse contraction different than a second rate of transverse contraction exhibited by the second transverse contraction region.

12. The build unit of claim 6, wherein the inertization system comprises:

one or more supply manifolds configured to supply the process gas to the irradiation plenum while irradiating the region of the powder bed with the build unit situated above the region of the powder bed, the process gas flowing through the one or more supply manifolds and into the irradiation plenum while irradiating the region of the powder bed.

13. The build unit of claim 12, wherein the one or more supply manifolds comprises a crossflow manifold configured to provide a lateral flow of the process gas through at least a portion of the irradiation plenum defined by the irradiation chamber.

14. The build unit of claim 13, wherein the one or more supply manifolds comprises a downflow manifold configured to provide a downward flow having a downward directional vector of the process gas through at least a portion of the irradiation plenum defined by the irradiation chamber.

15. The build unit of claim 14, wherein the return manifold is configured to receive the lateral flow of the process gas from the crossflow manifold and/or the downward flow of the process from the downflow manifold.

16. The build unit of claim 14, wherein the irradiation chamber comprises a crossflow chamber defining a crossflow plenum occupying at least a portion of the irradiation plenum, wherein the crossflow manifold is configured to provide a lateral flow of the process gas through the crossflow plenum, and wherein the crossflow chamber comprises one or more crossflow walls oriented parallel or oblique to a lateral axis of the crossflow chamber.

17. The build unit of claim 16, wherein respective ones of the one or more crossflow walls comprise:

one or more flanges having attachment points configured to couple the respective crossflow wall to a crossflow manifold, to a return manifold, and/or to a downflow wall of the irradiation chamber; and one or more bevels, respective ones of the one or more bevels disposed between a face of the respective crossflow wall and respective ones of the one or more flanges, respective ones of the one or more bevels sloping away from the one of the one or more flanges.

18. The build unit of claim 14, wherein the plurality of return manifold bodies contract transversely relative to a longitudinal axis of respective ones of the one or more return manifold outlets or relative to a lateral axis of the one or more return manifold inlets.

19. The build unit of claim 6, wherein at least one return manifold inlet of the one or more return manifold inlets has an elongate cross-sectional profile, and wherein at least one return manifold outlet of the plurality of return manifold outlets has an elliptical cross-sectional profile.

20. The build unit of claim 6, wherein the lateral flow is configured to flow through the irradiation plenum and evacuate contaminants generated by the energy beam without disturbing the powder bed.

21. The build unit of claim 20, wherein the lateral flow comprises a laterally accelerating flow configured to flow through the irradiation plenum and prevent at least a portion of the process gas from escaping from the inertization system.

* * * * *